(12) United States Patent
Kinoshita et al.

(10) Patent No.: US 8,220,132 B2
(45) Date of Patent: *Jul. 17, 2012

(54) METHOD OF PRODUCING MECHANISM FOR CONVERTING ROTATIONAL MOTION TO LINEAR MOTION AND JIG FOR EXECUTING THE METHOD

(75) Inventors: Yasuo Kinoshita, Aichi-ken (JP); Masakazu Kurihara, Nagoya (JP); Hideo Saito, Yokohama (JP); Motohiro Tsuzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 655 days.

This patent is subject to a terminal disclaimer.

(21) Appl. No.: 12/308,472

(22) PCT Filed: Jun. 22, 2007

(86) PCT No.: PCT/JP2007/062611
§ 371 (c)(1),
(2), (4) Date: Feb. 25, 2009

(87) PCT Pub. No.: WO2007/148790
PCT Pub. Date: Dec. 27, 2007

(65) Prior Publication Data
US 2010/0170077 A1    Jul. 8, 2010

(30) Foreign Application Priority Data

Jun. 22, 2006 (JP) .................................. 2006-173194
Apr. 23, 2007 (JP) .................................. 2007-113051

(51) Int. Cl.
*B23Q 3/00* (2006.01)
*B21D 53/28* (2006.01)

(52) U.S. Cl. ........................................ 29/466; 29/893.1
(58) Field of Classification Search .................... 29/466, 29/428, 464, 469, 893.1, 893, 893.2; 74/424.8 C, 74/459, 89.23, 89.31, 89.34, 424.81; 475/331
See application file for complete search history.

(56) References Cited

U.S. PATENT DOCUMENTS
4,526,053 A    7/1985 Carson
(Continued)

FOREIGN PATENT DOCUMENTS
EP    2 037 151 A1    3/2009
(Continued)

OTHER PUBLICATIONS

Office Action issued in U.S. Appl. No. 12/089,541 dated Apr. 14, 2011.
(Continued)

*Primary Examiner* — John C Hong
(74) *Attorney, Agent, or Firm* — Oliff & Berridge, PLC

(57) ABSTRACT

In this manufacturing method, when a plurality of planetary shaft main bodies are arranged at even intervals around a sun shaft main body, a state in which a sun threaded section is engaged with each of planetary threaded sections is referred to as a regular assembled state, and an assembly formed by a combination of the sun shaft main body and the planetary shaft main body in the regular assembled state is referred to as a first assembly. The first assembly is assembled in a state in which the relationship of the planetary shaft main body and the sun shaft main body is in correspondence with the relationship of the planetary shaft main body and the sun shaft main body in the regular assembled state.

16 Claims, 60 Drawing Sheets

U.S. PATENT DOCUMENTS

| | | | |
|---|---|---|---|
| 5,992,258 A | 11/1999 | Kawase | |
| 8,020,463 B2 | 9/2011 | Kinoshita et al. | |
| 8,037,606 B2 * | 10/2011 | Nakamura | 29/893.1 |
| 2005/0160856 A1 | 7/2005 | Sugitani | |
| 2007/0163525 A1 | 7/2007 | Fuwa et al. | |
| 2008/0222892 A1 | 9/2008 | Nakamura | |
| 2009/0288509 A1 | 11/2009 | Hori et al. | |

FOREIGN PATENT DOCUMENTS

| | | |
|---|---|---|
| JP | A-64-500214 | 1/1989 |
| JP | A-10-196757 | 7/1998 |
| JP | A-11-159593 | 6/1999 |
| JP | A-2000-500215 | 1/2000 |
| JP | A-2005-325894 | 11/2005 |
| JP | A-2006-64057 | 3/2006 |
| JP | A-2007-56952 | 3/2007 |
| JP | A-2007-107594 | 4/2007 |
| SU | 1283465 A1 | 1/1987 |
| WO | WO 88/00295 | 1/1988 |
| WO | WO 97/18406 | 5/1997 |
| WO | WO 2004/094870 A1 | 11/2004 |
| WO | WO 2005/124188 A1 | 12/2005 |
| WO | WO 2007/148789 A1 | 12/2007 |
| WO | WO 2008/015854 A1 | 2/2008 |

OTHER PUBLICATIONS

European Search Report issued in European Patent Application No. 07767418.2 dated Jul. 19, 2011.

U.S. Appl. No. 12/308,105, filed Feb. 3, 2008 in the name of Hori et al.

Jan. 30, 2012 Notice of Allowance issued in U.S. Appl. No. 12/308,105.

* cited by examiner

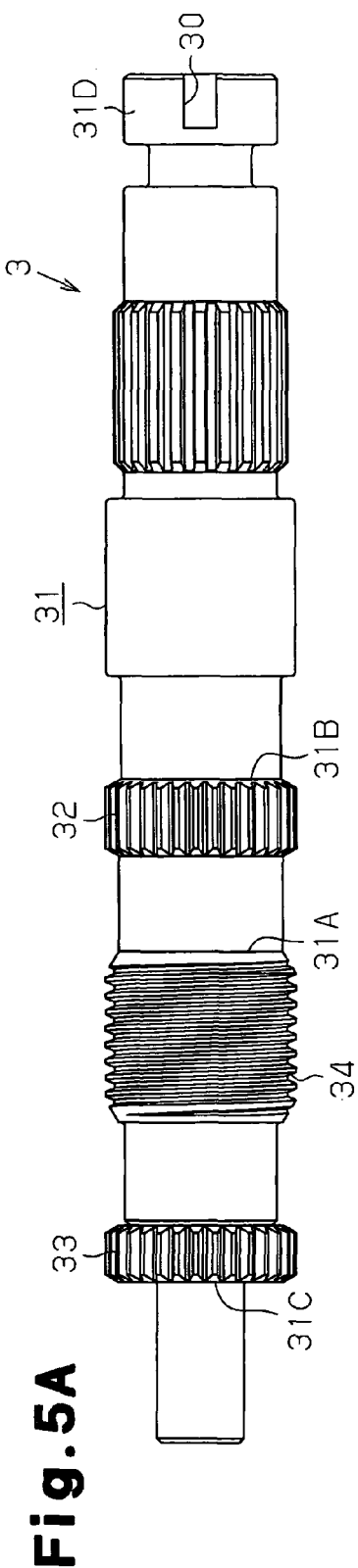
Fig.5A
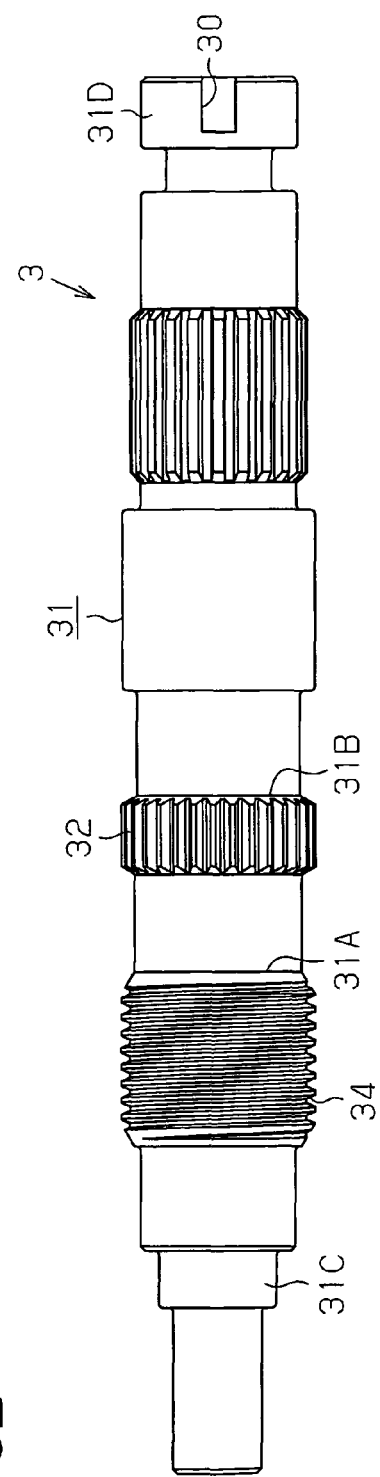
Fig.5B

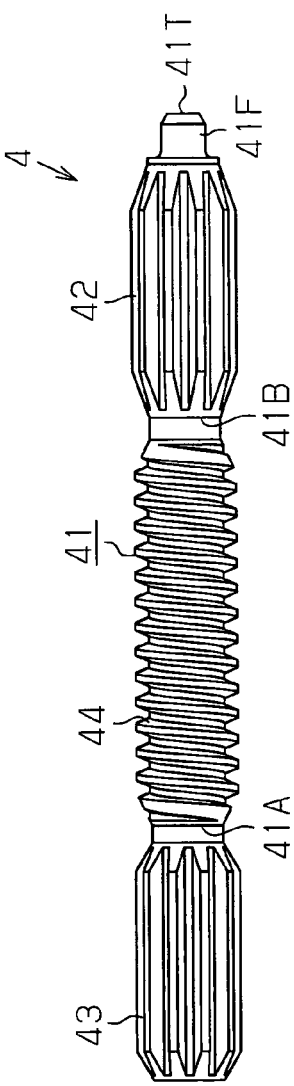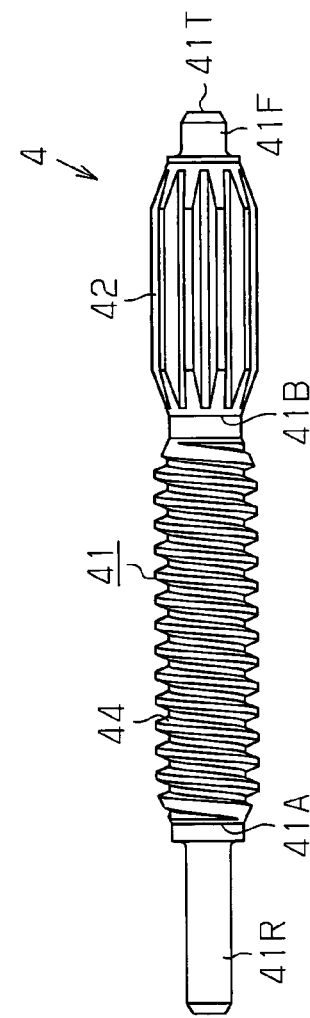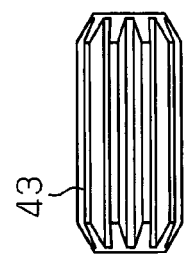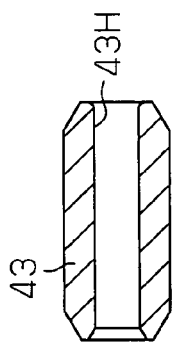
Fig.6A
Fig.6B
Fig.6C

METHOD OF PRODUCING MECHANISM FOR CONVERTING ROTATIONAL MOTION TO LINEAR MOTION AND JIG FOR EXECUTING THE METHOD

FIELD OF THE INVENTION

The present invention relates to a method for manufacturing a rotational rectilinear motion conversion mechanism, which converts rotational motion to rectilinear motion, and a jig used for the manufacturing.

BACKGROUND OF THE INVENTION

Patent document 1 describes an example of a conversion mechanism that is known as a rotational rectilinear motion conversion mechanism.

The conversion mechanism is provided with an annular shaft having an internal opening extending in the axial direction, a sun shaft arranged in the annular shaft and a plurality of planetary shafts arranged around the sun shaft. Further, an internally threaded section of the annular shaft is engaged with an externally threaded section of the sun shaft and an externally threaded section of the planetary shaft. Further, an internal gear of the annular shaft and an external gear of each planetary shaft are engaged with each other. In a conversion mechanism having such a structure, when the annular shaft rotates, the force transmitted from the annular shaft generates planetary motion of the planetary shafts around the sun shaft and linearly moves the sun shaft. In other words, rotational motion of the annular shaft can be converted to linear motion of the sun shaft.

In this case, threaded portions in the conversion mechanism are engaged at a plurality of locations. This causes the problems described next when manufacturing the conversion mechanism. When just joining the constituting elements (for example, a sun shaft and a planetary shaft) that include the threaded sections, if the threaded sections are not properly engaged with each other, it becomes difficult to join the constituent elements through just one joining operation. Accordingly, since the joining operation must be frequently carried out while finding the position or rotational phase at which the threaded sections of the constituent elements become engaged with each other, the assembly efficiency becomes low. Especially, when a gear is formed on the planetary shaft of the conversion mechanism as in patent document 1, the constituent elements must be joined while also engaging the gears. This further decreases the assembly efficiency.

Further, in a conversion mechanism that includes two gears for each of the annular shaft and planetary shaft, in which the corresponding gears are engaged with each other, and at least one of the two gears of the annular shaft is formed independently from a main body of the annular shaft, such as in the conversion mechanism of patent document 1, the problems described next occur. Since at least one of the two gears is formed independently from the annular shaft main body, the annular shaft may be assembled in a state in which the rotational phase of one gear relative to the other gear is greatly displaced. Further, when the gear of the annular shaft and the gear of the planetary shaft are engaged with each other in a state that greatly differs from the designed engaged state, the sliding resistance between the annular shaft and the planetary shaft may increase. This may lower the conversion efficiency of work from the rotational motion to the rectilinear motion. Such a problem also occurs when two gears are provided for each of the sun shaft and planetary shaft, and at least one of the two gears of the sun shaft is formed independently from a main body of the sun shaft.

Patent Document 1: International Patent Publication WO2004/094870

SUMMARY OF THE INVENTION

It is a first object of the present invention to provide a method for manufacturing a rotational rectilinear motion conversion mechanism and a jig used for such manufacturing that improves assembly efficiency.

It is a second object of the present invention to provide a method for manufacturing a rotational rectilinear motion conversion mechanism and a jig used for such manufacturing that improve the conversion efficiency of work.

To achieve the above objects, a first aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an annular threaded section defined by an internally threaded section. The sun shaft includes a sun shaft main body having a sun threaded section defined by an externally threaded section. The planetary shafts each include a planetary shaft main body having a planetary threaded section defined by an externally threaded section. The planetary threaded section is engaged with the annular threaded section and the sun threaded section. Rotational motion of either one of the annular shaft and the sun shaft is converted into rectilinear motion of the other one of the annular shaft and the sun shaft along an axial direction by a planetary motion of the planetary shaft. The method includes the steps of corresponding the relationship of the planetary shaft main bodies relative to the sun shaft main body in arrangement to the relationship in a regular assembled state of the planetary shaft main bodies relative to the sun shaft main body, with the regular assembled state being defined by a state in which the sun threaded section and the planetary threaded sections are engaged with each other in a state in which the planetary shaft main bodies are arranged at even intervals around the sun shaft main body; and assembling a basic assembly by moving each of the planetary shaft main bodies after corresponding the relationship of the planetary shaft main bodies relative to the sun shaft main body to the relationship in the regular assembled state, the basic assembly being an assembly formed by a combination of the sun shaft main body and the planetary shaft main bodies in the regular assembled state.

To achieve the above objects, a second aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an annular threaded section defined by an internally threaded section. The sun shaft includes a sun shaft main body having a sun threaded section defined by an externally threaded section. The planetary shafts each include a planetary shaft main body having a planetary threaded section defined by an externally threaded section. The planetary threaded section is engaged with the annular threaded section and the sun threaded section. Rotational motion of either one of the annular shaft and the sun shaft is converted into rectilinear motion of the other one of the annular shaft and the sun shaft along an axial direction by a planetary motion of the planetary shaft. The method includes the steps of assembling a basic assembly by combining the sun shaft main body with the planetary shaft main bodies; assembling an axial assembly by combining the basic assembly with the annular shaft main body; and setting a rotational phase of the annular threaded section as an annular threaded section reference phase before assembling the axial assembly, in which when one threaded section formed by a portion of the planetary threaded section engaged with the annular threaded section is defined as a counter annular threaded section, and the annular threaded section reference phase is defined as a rotational phase of the annular threaded section relative to a rotational phase of the counter annular threaded section at a time when the counter annular threaded section begins to engage with the annular threaded section.

To achieve the above objects, a third aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an annular threaded section defined by an internally threaded section, the sun shaft includes a sun shaft main body having a sun threaded section defined by an externally threaded section. The planetary shafts each include a planetary shaft main body having a planetary threaded section defined by an externally threaded section. The planetary threaded section is engaged with the annular threaded section and the sun threaded section. Rotational motion of either one of the annular shaft and the sun shaft is converted into rectilinear motion of the other one of the annular shaft and the sun shaft along an axial direction by a planetary motion of the planetary shaft. The method includes the steps of corresponding the relationship of the planetary shaft main bodies relative to the annular shaft main body to the relationship in a regular assembled state, with the regular assembled state being defined by a state in which the annular threaded section and the planetary threaded sections are engaged with each other in a state in which the planetary shaft main bodies are arranged at even intervals about a center line of the annular shaft main body; and assembling a basic assembly in a state in which the relationship of the planetary shaft main bodies relative to the annular shaft main body is in correspondence with the relationship in the regular assembled state, the basic assembly being an assembly formed by a combination of the annular shaft main body and the planetary shaft main bodies in the regular assembled state.

To achieve the above objects, a fourth aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an annular threaded section defined by an internally threaded section. The sun shaft includes a sun shaft main body having a sun threaded section defined by an externally threaded section. The planetary shafts each include a planetary shaft main body having a planetary threaded section defined by an externally threaded section. The planetary threaded section is engaged with the annular threaded section and the sun threaded section. Rotational motion of either one of the annular shaft and the sun shaft is converted into rectilinear motion of the other one of the annular shaft and the sun shaft along an axial direction by a planetary motion of the planetary shaft.

The method includes the steps of assembling a basic assembly by combining the sun shaft main body with the planetary shaft main bodies; assembling an axial assembly by combining the basic assembly with the sun shaft main body; and setting a rotational phase of the sun threaded section as a sun threaded section reference phase before assembling the axial assembly, wherein when one threaded section formed by a portion of the planetary threaded section engaged with the sun threaded section is set as a counter sun threaded section, the sun threaded section reference phase is defined as a rotational phase of the sun threaded section relative to a rotational phase of the counter sun threaded section at a time when the counter sun threaded section begins to engage with the sun threaded section.

To achieve the above objects, a fifth aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an annular threaded section formed as an internally threaded section and an annular gear formed as an internal gear. The sun shaft includes a sun shaft main body having a sun threaded section formed as an externally threaded section and a sun gear formed as an external gear. The planetary shafts each include a planetary shaft main body having a planetary threaded section formed as an externally threaded section and a planetary gear formed as an external gear. The annular gear is formed separately from the annular shaft main body. The sun gear is formed separately from the sun shaft main body. The planetary gear is formed separately from the planetary shaft main body. The planetary threaded section is engaged with the annular threaded section and the sun threaded section. The planetary gear engages with the annular gear and the sun gear. Rotational motion of either one of the annular shaft and the sun shaft is converted into rectilinear motion of the other one of the annular shaft and the sun shaft along an axial direction by a planetary motion of the planetary shaft. The method includes the steps of preparing a gear jig having a counter annular gear for engaging with the annular gear and a counter sun gear for engaging with the sun gear; assembling a gear assembly by attaching the annular gear, the sun gear, and the planetary gear to the gear jig, with the gear assembly being an assembly formed by a combination of the annular gear, the sun gear, and the planetary gear in a reference assembled state, and the reference assembled state being a state in which each of the planetary gears is engaged with the annular gear and the sun gear with the planetary gears arranged at even intervals around the sun gear; and assembling a geared assembly by combining the annular shaft main body, the sun shaft main body, the planetary shaft main body and the gear assembly.

To achieve the above objects, a sixth aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. Rotational motion of either one of the annular shaft and the sun shaft is converted into rectilinear motion of the other one of the annular shaft and the sun shaft along an axial direction by a planetary motion of the planetary shaft. The method includes the steps of forming an indicator in the annular shaft; and forming an internally threaded section in the annular shaft based on the indicator.

To achieve the above objects, a seventh aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. Rotational motion of either one of the annular shaft and the sun shaft is converted into rectilinear motion of the other one of the annular shaft and the sun shaft along an axial direction by a planetary motion of the planetary shaft. The method includes the steps of forming an indicator in the sun shaft; and forming an externally threaded section on the sun shaft based on the indicator.

To achieve the above objects, an eighth aspect of the present invention provides a method for manufacturing a rotational rectilinear motion conversion mechanism provided with an annular shaft through which an opening extends in an axial direction. A sun shaft is arranged in the annular shaft. A plurality of planetary shafts are arranged around the sun shaft. Rotational motion of either one of the annular shaft and the sun shaft is converted into rectilinear motion of the other one of the annular shaft and the sun shaft along an axial direction by a planetary motion of the planetary shaft. The method includes the steps of forming an indicator in the planetary shaft; and forming an externally threaded section on the planetary shaft based on the indicator.

To achieve the above objects, a ninth aspect of the present invention provides a jig used for manufacturing a rotational rectilinear motion conversion mechanism provided with an annular shaft through which an opening extends in an axial direction. A sun shaft is arranged in the annular shaft. A plurality of planetary shafts are arranged around the sun shaft. The annular shaft includes an annular shaft main body having an internally threaded section and an annular gear of internal teeth. The sun shaft includes a sun shaft main body having an externally threaded section and a sun gear of external teeth. The planetary shafts each include a planetary shaft main body having an externally threaded section and a planetary gear of external teeth. The annular gear is formed separately from the annular shaft main body. The sun gear is formed separately from the sun shaft main body. The planetary gear is formed separately from the planetary shaft main body. The externally threaded section of the planetary shaft main body is engaged with the internally threaded section of the annular shaft main body and the externally threaded section of the sun shaft main body. The planetary gear is engaged with the annular gear and the sun gear. Rotational motion of either one of the annular shaft and the sun shaft is converted into rectilinear motion of the other one of the annular shaft and the sun shaft along an axial direction by a planetary motion of the planetary shaft. The manufacturing of the conversion mechanism includes the step of assembling a gear assembly. The gear assembly is an assembly formed by a combination of the annular gear, the sun gear and the planetary gear in a basic assembled state. The basic assembled state is a state in which each of the planetary gears is engaged with the annular gear and the sun gear with the planetary gears being arranged at even intervals around the sun gear. The jig includes a plurality of support columns arranged at even intervals in a circumferential direction with a gap formed between adjacent ones of the support columns for arrangement of one of the planetary gears. Counter annular external teeth are formed on an outer circumference of each of the support columns for engaging with the annular gear, in which the counter annular external teeth forms the counter annular gear as a whole. Counter sun internal teeth are formed in an inner circumference of each of the support columns for engaging with the sun gear. The counter sun internal teeth forms the counter sun gear as a whole.

To achieve the above objects, a tenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The sun shaft includes a sun shaft main body, a first sun gear which is an external gear formed integrally with the sun shaft main body, and a second sun gear which is an external gear formed separately from the sun shaft main body. The planetary shaft includes a first planetary gear which is an external gear engaged with the first sun gear and a second planetary gear which is an external gear engaged with the second sun gear. Rotational motion of either one of the annular shaft and the sun shaft is converted into rectilinear motion of the other one of the annular shaft and the sun shaft along an axial direction by a planetary motion of the planetary shaft. The method includes the steps of holding the sun shaft main body and the second sun gear in a state in which relative rotation is disabled between the first and second sun gears when relative rotational phases substantially coincide between the first and second sun gears; and attaching the second sun gear to the sun shaft main body by relatively moving the sun shaft main body and the second sun gear in an axial direction after the step of holding the sun shaft main body and the second sun gear.

To achieve the above objects, an eleventh aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The sun shaft includes a sun shaft main body and first and second sun gears which are external gears formed separately from the sun shaft main body. The planetary shaft includes a first planetary gear which is an external gear for engaging with the first sun gear and a second planetary gear which is an external gear for engaging with the second sun gear. Rotational motion of either one of the annular shaft and the sun shaft is converted into rectilinear motion of the other one of the annular shaft and the sun shaft along an axial direction by a planetary motion of the planetary shaft. The method includes the steps of attaching the first sun gear to the sun shaft main body; holding the sun shaft main body and the second sun gear in a state in which relative rotation is disabled between the first and second sun gears when relative rotational phases substantially coincide between the first and second sun gears after attaching the first sun gear to the sun shaft main body; and attaching the second sun gear to the sun shaft main body by relatively moving the sun shaft main body and the second sun gear in an axial direction after the step of holding the sun shaft main body and the second sun gear.

To achieve the above objects, a twelfth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The annular shaft includes an annular shaft main body, a first annular gear which is an internal gear formed integrally with the annular shaft main body and a second annular gear which is an internal gear formed separately from the annular shaft main body. The planetary shaft includes a first planetary gear which is an external gear engaged with the first annular gear and a second planetary gear which is an external gear engaged with the second annular gear. Rotational motion of either one of the annular shaft and the sun shaft is converted into rectilinear motion of the other one of the annular shaft and the sun shaft along an axial direction by a planetary motion of the planetary shaft. The method includes the steps of holding the annular shaft main body and the second annular gear in a state in which relative rotation is disabled between the first and second annular gears when relative rotational phases substantially coincide between the first and second annular gears, and attaching the second annular gear to the annular shaft main body by relatively moving the annular shaft main body and the second annular gear in an axial direction after the step of holding the annular shaft main body and the second annular gear.

To achieve the above objects, a thirteenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The annular shaft includes an annular shaft main body, first and second annular gears which are internal gears formed separately from the annular shaft main body. The planetary shaft includes a first planetary gear which is an external gear engaged with the first annular gear and a second planetary gear which is an external gear engaged with the second annular gear. Rotational motion of either one of the annular shaft and the sun shaft is converted into rectilinear motion of the other one of the annular shaft and the sun shaft along an axial direction by a planetary motion of the planetary shaft. The method includes the steps of attaching the first annular gear to the annular shaft main body; holding the annular shaft main body and the second annular gear in a state in which relative rotation is disabled between the first and second annular gears when relative rotational phases substantially coincide between the first and second annular gears after attaching the first annular gear to the annular shaft main body; and assembling the second annular gear to the annular shaft main body by relatively moving the annular shaft main body and the second annular gear in an axial direction after the step of holding the annular shaft main body and the second annular gear.

To achieve the above objects, a fourteenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The sun shaft includes a sun shaft main body and a sun gear which is an external gear arranged on the sun shaft main body. The planetary shaft includes a planetary shaft main body and a planetary gear which is an external gear arranged on the planetary shaft main body and engaged with the sun gear. The planetary shaft main body and the planetary gear are separately formed. Rotational motion of either one of the annular shaft and the sun shaft is converted into rectilinear motion of the other one of the annular shaft and the sun shaft along an axial direction by a planetary motion of the planetary shaft. The method includes the steps of assembling a sun shaft assembly including the planetary shaft main body and the sun shaft main body before the planetary gear is attached; preparing a planetary support jig for holding the planetary shaft main body in a state substantially parallel to the sun shaft main body; and attaching the planetary gear to the planetary shaft main body of the sun shaft assembly in a state in which the sun shaft assembly is attached to the planetary support jig.

To achieve the above objects, a fifteenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. The annular shaft includes an annular shaft main body and an annular gear which is an internal gear arranged in the annular shaft main body. The planetary shaft includes a planetary shaft main body and a planetary gear which is an external gear arranged on the planetary shaft main body and engaged with the annular gear. The planetary shaft main body and the planetary gear are separately formed. Rotational motion of either one of the annular shaft and the sun shaft is converted into rectilinear motion of the other one of the annular shaft and the sun shaft along an axial direction by a planetary motion of the planetary shaft. The method includes the steps of assembling an annular shaft assembly including the planetary shaft main body and the annular shaft main body before the planetary gear is attached; preparing a planetary support jig for holding the planetary shaft main body in a state substantially parallel to the annular shaft main body; and attaching the planetary gear to the planetary shaft main body of the annular shaft assembly in a state in which the annular shaft assembly is attached to the planetary support jig.

To achieve the above objects, a sixteenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. A sun gear arranged on the sun shaft is engaged with a planetary gear arranged on the planetary shaft. Rotational motion of a first shaft which is either one of the annular shaft and the sun shaft is converted into a rectilinear motion of a second shaft which is the other one of the annular shaft and the sun shaft along an axial direction by a planetary motion of the planetary shaft. The method includes the step of combining a plurality of constituent elements that constitute the conversion mechanism while managing a rotational phase of the sun gear so that a planetary inclination which is an inclination of the planetary shaft relative to the sun shaft after the conversion mechanism is assembled is smaller than a reference inclination. When work conversion efficiency is defined as rate of work of the second shaft relative to work of the first shaft at a time when the rotational motion of the first shaft is converted into the rectilinear motion of the second shaft by the planetary motion of the planetary shaft, and a required conversion efficiency is defined as the work conversion efficiency required for the conversion mechanism, the reference inclination is a planetary inclination corresponding to the required conversion efficiency in a relationship between the planetary inclination and the work conversion efficiency.

To achieve the above objects, a seventeenth aspect of the present invention provides a method for manufacturing a rotational rectilinear motion conversion mechanism provided with an annular shaft in which an opening is formed. A sun shaft is arranged in the opening of the annular shaft. A planetary shaft is arranged near the sun shaft in the opening of the annular shaft. An annular gear arranged on the annular shaft is engaged with a planetary gear arranged on the planetary shaft. Rotational motion of a first shaft which is either one of the annular shaft and the sun shaft is converted into a rectilinear motion of a second shaft which is the other one of the annular shaft and the sun shaft along an axial direction by a planetary motion of the planetary shaft. The method includes the step of combining a plurality of constituent elements that constitute the conversion mechanism while managing a rotational phase of the annular gear so that a planetary inclination which is an inclination of the planetary shaft relative to the annular shaft after the conversion mechanism is assembled is smaller than a reference inclination. When work conversion efficiency is defined as rate of work of the second shaft relative to work of the first shaft at a time when the rotational motion of the first shaft is converted into the rectilinear motion of the second shaft by the planetary motion of the planetary shaft, and a required conversion efficiency is defined as the work conversion efficiency required for the conversion mechanism, the reference inclination is a planetary inclination corresponding to the required conversion efficiency in a relationship between the planetary inclination and the work conversion efficiency.

BRIEF DESCRIPTION OF THE DRAWINGS

FIG. 5A is a front view showing a sun shaft in the conversion mechanism of FIG. 1;

FIG. 5B is a front view showing a state in which part of the sun shaft in FIG. 5A is disassembled;

FIG. 6A is a front view showing a planetary shaft in the conversion mechanism of FIG. 1;

FIG. 6B is a front view showing a state in which part of the planetary shaft in FIG. 6A is disassembled;

FIG. 6C is a view taken along a center line of a rear planetary gear in FIG. 6A;

DETAILED DESCRIPTION OF THE PREFERRED EMBODIMENTS

A first embodiment of the present invention will now be described with reference to FIGS. 1 to 33. Hereinafter, the description will be given below in the order of the structure of a rotational rectilinear motion conversion mechanism assembled through a manufacturing method according to the present embodiment, an operation mode of the conversion mechanism and a method for manufacturing the conversion mechanism.

<Structure of Rotational Rectilinear Motion Conversion Mechanism>

Figure 1:
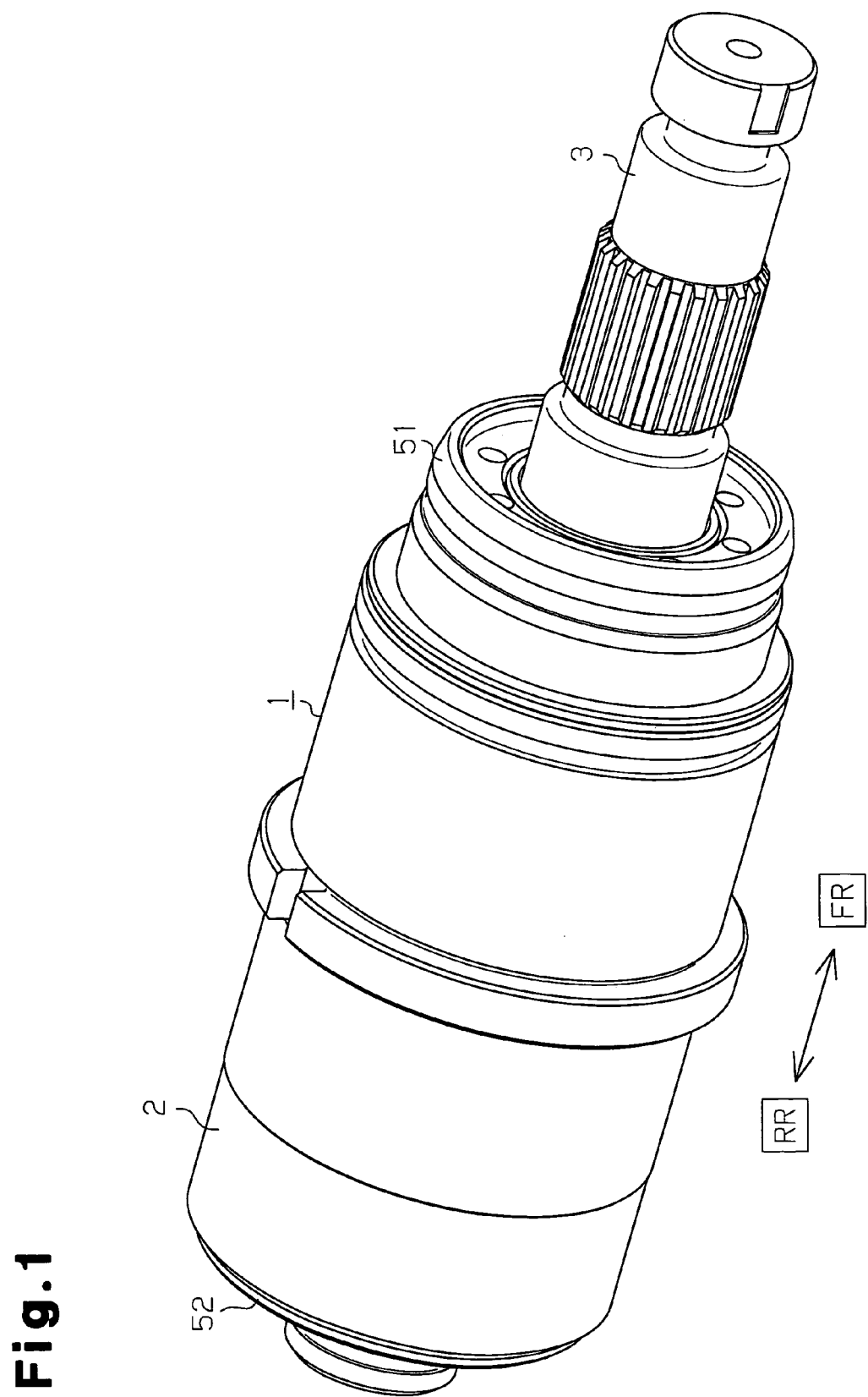
FIG. 1 is a perspective view showing a conversion mechanism in a first embodiment of a method for manufacturing a rotational rectilinear motion conversion mechanism according to the present invention.
Figure 2:
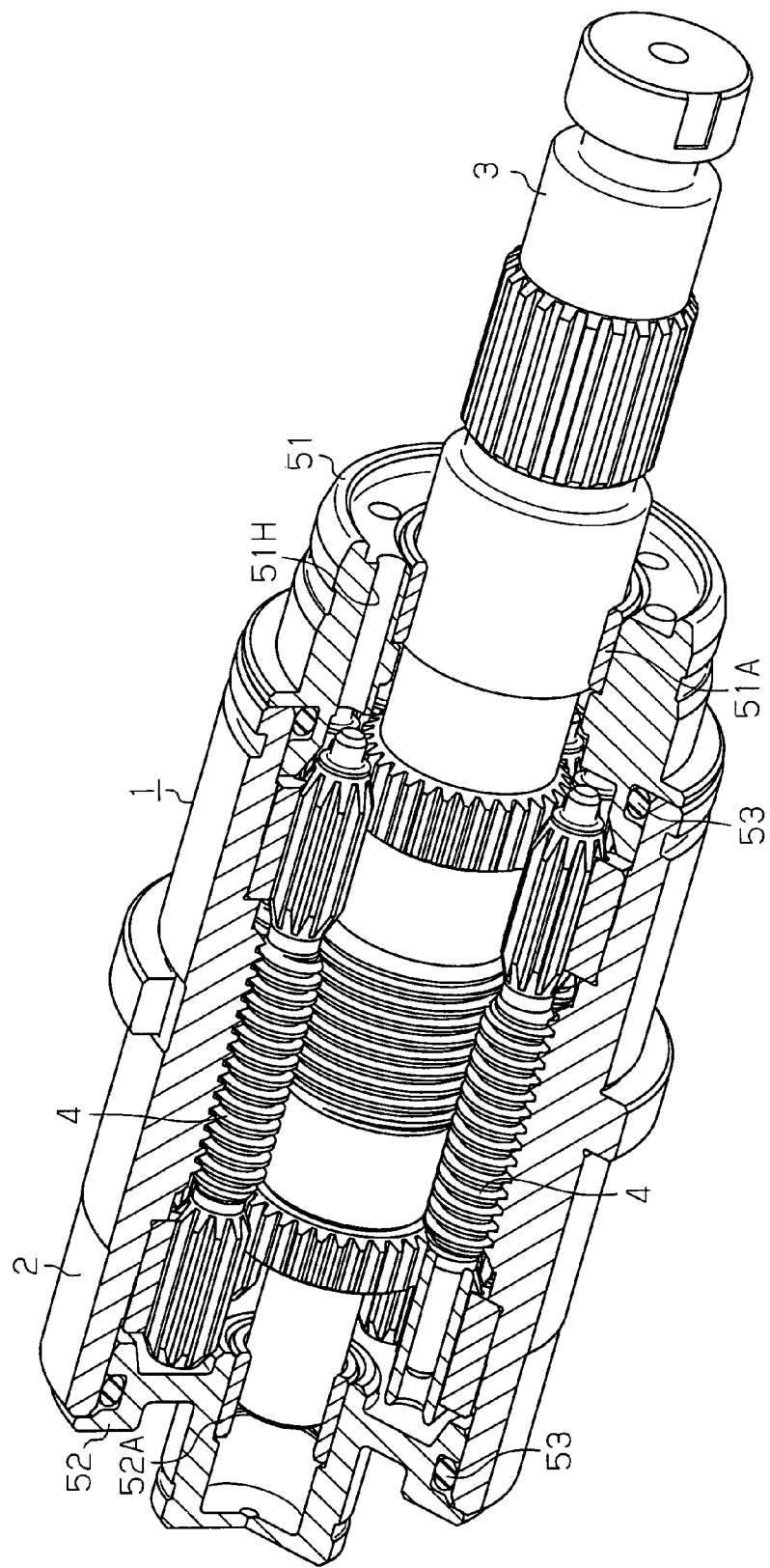
FIG. 2 is a perspective view showing an internal structure of the conversion mechanism of FIG. 1.

An outline of the structure of a rotational rectilinear motion conversion mechanism 1 will now be described with reference to FIGS. 1 and 2.

The rotational rectilinear motion conversion mechanism 1 includes a ring shaft 2 having a space extending in an axial direction in an inner portion thereof, a sun shaft 3 arranged in the inner portion of the ring shaft 2, and a plurality of planetary shafts 4 arranged around the sun shaft 3. The ring shaft 2 and the sun shaft 3 are arranged in a state where respective center lines are aligned with each other or in a state in which they are substantially aligned with each other. The sun shaft 3 and each of the planetary shafts 4 are arranged in a state in which the respective center lines are in parallel to each other or a state where they are substantially in parallel to each other. Each of the planetary shafts 4 is arranged in a uniform interval around the sun shaft 3.

In the present embodiment, with regard to each of the constituent elements of the conversion mechanism 1, an aligned attitude is set to an attitude in which its own center line is aligned with the center line of the sun shaft 3 and an attitude in which it is substantially aligned therewith. Further, a parallel attitude is set to an attitude in which its own center line becomes parallel to the center line of the sun shaft 3 and an attitude in which it becomes substantially parallel thereto. In other words, the ring shaft 2 constructs the conversion mechanism 1 in a state where it is held in the aligned attitude. Further, each of the planetary shafts 4 constructs the conversion mechanism 1 in a state where it is held in the parallel attitude.

In the conversion mechanism 1, force is transmitted from one constituent element of the ring shaft 2 and each of the planetary shafts 4 to the other constituent element by engagement between a threaded section and a gear provided in the ring shaft 2 and a threaded section and a gear provided in each of the planetary shafts 4. Further, force is transmitted from one constituent element of the sun shaft 3 and each of the planetary shafts 4 to the other constituent element by engagement between a threaded section and a gear provided in the sun shaft 3 and the thread section and the gear provided in each of the planetary shafts 4.

The conversion mechanism 1 operates as follows based on a combination of the respective constituent elements mentioned above. In other words, when one constituent element of the ring shaft 2 and the sun shaft 3 rotationally moves, each of the planetary shafts 4 carries out a planetary motion around the sun shaft 3 through the force transmitted from the constituent element. Accordingly, the constituent element moves in an axial direction with respect to each of the planetary shafts 4 through the force transmitted to the other constituent element of the ring shaft 2 and the sun shaft 3 from each of the planetary shafts 4.

As mentioned above, the conversion mechanism 1 converts rotational motion of one of the ring shaft 2 and the sun shaft 3 into a rectilinear motion of the other of the ring shaft 2 and the sun shaft 3. In this case, in the present embodiment, with regard to the axial direction of the sun shaft 3, a front direction FR is set to a direction in which the sun shaft 3 is pushed out of the ring shaft 2, and a rear direction RR is set to a direction in which the sun shaft 3 is pulled into the ring shaft 2. Further, when using a certain position of the conversion mechanism 1 as a reference, a front side is defined by the range closer to the front direction FR than the reference position, and a rear side is defined by the range closer to the rear direction RR than the reference position.

A front collar 51 and a rear collar 52 supporting the sun shaft 3 are fixed to the ring shaft 2. In other words, the ring shaft 2, and the front collar 51 and the rear collar 52 integrally move. In the ring shaft 2, an opening portion in the front side is closed by the front collar 51. Further, an opening portion in the rear side is closed by the rear collar 52.

The sun shaft 3 is supported by a bearing 51A of the front collar 51 and a bearing 52A of the rear collar 52. On the other hand, each of the planetary shafts 4 is not supported by any one of the front collar 51 and the rear collar 52. In other words, in the conversion mechanism 1, a position in a radial direction of the sun shaft 3 is constrained by the engagement between the threaded section and the gear, and the front collar 51 and the rear collar 52, and a position in the radial direction of each of the planetary shafts 4 is constrained by the engagement between the threaded section and the gear.

The conversion mechanism 1 employs the following structure for lubricating an inner portion of the ring shaft 2 (position where the threaded section and the gears of the ring shaft 2, the sun shaft 3 and each of the planetary shafts 4 are engaged). In other words, a plurality of oil holes 51H for supplying a lubricating oil to the inner portion of the ring shaft 2 are formed in the front collar 51. Further, an O-ring 53 sealing the inner portion of the ring shaft 2 is installed to each of the front collar 51 and the rear collar 52.

Figure 3A:
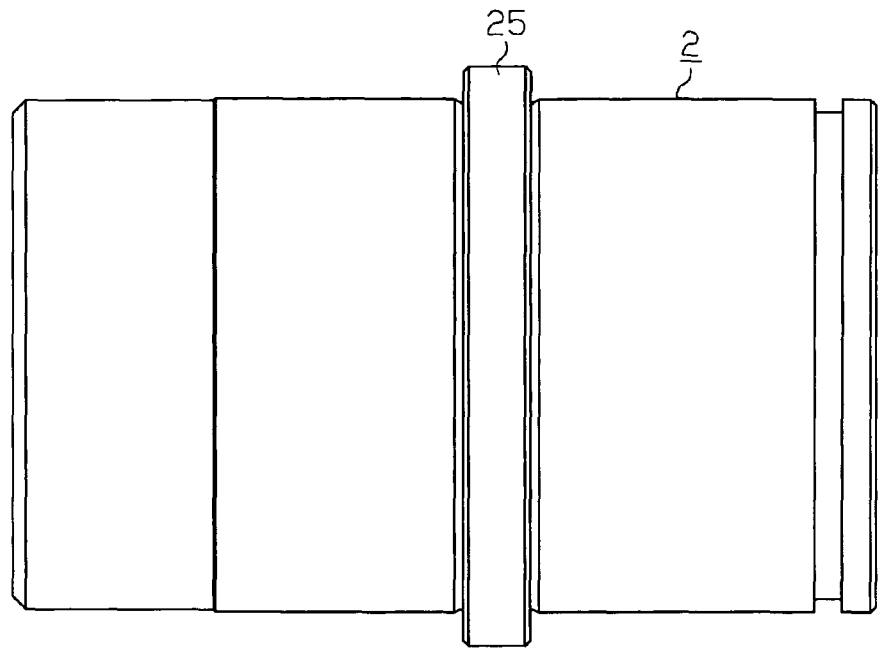
FIG. 3A is a front view showing a ring shaft in the conversion mechanism of FIG. 1.
Figure 3B:
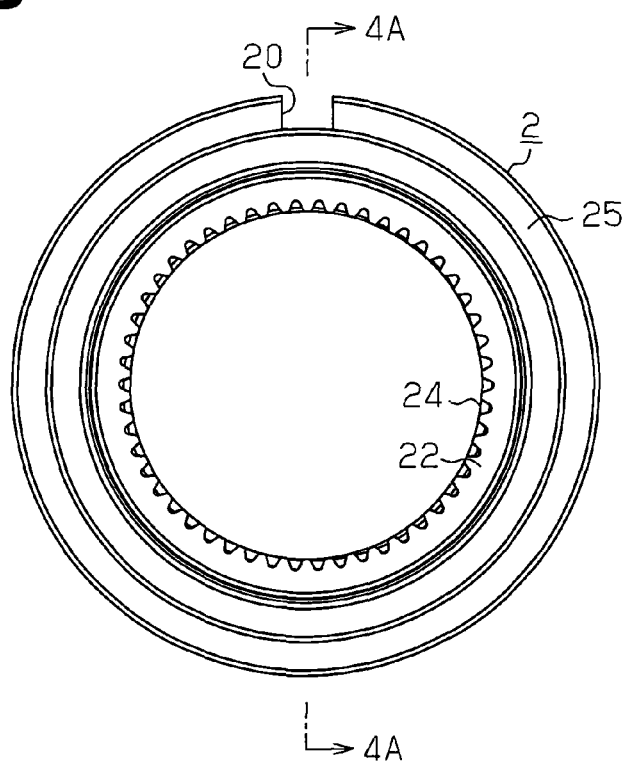
FIG. 3B is a plan view of FIG. 3A.
Figure 4A:
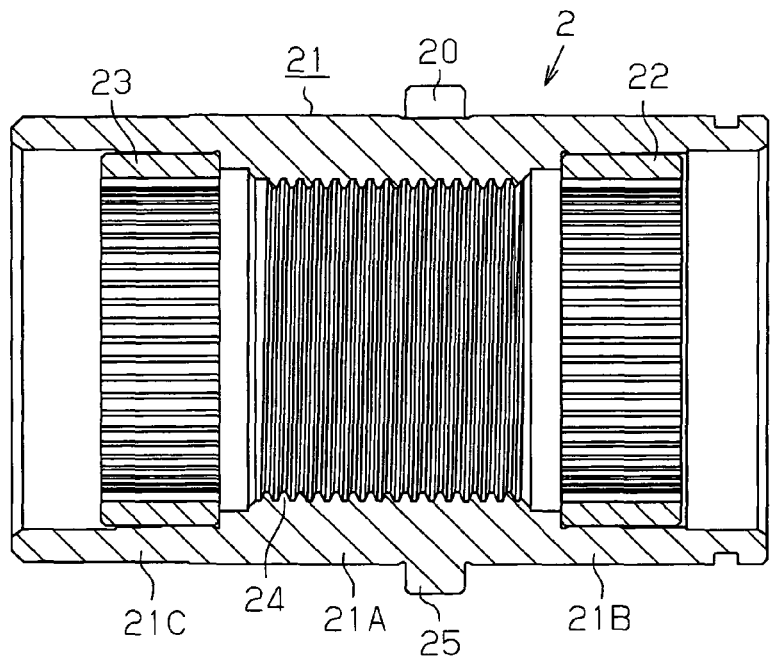
FIG. 4A is a cross-sectional view taken along line 4A-4A in FIG. 3 of the ring shaft in the conversion mechanism of FIG. 1.
Figure 4B:
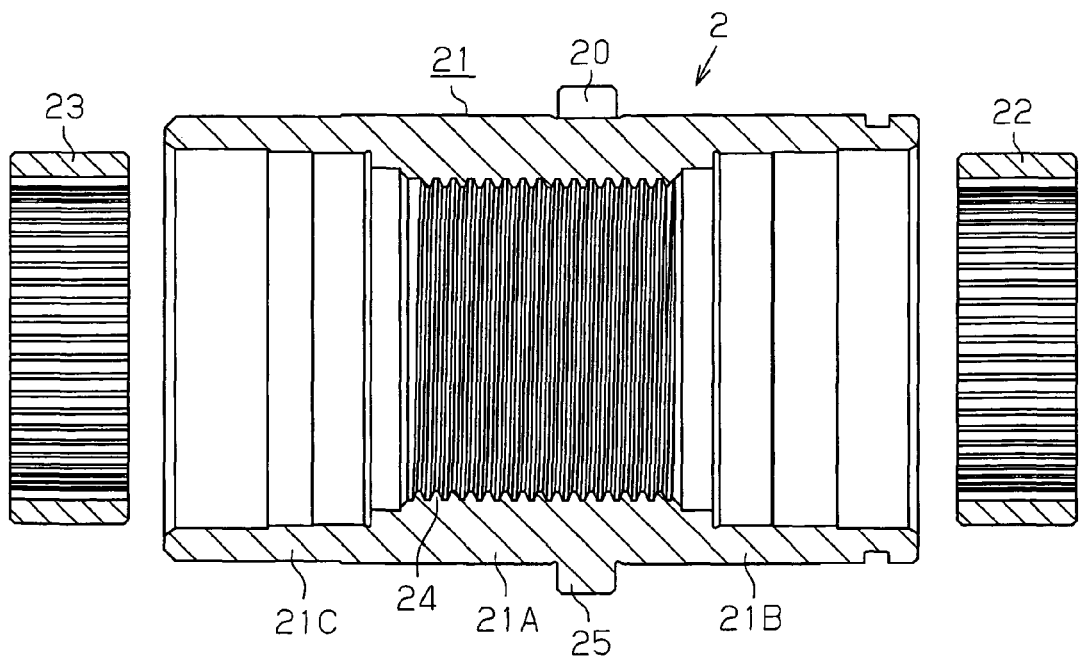
FIG. 4B is a cross-sectional view showing a state in which part of the ring shaft in FIG. 1 is disassembled.
Figure 7:
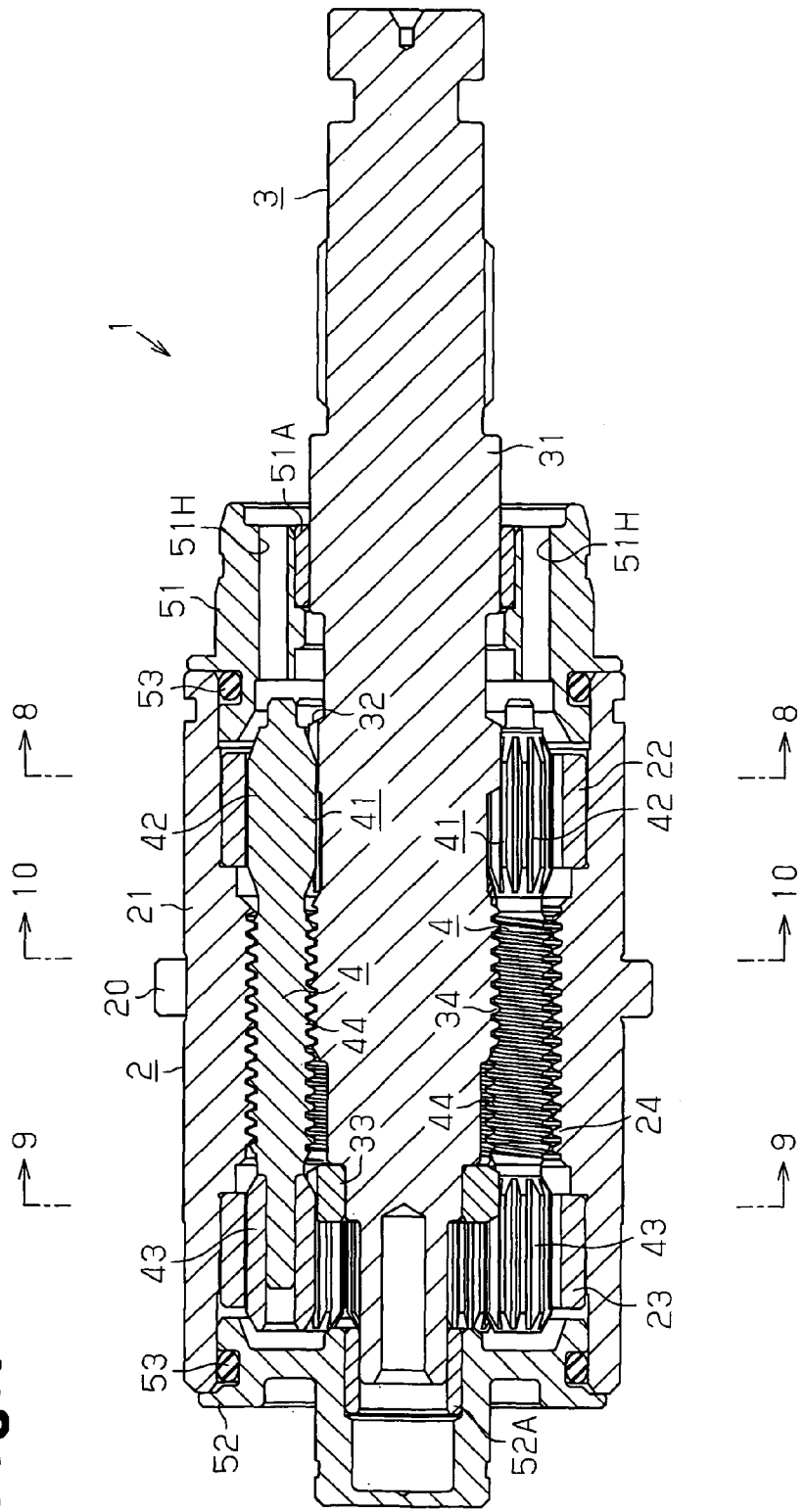
FIG. 7 is a cross-sectional view taken along a center line of the conversion mechanism of FIG. 1.
Figure 8:
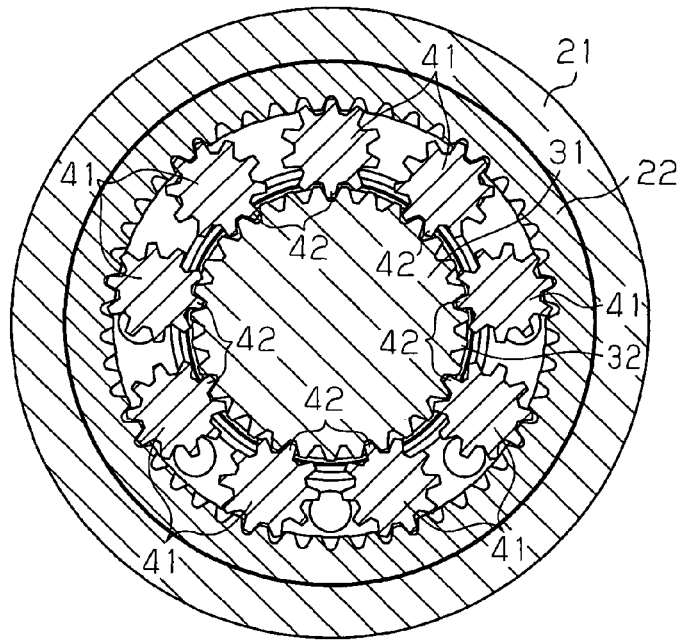
FIG. 8 is a cross-sectional view taken along line 8-8 in FIG. 7 of the conversion mechanism of FIG. 1.
Figure 9:
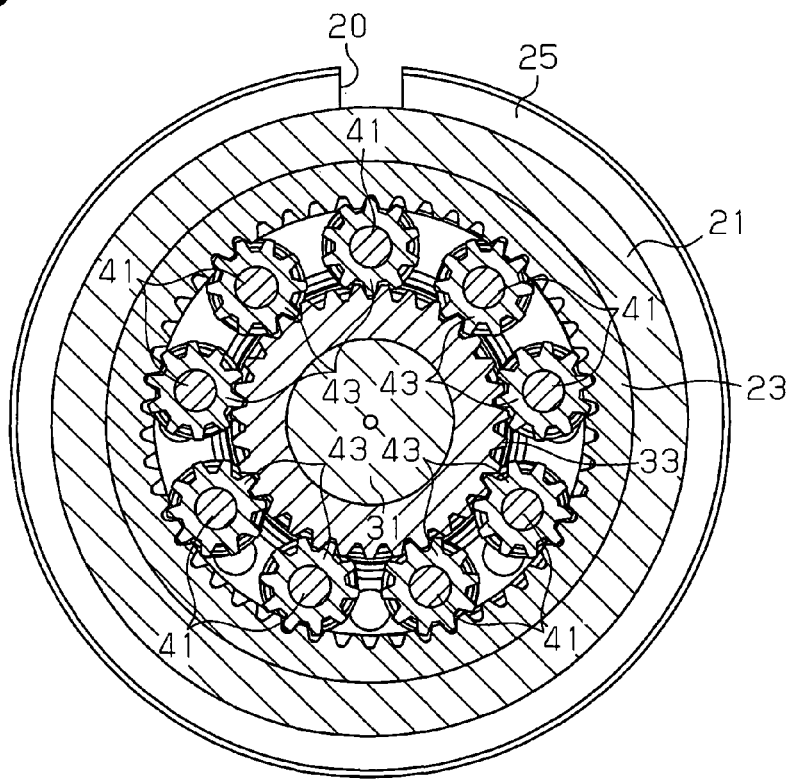
FIG. 9 is a cross-sectional view taken along line 9-9 in FIG. 7 of the conversion mechanism of FIG. 1.
Figure 10:
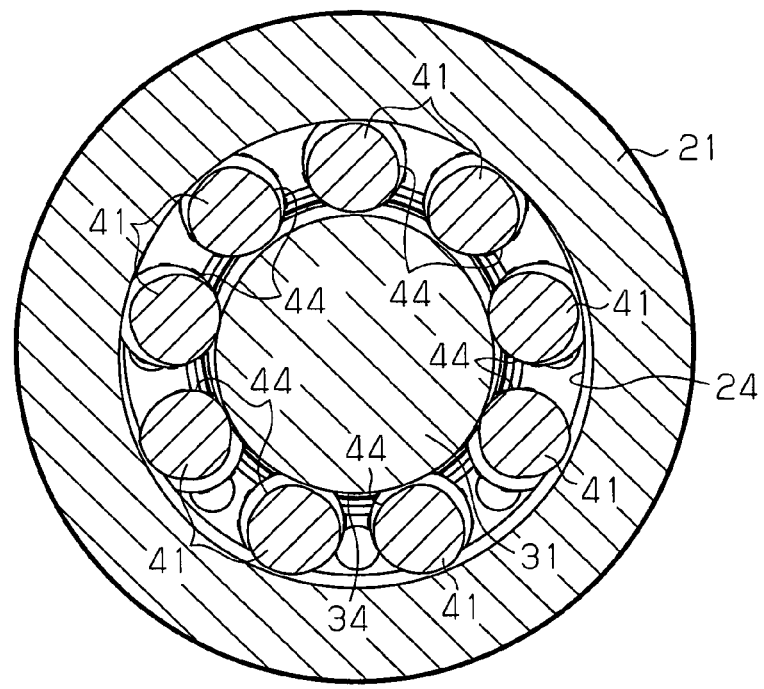
FIG. 10 is a cross-sectional view taken along line 10-10 in FIG. 7 of the conversion mechanism of FIG. 1.
Figure 11:
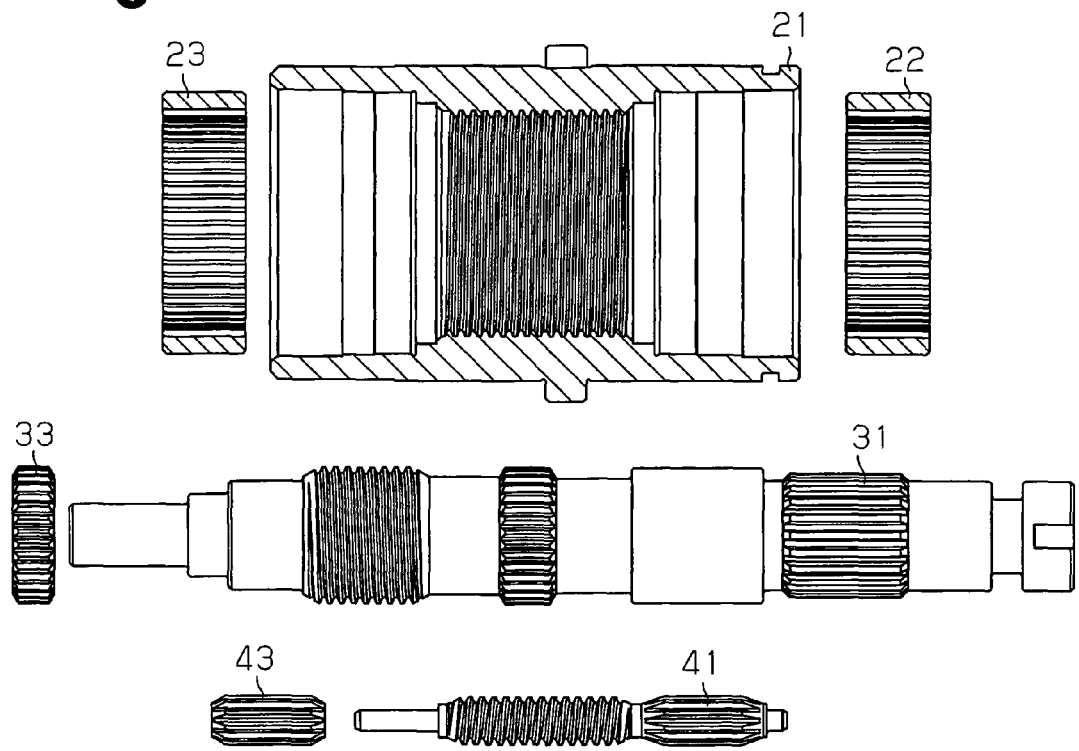
FIG. 11 is a process chart of a process I in a method for manufacturing the conversion mechanism of FIG. 1.
Figure 12:
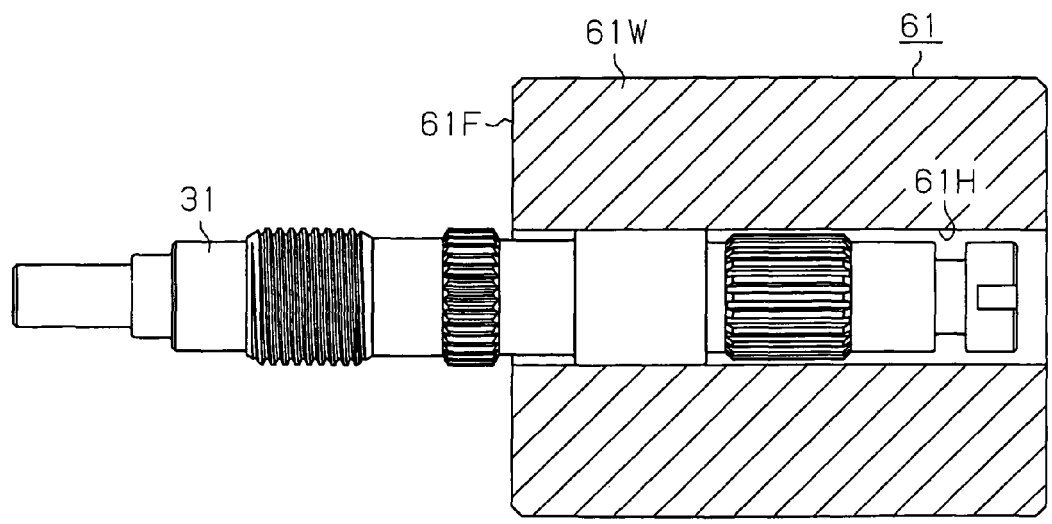
FIG. 12 is a process chart of a process J in the method for manufacturing the conversion mechanism of FIG. 1.

A description will be given of a structure of the ring shaft 2 with reference to FIGS. 3 and 4.

The ring shaft 2 includes a ring shaft main body 21 (annular shaft main body), a front ring gear 22, and a rear ring gear 23. In the ring shaft 2, a center line (axis) of the ring shaft main body 21 corresponds to a center line (axis) of the ring shaft 2. Accordingly, an aligned attitude of the ring shaft 2 is secured at a time when the center line of the ring shaft main body 21 is aligned with the center line of the sun shaft 3 or is substantially aligned therewith.

The ring shaft main body 21 includes a main body threaded portion 21A in which internal threads (annular threaded section 24) are formed in an inner circumferential surface, a main body gear portion 21B in which the front ring gear 22 is assembled, a main body gear portion 21C in which the rear ring gear 23 is assembled, and a flange 25 formed in an outer circumference.

The front ring gear 22 is formed as a spur tooth internal gear independently from the ring shaft main body 21. Further, it is structured such that its own center line is aligned with the center line of the ring shaft main body 21 at a time of being assembled in the ring shaft main body 21. With regard to an assembling mode of the front ring gear 22 with respect to the ring shaft main body 21, the present embodiment is structured such that the front ring gear 22 is fixed to the ring shaft main body 21 in accordance with a press fitting. In this case, the front ring gear 22 may be fixed to the ring shaft main body 21 in accordance with the other method than the press fitting.

The rear ring gear 23 is formed as a spur tooth internal gear independently from the ring shaft main body 21. Further, it is structured such that its own center line is aligned with the center line of the ring shaft main body 21 at a time of being assembled in the ring shaft main body 21. With regard to an assembling mode of the rear ring gear 23 with respect to the ring shaft main body 21, the present embodiment is structured such that the rear ring gear 23 is fixed to the ring shaft main body 21 in accordance with a press fitting. In this case, the rear ring gear 23 may be fixed to the ring shaft main body 21 in accordance with the other method than the press fitting.

The flange 25 is integrally formed with the ring shaft 21 so as to be formed as an annular shape. Further, a notch (annular indicator 20) is formed as an indicator for comprehending a rotational phase of the annular threaded section 24 is formed in part of the flange. The annular threaded section 24 is formed in the ring shaft main body 21 based on the annular indicator 20.

In the ring shaft 2, the front ring gear 22 and the rear ring gear 23 are formed as a gear having the same shape. In other words, data (reference pitch circle diameter, the number of teeth and the like) of the front ring gear 22 and the rear ring gear 23 is set to an equal value to each other.

A description will be given of a structure of the sun shaft 3 with reference to FIG. 5.

The sun shaft 3 includes a sun shaft main body 31 (main body of a sun shaft) and a rear sun gear 33. In the sun shaft 3, a center line (axis) of the sun shaft main body 31 corresponds to a center line (axis) of the sun shaft 3.

The sun shaft main body 31 includes a main body threaded portion 31A in which external threads (sun threaded section 34) are formed in an outer circumferential surface, a main body gear portion 31B in which a spur tooth external gear (front sun gear 32) is formed, and a main body gear portion 31C in which a rear sun gear 33 is assembled. Further, a groove (sun indicator 30) is formed as an indicator for comprehending a rotational phase of a sun threaded section 34 in a distal end portion (main body leading portion 31D) of the sun shaft main body 31. The front sun gear 32 and the sun gear 34 are formed based on the sun indicator 30.

The rear sun gear 33 is formed as a spur tooth external gear independently from the sun shaft main body 31. Further, it is structured such that its own center line is aligned with the center line of the sun shaft main body 31 at a time of being assembled in the sun shaft main body 31. With regard to an assembling mode of the rear sun gear 33 with respect to the sun shaft main body 31, the present embodiment is structured such that the rear sun gear 33 is fixed to the sun shaft main body 31 in accordance with a press fitting. In this case, the rear sun gear 33 may be fixed to the sun shaft main body 31 in accordance with the other method than the press fitting.

In the sun shaft 3, the front sun gear 32 and the rear sun gear 33 are formed as a gear having the same shape. In other words, data (reference pitch circle diameter, the number of teeth and the like) of the front sun gear 32 and the rear sun gear 33 is set to an equal value to each other.

A description will be given of a structure of the planetary shaft 4 with reference to FIG. 6.

The planetary shaft 4 includes a planetary shaft main body 41 (main body of a planetary shaft) and a rear planetary gear 43. In the planetary shaft 4, a center line (axis) of the planetary shaft main body 41 corresponds to a center line (axis) of the planetary shaft 4. Accordingly, a parallel attitude of the planetary shaft 4 is secured at a time when the center line of the planetary shaft main body 41 is in parallel to the center line of the sun shaft 3 or is substantially in parallel thereto.

The planetary shaft main body 41 includes a main body threaded portion 41A in which external threads (planetary threaded section 44) are formed on an outer circumferential surface, a main body gear portion 41B in which a spur tooth external gear (front planetary gear 42) is formed, a rear shaft 41R in which a rear planetary gear 43 is assembled, and a front shaft 41F fitted to a jig at a time of assembling the conversion mechanism 1. In this case, in the planetary shaft main body 41, a portion from an end portion of the front planetary gear 42 to a distal end (front distal end portion 41T) in a front of the planetary shaft main body 41 is formed as the front shaft 41F.

The rear planetary gear 43 is formed as a spur tooth external gear independently from the planetary shaft main body 41. Further, it is assembled in the planetary shaft main body 41 by a rear shaft 41R of the planetary shaft main body 41 being inserted to a bearing hole 43H. Further, it is structured such that its own center line is aligned with the center line of the planetary shaft main body 41 in a state of being assembled in the planetary shaft main body 41.

With regard to an assembling mode of the rear planetary gear 43 with respect to the planetary shaft main body 41, the present embodiment employs a free fit in such a manner that the rear planetary gear 43 can relatively rotate with respect to the planetary shaft main body 41. In this case, it is possible to employ the other assembling modes than the free fit, as an assembling mode for obtaining a relative rotation between the planetary shaft main body 41 and the rear planetary gear 43.

In the planetary shaft 4, the front planetary gear 42 and the rear planetary gear 43 are formed as a gear having the same shape. In other words, data (reference pitch circle diameter, the number of teeth and the like) of the front planetary gear 42 and the rear planetary gear 43 is set to an equal value to each other.

A description will be given of a relation between the constituent elements in the conversion mechanism 1 with reference to FIGS. 7 to 10. In this case, there is exemplified the conversion mechanism 1 structured such that nine planetary shafts 4 are provided, however, the arranged number of the planetary shaft 4 can be appropriately changed.

In the conversion mechanism 1, an operation of each of the constituent elements is allowed or limited as described below.

(a) In the ring shaft 2, the relative rotation is disabled between the ring shaft main body 21, the front ring gear 22 and the rear ring gear 23. Further, the relative rotation is disabled between the ring shaft main body 21, the front collar 51 and the rear collar 52.

(b) In the sun shaft 3, the relative rotation is disabled between the sun shaft main body 31 and the rear sun gear 33.

(c) In the planetary shaft 4, the relative rotation is allowed between the planetary shaft main body 41 and the rear planetary gear 43.

In the conversion mechanism 1, the force is transmitted between the constituent elements through the engagement of the threaded sections and the gears between the ring shaft 2, the sun shaft 3 and each of the planetary shafts 4.

In the ring shaft 2 and each of the planetary shafts 4, the annular threaded section 24 of the ring shaft main body 21 is engaged with the planetary threaded section 44 of each of the planetary shaft main bodies 41. Further, the front ring gear 22 of the ring shaft main body 21 is engaged with the front planetary gear 42 of each of the planetary shaft main bodies 41. Further, the rear ring gear 23 of the ring shaft main body 21 is engaged with the rear planetary gear 43 of each of the planetary shaft main bodies 41.

Accordingly, when the rotational motion is input to one of the ring shaft 2 and each of the planetary shafts 4, the force is transmitted to the other of the ring shaft 2 and each of the planetary shafts 4 through the engagement between the annular threaded section 24 and the planetary threaded section 44, the engagement between the front ring gear 22 and the front planetary gear 42, and the engagement between the rear ring gear 23 and the rear planetary gear 43.

In the sun shaft 3 and each of the planetary shafts 4, the sun threaded section 34 of the sun shaft main body 31 is engaged with the planetary threaded section 44 of each of the planetary shaft main bodies 41. Further, the front sun gear 32 of the sun shaft main body 31 is engaged with the front planetary gear 42 of each of the planetary shaft main bodies 41. Further, the rear sun gear 33 of the sun shaft main body 31 is engaged with the rear planetary gear 43 of each of the planetary shaft main bodies 41.

Accordingly, when the rotational motion is input to one of the sun shaft 3 and each of the planetary shafts 4, the force is transmitted to the other of the sun shaft 3 and each of the planetary shafts 4 through the engagement between the sun threaded section 34 and the planetary threaded section 44, the engagement between the front sun gear 32 and the front planetary gear 42, and the engagement between the rear sun gear 33 and the rear planetary gear 43.

As mentioned above, the conversion mechanism 1 is structured such as to be provided with a speed reducing mechanism formed by the annular threaded section 24 of the ring shaft 2, the sun threaded section 34 of the sun shaft 3, and the planetary threaded section 44 of each of the planetary shafts 4, a speed reducing mechanism formed by the front ring gear 22, the front sun gear 32 and each of the front planetary gears 42, and a speed reducing mechanism formed by the rear ring gear 23, the rear sun gear 33 and each of the rear planetary gears 43.

<Operating Mode of Rotational Rectilinear Motion Conversion Mechanism>

In the rotational rectilinear motion conversion mechanism 1, an operating method (motion converting method) for converting the rotational motion into the rectilinear motion is determined by a set mode of the number of teeth in each of the gears and the number of grooves in each of the threaded sections. In other words, it is possible to select any one of a sun shaft displacing method of linearly moving the sun shaft 3 with the rotational motion of the ring shaft 2, and an annular shaft displacing method of linearly moving the ring shaft 2 with the rotational motion of the sun shaft 3, as the motion converting method. A description will be given below of the operating mode of the conversion mechanism 1 in each of the motion converting methods.

(A) In the case that the sun shaft displacing method is employed as the motion converting method, the motion is converted from the rotational motion to the rectilinear motion as follows. In other words, when the rotational motion is input to the ring shaft 2, the force is transmitted from the ring shaft 2 to each of the planetary shafts 4 through the engagement between the front ring gear 22 and each of the front planetary gears 42, the engagement between the rear ring gear 23 and each of the rear planetary gears 43, and the engagement between the annular threaded section 24 and each of the planetary threaded sections 44, whereby each of the planetary shafts 4 revolving around the sun shaft 3 while rotating on its axis. Further, since the force is transmitted from each of the planetary shafts 4 to the sun shaft 3 through the engagement between each of the front planetary gears 42 and the front sun gear 32, the engagement between each of the rear planetary gears 43 and the rear sun gear 33, and the engagement between each of the planetary threaded sections 44 and the sun threaded section 34, in accordance with the planetary motion of the planetary shaft 4, the sun shaft 3 displaces in the axial direction.

(B) In the case where the annular shaft displacing method is employed as the motion converting method, the motion is converted from the rotational motion to the rectilinear motion as follows. In other words, when the rotational motion is input to the sun shaft 3, the force is transmitted from the sun shaft 3 to each of the planetary shafts 4 through the engagement between the front sun gear 32 and each of the front planetary gears 42, the engagement between the rear sun gear 33 and each of the rear planetary gears 43, and the engagement between the sun threaded section 34 and each of the planetary threaded sections 44, whereby each of the planetary shafts 4 revolves around the sun shaft 3 while rotating on its own axis. Further, since the force is transmitted from each of the planetary shafts 4 to the ring shaft 2 through the engagement between each of the front planetary gears 42 and the front ring gear 22, the engagement between each of the rear planetary gears 43 and the rear ring gear 23, and the engagement between each of the planetary threaded sections 44 and the annular threaded section 24, the ring shaft 2 displaces in the axial direction.

<Method for Manufacturing Rotational Rectilinear Motion Conversion Mechanism>

A description will be given of a method for manufacturing the rotational rectilinear motion conversion mechanism 1 with reference to FIGS. 11 to 33. Here is assumed the conversion mechanism 1 structured such as to be provided with nine planetary shafts 4. Further, with regard to each of the constituent elements of the conversion mechanism 1, a rotational phase is shown by a position in the rotational direction based on each of the center lines, that is, a phase in the rotational direction based on each of the center lines.

The manufacturing method according to the present embodiment is roughly divided into processes (processes A to H) of manufacturing each of the constituent elements of the conversion mechanism 1 and processes (processes I to S) of assembling the conversion mechanism 1 by assembling the constituent elements.

In the manufacturing method according to the present embodiment, each of the constituent elements of the conversion mechanism 1 is manufactured by including the following processes A to H.

[process A] The process manufactures the ring shaft main body 21 (the basic ring shaft main body) in a state in which the annular threaded section 24 is not formed.

[process B] The process forms the annular indicator 20 in the flange 25 of the basic ring shaft main body. In this case, the process A may manufacture the basic ring shaft main body including the annular indicator 20.

[process C] The process forms the annular threaded section 24 by threading the basic ring shaft main body using the annular indicator 20 as a reference. Accordingly, since a rotational phase of the annular indicator 20 and a rotational phase of the annular threaded section 24 are set to a fixed relation, it is possible to comprehend the rotational phase of the annular threaded section 24 based on the annular indicator 20.

[process D] The process manufactures the sun shaft main body 31 (the basic sun shaft main body) in a state in which the sun threaded section 34 and the front sun gear 32 are not formed.

[process E] The process forms the sun indicator 30 in the main body distal end portion 31D of the basic sun shaft main body.

[process F] The process forms the front sun gear 32 and the sun threaded section 34 in the basic sun shaft main body by performing threading using the sun indicator 30 as a reference. Accordingly, since the rotational phase of the sun indicator 30 and the rotational phase of the front sun gear 32 and the sun threaded section 34 are set to a fixed relation, it is possible to comprehend the rotational phase of the front sun gear 32 and the sun threaded section 34 based on the sun indicator 30. In this case, during the threading, it is possible to employ the method of simultaneously threading the front sun gear 32 and the sun threaded section 34 or the method of separately threading the front sun gear 32 and the sun threaded section 34.

[process G] The process manufactures the planetary shaft main body 41 (the basic planetary shaft main body) in a state in which the planetary threaded section 44 and the front planetary gear 42 are not formed.

[process H] The process rolls the planetary threaded section 44 and the front planetary gear 42 in the basic planetary shaft main body. At this time, in order to make the relation between the rotational phase of the front planetary gear 42 and the rotational phase of the planetary threaded section 44 identical in all the planetary shaft main body 41, the front planetary gear 42 and the planetary threaded section 44 are simultaneously form rolled. In the case that it is possible to make the relation between the rotational shape of the front planetary gear 42 and the rotational phase of the planetary threaded section 44 identical in all the planetary shaft main body 41, it is possible to employ the method of separately threading the front planetary gear 42 and the planetary threaded section 44.

In the manufacturing method according to the present embodiment, the assembly of the conversion mechanism 1 including the following processes I to S is carried out after passing through the process of manufacturing each of the constituent elements mentioned above.

[process I (FIG. 11)] The process washes each of the constituent elements including the ring shaft main body 21, the sun shaft main body 31, the planetary shaft main body 41, the front ring gear 22, the rear ring gear 23, the rear sun gear 33 and the rear planetary gear 43.

[process J (FIG. 12)] The process attaches the sun shaft main body 31 to a first jig 61.

Figure 13A:
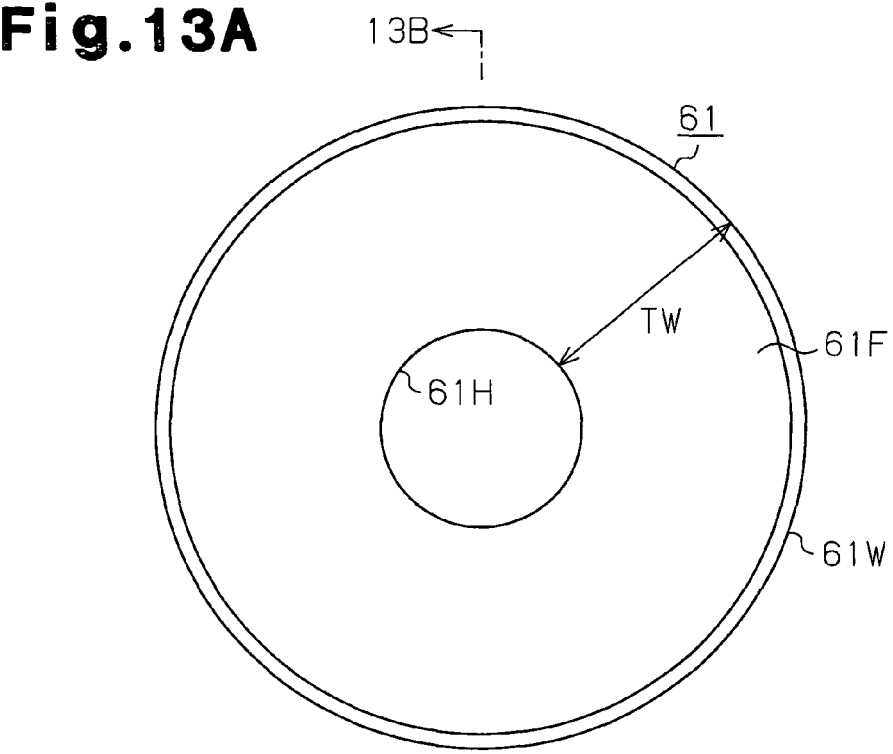
FIG. 13A is a plan view showing a first jig used in the method for manufacturing the conversion mechanism of FIG. 1.
Figure 13B:
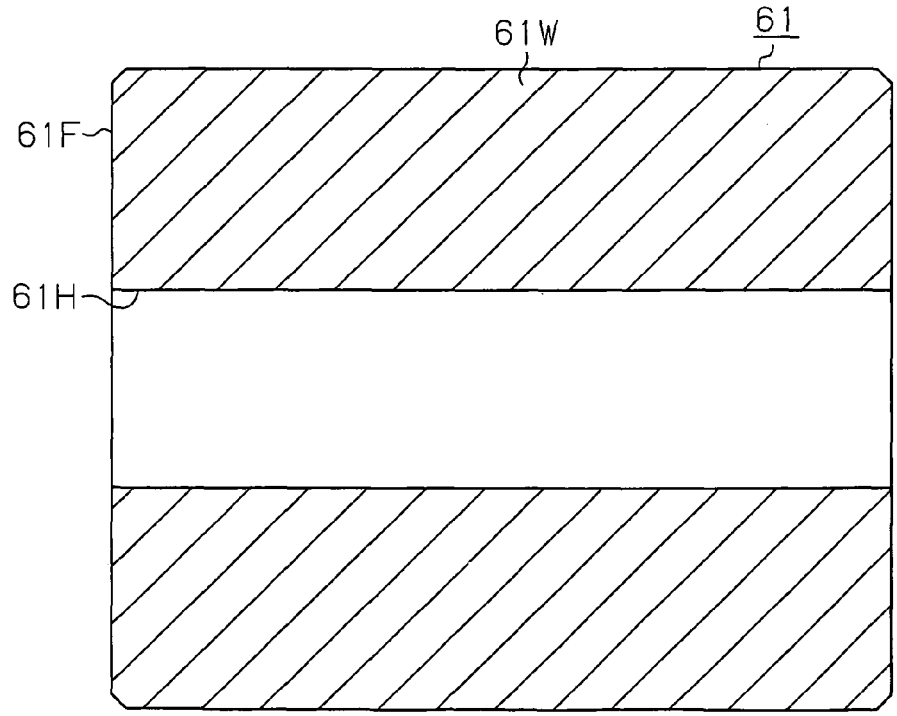
FIG. 13B is a cross-sectional view taken along line 13B-13B in FIG. 13.
Figure 14:
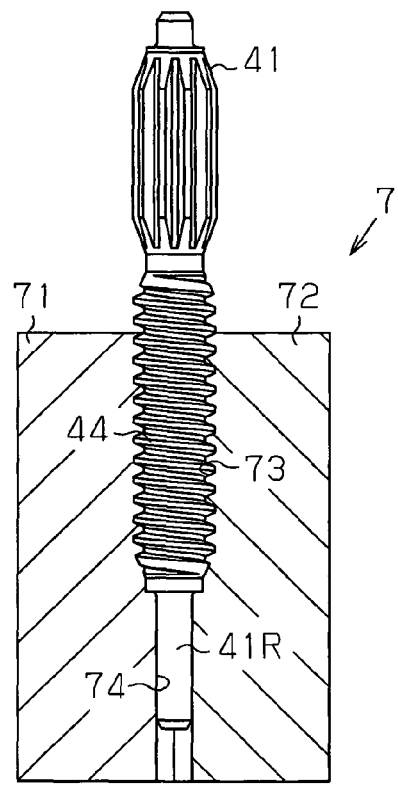
FIG. 14 is a process chart of a process K in the method for manufacturing the conversion mechanism of FIG. 1.

A description will be given of a structure of the first jig 61 with reference to FIG. 13.

The first jig 61 is structured such that the sun shaft main body 31 can be fixed to the first jig 61 in a state in which the sun shaft main body 31 is inserted to a bearing hole 61H. Further, with regard to a jig peripheral wall 61W forming the bearing hole 61H, a length (peripheral wall thickness TW) in a direction which is orthogonal to a center line of the bearing hole 61H is set as follows. In other words, the peripheral wall thickness TW is set such that the front distal end portion 41T can come into contact with an end surface (jig end surface 61F) of the jig peripheral wall 61W at a time of arranging the planetary shaft main body 41 so as to be spaced at a fixed interval in a radial direction with respect to the sun shaft main body 31, in a state in which the center line of the sun shaft main body 31 becomes parallel to the center line of the planetary shaft main body 41.

In the process J, the sun shaft main body 31 is specifically attached to the first jig 61 through the following operations (a) and (b).

(a) In the sun shaft main body 31, the portion positioned closer to the front than the front sun gear 32 in the sun shaft main body 31 is inserted to the bearing hole 61H.

(b) The sun shaft main body 31 is fixed to the first jig 61.

[process K (FIG. 14)] The process sets the rotational phase with respect to a threaded jig 7 to the identical rotational phase in all the planetary shaft main bodies 41, by attaching each of the planetary shaft main bodies 41 to the threaded jig 7, as a preparation for assembling an assembly (first assembly 91 (basic assembly)) formed by a combination of the sun shaft main body 31 and the planetary shaft main body 41 in a first assembly state (normal assembly state). In this case, the first assembly state means a state where there are obtained an engagement between the front sun gear 32 and each of the front planetary gears 42 and an engagement between the sun threaded section 34 and each of the planetary threaded sections 44, in a state in which the planetary shaft main bodies 41 are arranged around the sun shaft main body 31 so as to be spaced at a uniform interval.

Figure 15A:
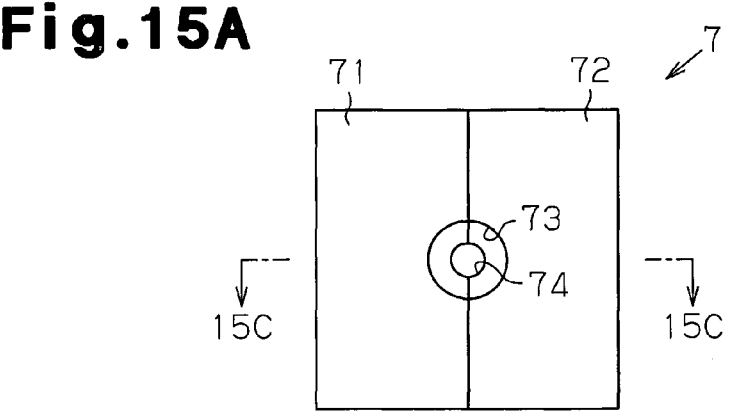
FIG. 15A is a plan view showing a threaded jig in the method for manufacturing the conversion mechanism of FIG. 1.
Figure 15B:
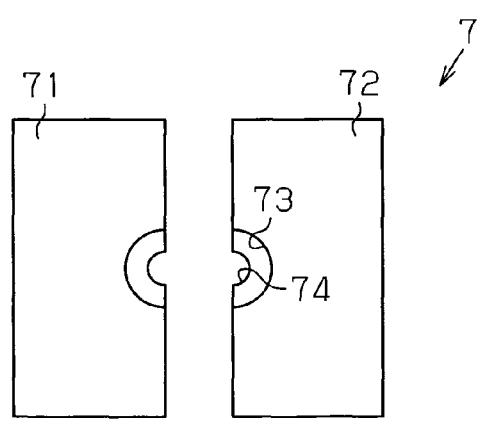
FIG. 15B is a plan view showing a state in which the threaded jig in FIG. 15A is separated into each of separated bodies.
Figure 15C:
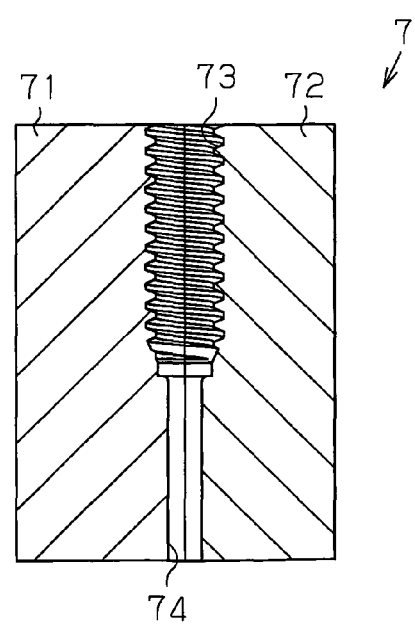
FIG. 15C is a cross-sectional view taken along line 15C-15C in FIG. 15 of the threaded jig in FIG. 15A.
Figure 16:
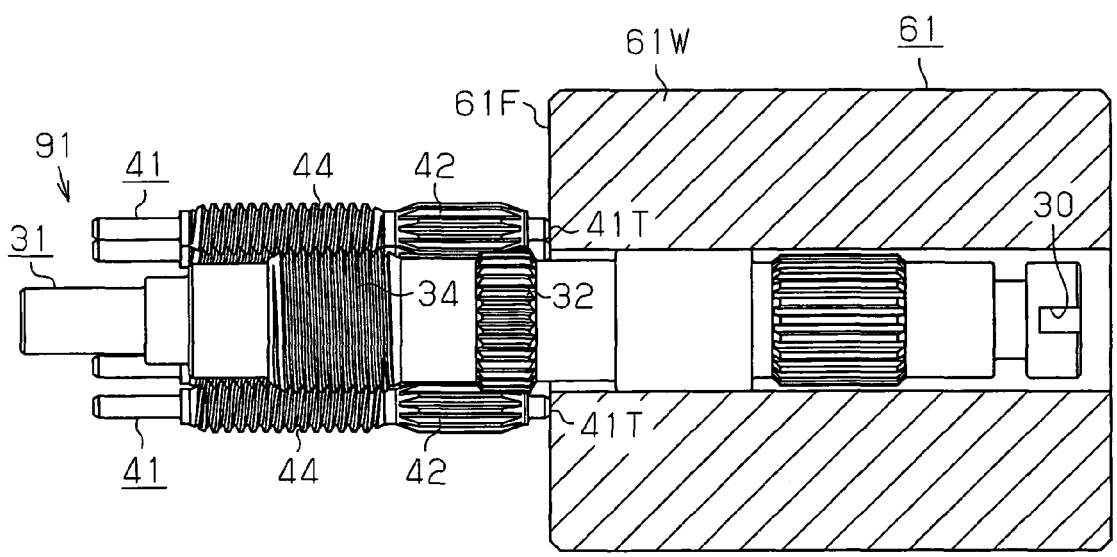
FIG. 16 is a process chart of a process L in the method for manufacturing the conversion mechanism of FIG. 1.

A description will be given of a structure of the threaded jig 7 with reference to FIG. 15.

The threaded jig 7 includes a first divided body 71 and a second divided body 72. Further, an internally threaded section 73 engaging with the planetary threaded section 44 of the planetary shaft main body 41 and an insertion hole 74 for inserting the rear shaft 41R are formed over the first divided body 71 and the second divided body 72. In other words, it is possible to detach the planetary shaft main body 41 from the threaded jig 7 in a state holding the rotational phase, by dividing the first divided body 71 and the second divided body 72 in a state in which the planetary shaft main body 41 is fastened to the internally threaded section 73.

The process K specifically sets the rotational phases of all the planetary shaft main bodies 41 with respect to the threaded jig 7 to the identical rotational phase through the following operations (a) and (b).

(a) The threaded jig 7 in the state where the first divided body 71 and the second divided body 72 are combined is prepared per the planetary shaft main body 41. At this time, each of the threaded jigs 7 is arranged in such a manner that the center line of the planetary shaft main body 41 becomes parallel to the center line of the sun shaft main body 31 of the first assembly 91 in the state where the planetary shaft main body 41 is fastened to the internally threaded section 73.

(b) The planetary threaded section 44 is fastened to the internally threaded section 73 until the main body threaded portion 41A of the planetary shaft main body 41 abuts part of the threaded jig 7. In the manufacturing method according to the present embodiment, nine threaded jigs 7 can be obtained, to each of which one planetary shaft main body 41 is fastened in accordance with this work.

[process L (FIG. 16)] The process assembles an assembly (first assembly 91) formed by a combination of the sun shaft main body 31 in the first assembled state and the planetary shaft main body 41. In other words, the first assembly is assembled by engaging the front sun gear 32 of the sun shaft main body 31 with the sun gear 34, and engaging the front planetary gear 42 of each of the planetary shaft main bodies 41 with the planetary threaded section 44.

In this case, as a factor indicating the relation of the planetary shaft main body 41 with respect to the sun shaft main body 31, "circumferential relative position MR", "radial relative position ML", "axial relative position MS" and "planetary shaft relative phase MP" are respectively defined as follows.

A circumferential relative position MR is defined by a position in a circumferential direction of the planetary shaft main body 41 with respect to the sun shaft main body 31.

A radial relative position ML is defined by a position in a radial direction of the planetary shaft main body 41 with respect to the sun shaft main body 31.

An axial relative position MS is defined by a position in an axial direction of the planetary shaft main body 41 with respect to the sun shaft main body 31.

A planetary shaft relative phase MP is defined by the rotational phase of the planetary shaft main body 41 with respect to the rotational phase of the sun shaft main body 31.

Further, "circumferential relative position MR", "radial relative position ML", "axial relative position MS" and "planetary shaft relative phase MP" in the first assembly 91 are respectively defined as follows.

A circumferential regular position XR is defined by the circumferential relative position MR in the first assembly 91.

A radial regular position XL is defined by the radial relative position ML in the first assembly 91.

An axial regular position XS is defined by the axial relative position MS in the first assembly 91.

A planetary shaft regular phase XP is defined by the planetary shaft relative phase MP in the first assembly 91.

In the manufacturing method according to the present embodiment, the circumferential relative position MR, the radial relative position ML, the axial relative position MS and the planetary shaft relative phase MP of each of the planetary shaft main bodies 41 are respectively set through the following methods (A) to (D), at a time of assembling the sun shaft main body 31 and each of the planetary shaft main bodies 41.

(A) The circumferential relative position MR can be set to the circumferential regular position XR based on the sun indicator 30 by previously comprehending a relative relation between the rotational phase of the sun indicator 30 of the sun shaft main body 31 and the circumferential regular position XR.

(B) The radial relative position ML can be set to the radial regular position XL by abutting the planetary shaft main body 41 against the sun shaft main body 31 from the radial direction.

(C) The axial relative position MS can be set to the axial regular position XS based on the position of the front distal end portion 41T by previously comprehending a corresponding relation between the sun shaft main body 31 and the front race side distal end portion 41T of the planetary shaft main body 41 at the axial regular position XS.

(D) The planetary shaft relative phase MP can be set to the planetary shaft regular phase XP based on the sun indicator 30 by previously comprehending a corresponding relation between the rotational phase of the sun indicator of the sun shaft main body 31 and the planetary shaft regular phase XP. Specifically, the setting of the planetary shaft regular phase XP based on the sun indicator 30 is achieved as follows.

In the manufacturing method according to the present embodiment, a relation between the rotational phase of the sun indicator 30 and the rotational phase of the sun threaded section 34 always comes to a fixed relation by forming the sun threaded section 34 based on the sun indicator 30 of the sun shaft main body 31. Further, the relation between the rotational phase of the sun indicator 30 and the rotational phase of the sun threaded section 34 is previously comprehended. Further, the rotational phase (planetary shaft reference phase BP) of the planetary shaft main body 41 is previously comprehended with respect to the rotational phase of the sun shaft main body 31 at a time of fastening the planetary shaft main body 41 to the threaded jig 7 in a state in which the center line of the sun shaft main body 31 becomes parallel to the center line of the internally threaded section 73 (the planetary shaft main body 41) of the threaded jig 7.

Accordingly, since it is possible to set the relation between the rotational phase of the sun threaded section 34 and the rotational phase of the planetary shaft main body 41 on the assumption that the rotational phase of the sun indicator 30 is the rotational phase of the sun threaded section 34, it is possible to set the planetary shaft relative phase MP to the planetary shaft regular phase XP based on the rotational phase of the sun indicator 30 and the planetary shaft reference phase BP. In other words, it is possible to set the planetary shaft relative phase MP to the planetary shaft regular phase XP based on the rotational phase of the sun indicator 30 by attaching the planetary shaft main body 41 to the threaded jig 7 so as to index the planetary shaft reference phase BP.

In the process L, the first assembly 91 is specifically assembled in accordance with the following [process L] to [process L].

Figure 17A:
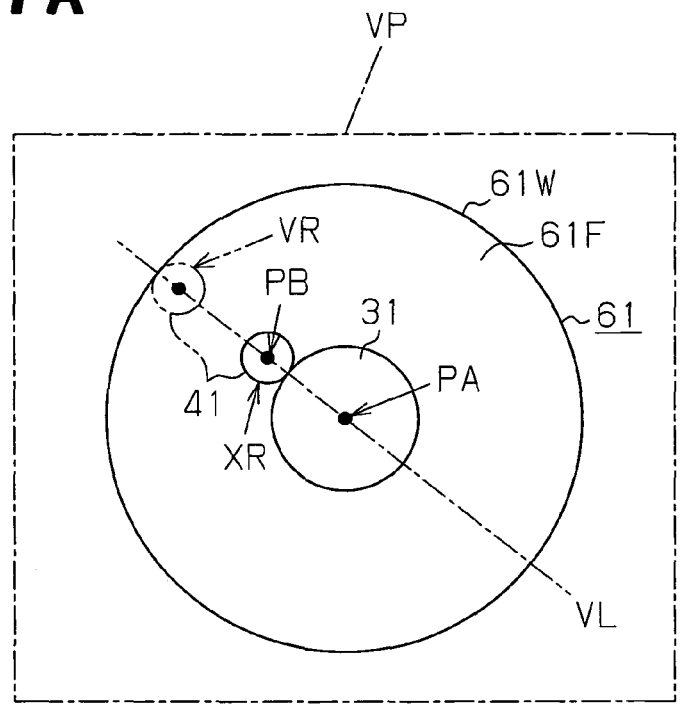
FIG. 17A is a plan view showing a first jig, a sun shaft main body, and a planetary shaft main body in an assembling process of the conversion mechanism of FIG. 1.
Figure 17B:
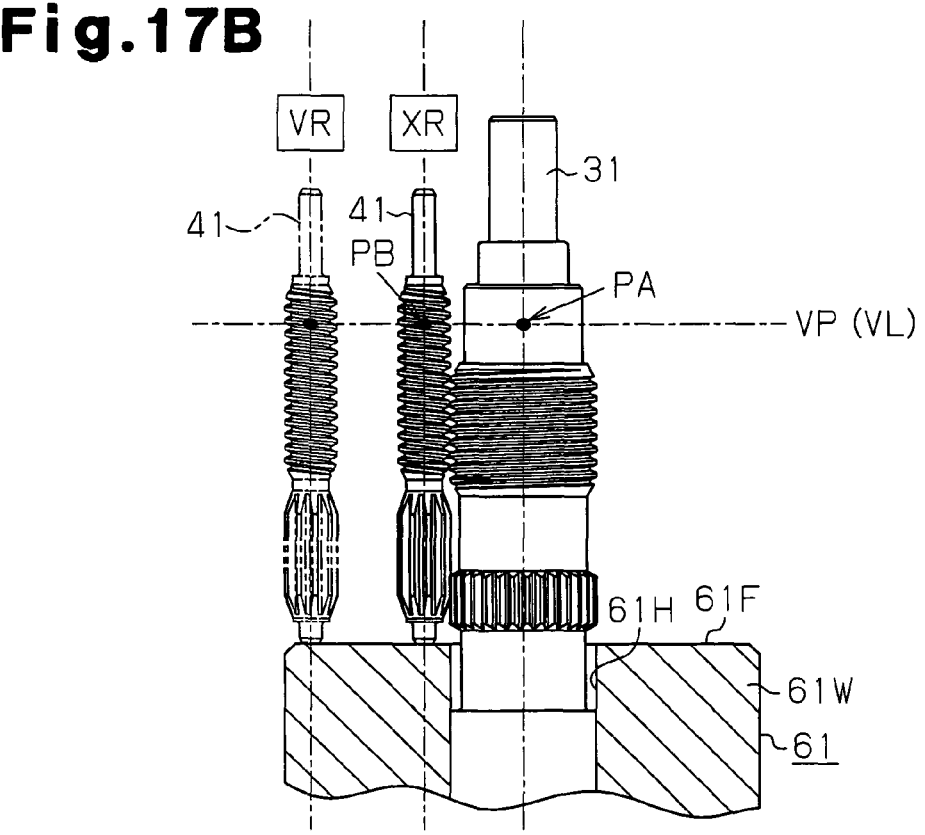
FIG. 17B is a front view showing the first jig, the sun shaft main body, and the planetary shaft main body in FIG. 17A.
Figure 18:
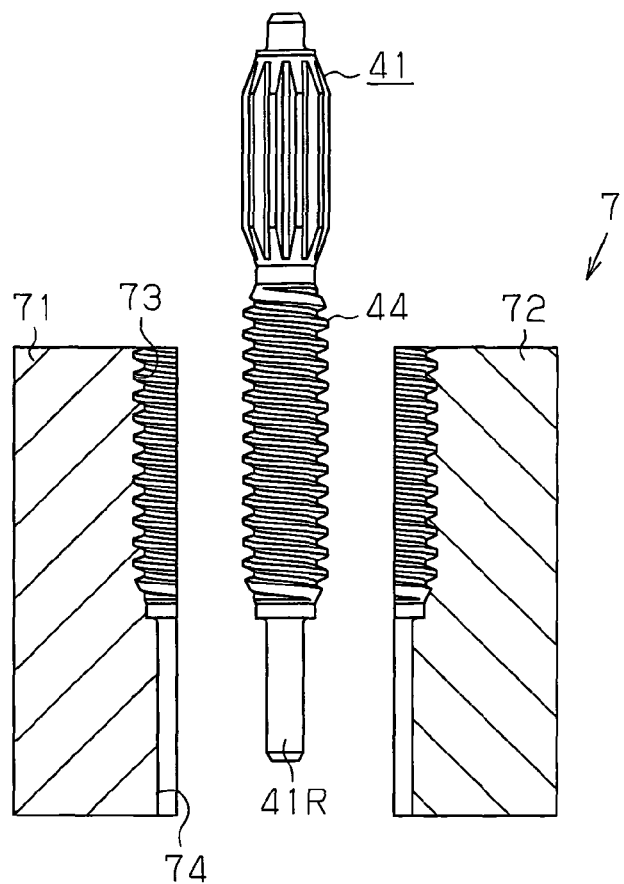
FIG. 18 is a process chart of a process L1 in the method for manufacturing the conversion mechanism of FIG. 1.
Figure 19:
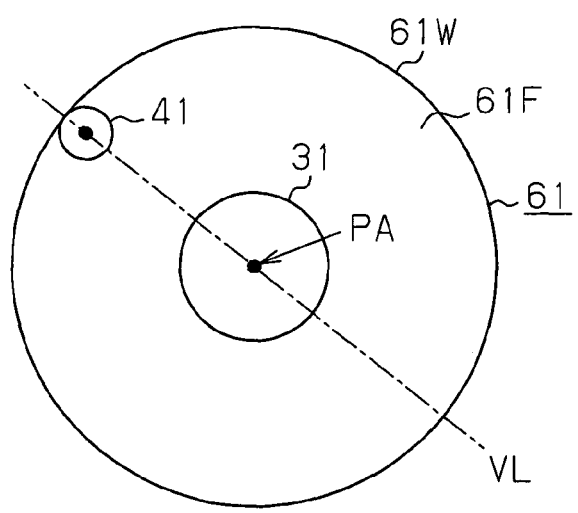
FIG. 19 is a process chart of processes L2 and L3 in the method for manufacturing the conversion mechanism of FIG. 1.
Figure 20:
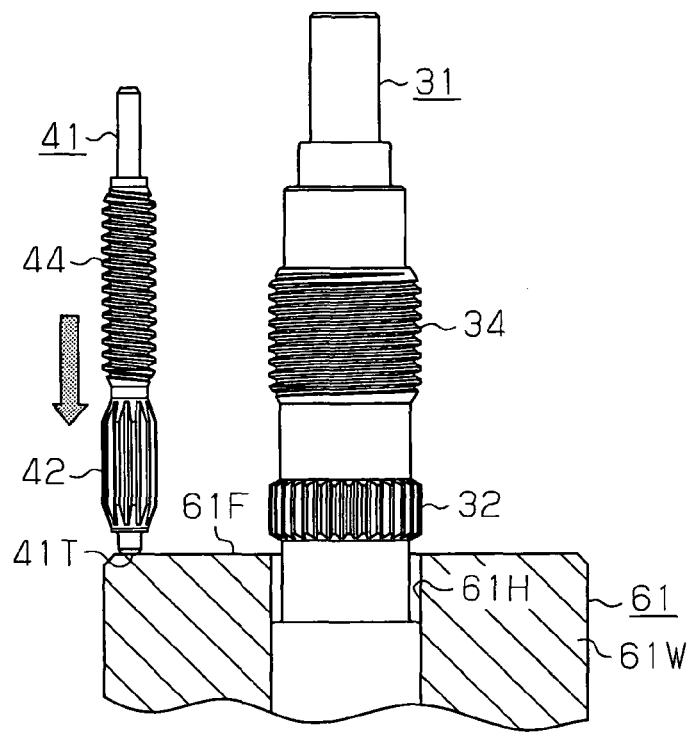
FIG. 20 is a process chart of a process L4 in the method for manufacturing the conversion mechanism of FIG. 1.
Figure 21:
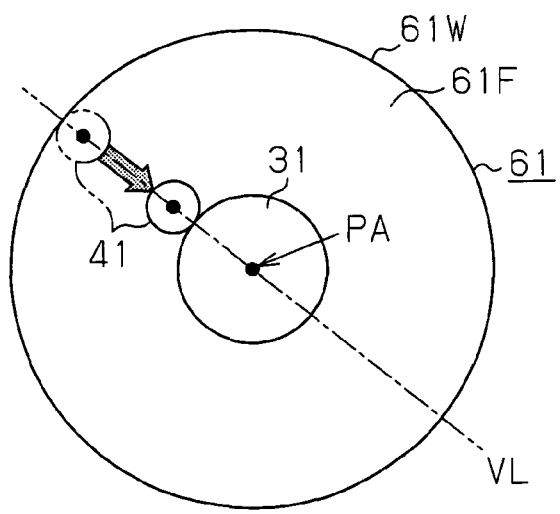
FIG. 21 is a process chart of a process L5 in the method for manufacturing the conversion mechanism of FIG. 1.
Figure 22:
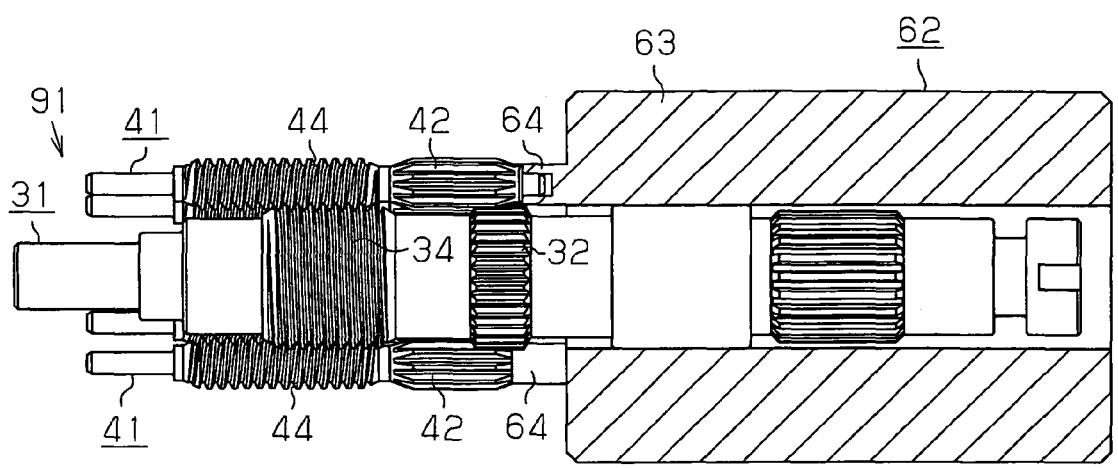
FIG. 22 is a process chart of a process M in the method for manufacturing the conversion mechanism of FIG. 1.

Prior to a description of each of the assembling procedures, a description will be given of "reference plane VP", "reference line VL" and "reference position VR" shown in FIG. 17. In this case, FIG. 17A shows a planar structure of the sun shaft main body 31 in a state of being fixed to the first jig 61. Further, FIG. 17B shows a cross-sectional structure of the sun shaft main body 31 along a center line of the sun shaft main body 31 in a state of being fixed to the first jig 61.

(a) A plane which is orthogonal to the center line of the sun shaft main body 31 is set to a reference plane VP.

(b) A point on the reference plane VP is set to a first reference point PA, in the center line of the sun shaft main body 31.

(c) A point on the reference plate VP is set to a second reference point PB, in the center line of the planetary shaft main body 41 positioned at the circumferential regular position XR.

(d) A line passing through the first reference point PA and the second reference point PB is set to a reference line VL on the reference plane VP.

(e) A position except the radial regular position XL in the position in which its own center line is orthogonal to the reference line VL is set to a reference position VR, in the planetary shaft main body 41. In other words, the reference position VR corresponds to a position in which the circumferential relative position MR is the circumferential regular position XR and the radial relative position ML is not the radial regular position XL.

A description will be given of an assembling procedure of the first assembly 91 with reference to FIGS. 18 to 21. In this case, the processes L1 to L5 show an assembling procedure of the planetary shaft main body 41.

[process L1 (FIG. 18)] The planetary shaft main body 41 is detached from the threaded jig 7 by dividing the threaded jig 7. At this time, the planetary shaft main body 41 is in a state where its own center line becomes parallel to the center line of the sun shaft main body 31.

[process L2 (FIG. 19)] The planetary shaft main body 41 is arranged in the reference position VR based on the rotational phase of the sun indicator 30. In other words, the planetary shaft main body 41 is moved to a position (reference position VR) in which its own center line intersects the reference line VL obtained by the second reference point PB and the first reference point PA of its own circumferential regular position XR. At this time, the planetary shaft main body 41 is moved in a state of keeping the relation to the rotational phase of the sun shaft main body 31 (the sun indicator 30). Further, the reference position VR selects a position at which the front distal end portion 41T can be struck against the jig end surface 61F of the first jig 61 at a time of moving in parallel the planetary shaft main body 41 along the center line.

[process L3 (FIG. 19)] The planetary shaft relative phase MP is set to the planetary shaft regular phase XP based on the rotational phase of the sun indicator 30. Specifically, the planetary shaft relative phase MP is set to the planetary shaft regular phase XP by rotating the planetary shaft main body 41 in such a manner that a difference of the relative rotational phases runs short, after comprehending the difference between the planetary reference phase BP and the planetary shaft regular phase XP based on a comparison between the rotational phase of the sun indicator 30 and the planetary shaft reference phase BP.

[process L4 (FIG. 20)] The axial relative position MS is set to the axial regular position XS by moving the planetary shaft main body 41 in parallel along the center line so as to abut the front distal end portion 41T against the jig end surface 61F.

[process L5 (FIG. 21)] The radial relative position ML is set to the radial regular position XL by moving the planetary shaft main body 41 in parallel so as to abut against the sun shaft main body 31 in the state where the center line of the planetary shaft main body 41 becomes parallel to the center line of the sun shaft main body 31. Specifically, the planetary shaft main body 41 is moved in parallel from the reference position VR to the radial regular position XL in such a manner that a locus of the center line (the second reference point PB) of the planetary shaft main body 41 on the reference plane VP is aligned with the reference line VL. At this time, since the planetary shaft main body 41 is arranged at the radial regular position XL in a state in which the planetary shaft main body 41 is set to the circumferential regular position XR, the axial regular position XS and the planetary shaft regular phase XP, it is possible to simultaneously obtain the engagement between the front planetary gear 42 and the front sun gear 32 and the engagement between the planetary threaded section 44 and the sun threaded section 34.

[process M (FIG. 22)] The jig attached to the first assembly 91 is changed from the first jig 61 to a second jig 62.

Figure 23A:
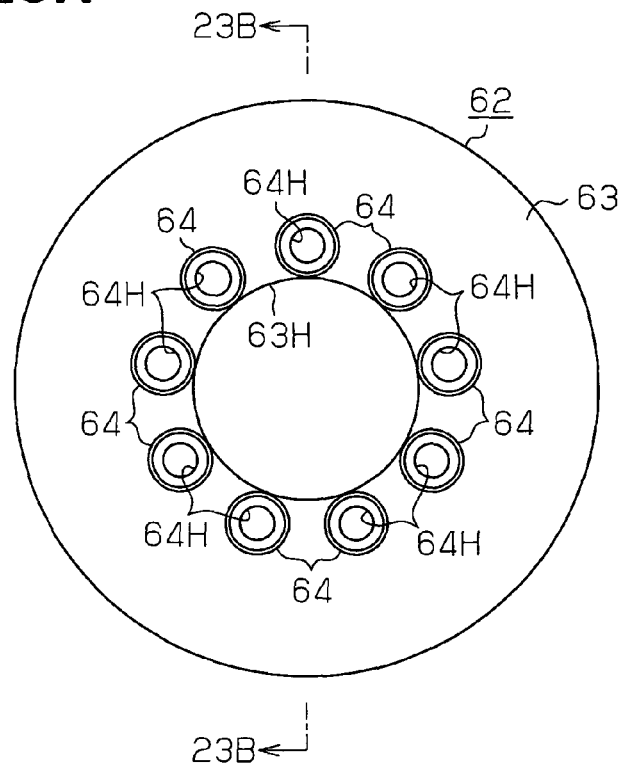
FIG. 23A is a plan view showing a second jig used in the method for manufacturing the conversion mechanism of FIG. 1.
Figure 23B:
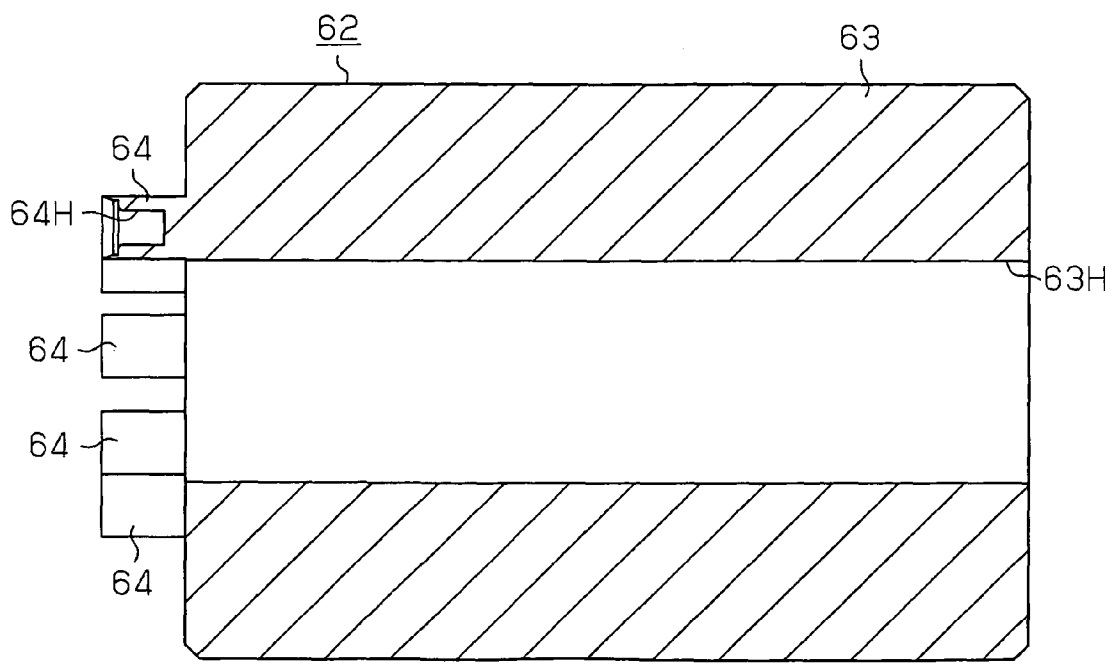
FIG. 23B is a cross-sectional view taken along line 23B-23B in FIG. 23 of the second jig in FIG. 23A.
Figure 24:
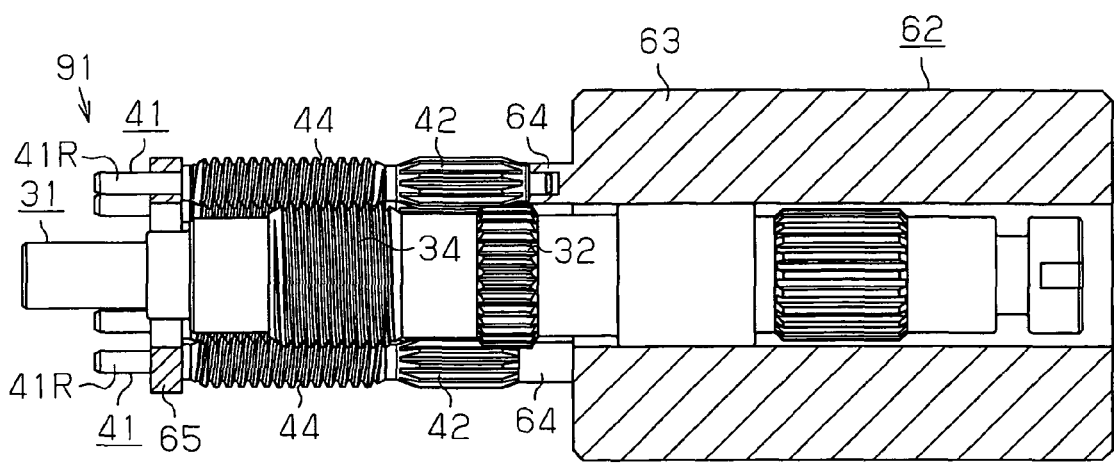
FIG. 24 is a process chart of a process N in the method for manufacturing the conversion mechanism of FIG. 1.

A description will be given of a structure of the second jig 62 with reference to FIG. 23.

The second jig 62 is structured such as to be provided with a sun jig 63 for fixing the sun shaft main body 31 and a planetary jig 64 for supporting the front shaft 41F of the planetary shaft main body 41. In other words, the same number of planetary jigs 64 as the number of the planetary shafts 4 provided in the conversion mechanism 1 are integrally formed with the sun jig 63.

The sun jig 63 is structured such that its own center line (center line of a bearing hole 63H) is aligned with the center line of the sun shaft main body 31 in a state in which the sun shaft main body 31 is inserted to the bearing hole 63H. Each of the planetary jigs 64 is structured such that their center lines are spaced at a uniform interval around the center line of the bearing hole 63H. The sun jig 63 and each of the planetary jigs 64 are structured such that their center lines become in parallel to each other. A hole (support hole 64H) corresponding to a shape of the front shaft 41F of the planetary shaft main body 41 is formed in a distal end portion of each of the planetary jigs 64.

In the process M, the first assembly 91 is specifically attached to the second jig 62 through the following operations (a) to (c).

(a) The first assembly 91 is detached from the first jig 61 in a state of keeping the relation between the sun shaft main body 31 and each of the planetary shaft main bodies 41 in the first assembly 91.

(b) The first assembly 91 is moved to the position in which the center line of the second jig 62 is aligned with the center line of the sun shaft main body 31, and the position in which the center line of the planetary jig 64 is aligned with the center line of the planetary shaft main body 41.

(c) The first assembly 91 is attached to the second jig 62 by moving the first assembly 91 in parallel along the center line. In other words, the sun shaft main body 31 is inserted to the bearing hole 63H and the front shaft 41F of each of the planetary shaft main bodies 41 is fitted to the support hole 64H of the corresponding planetary jig 64.

[process N (FIG. 24)] A retainer 65 is installed to each of the planetary shaft main bodies 41 of the first assembly 91.

Figure 25A:
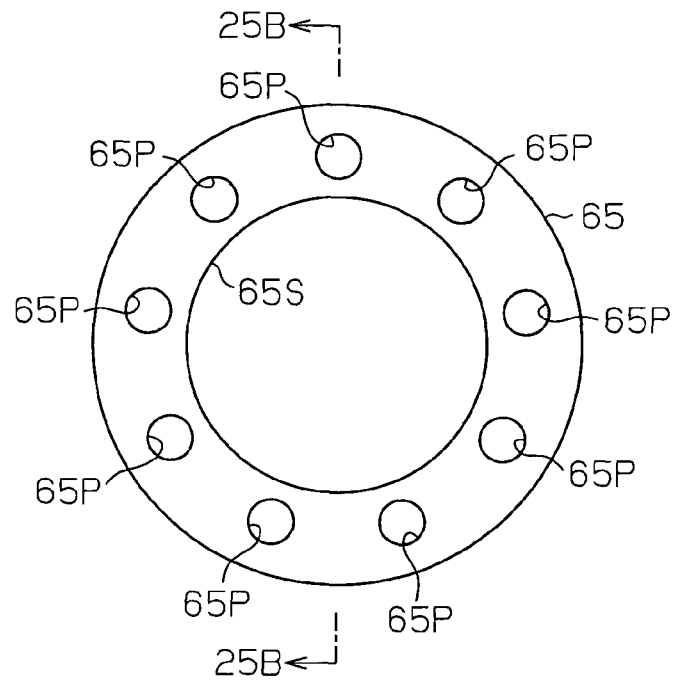
FIG. 25A is a front view showing a retainer used in the method for manufacturing the conversion mechanism of FIG. 1.
Figure 25B:
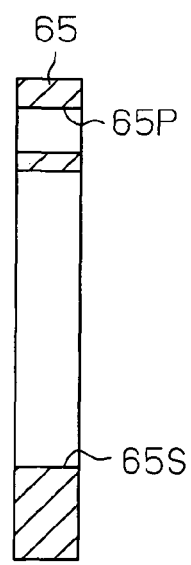
FIG. 25B is a cross-sectional view taken along line 25B-25B in FIG. 25 of the retainer in FIG. 25A.
Figure 26:
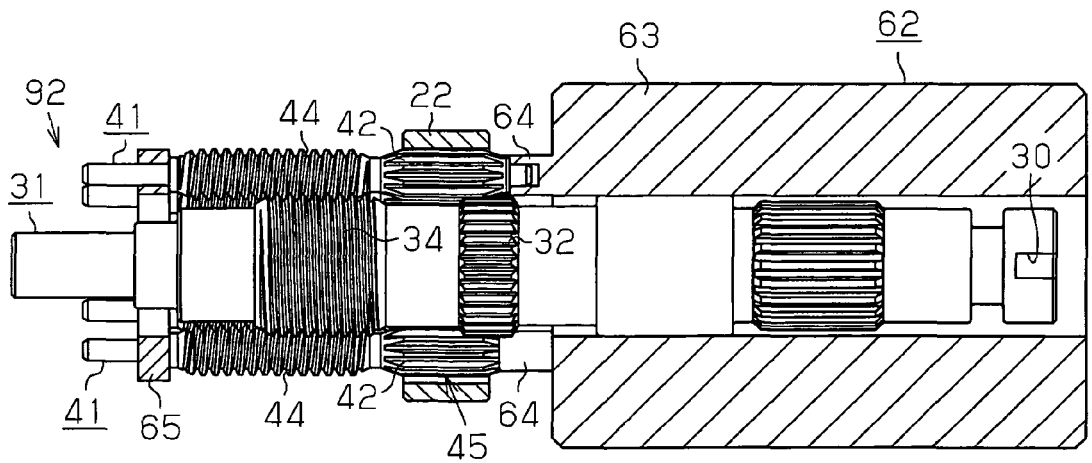
FIG. 26 is a process chart of a process O in the method for manufacturing the conversion mechanism of FIG. 1.
Figure 27:
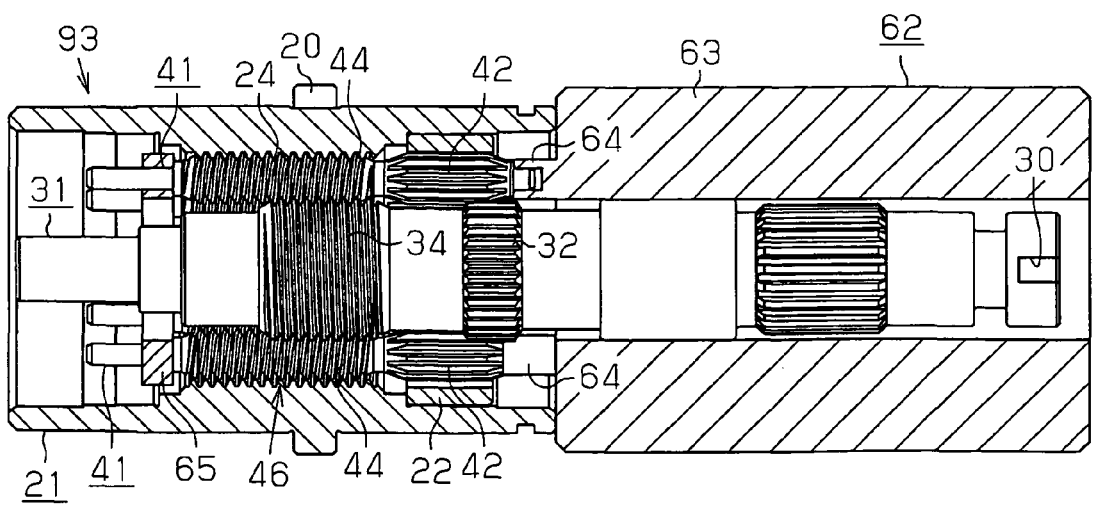
FIG. 27 is a process chart of a process P in the method for manufacturing the conversion mechanism of FIG. 1.
Figure 28:
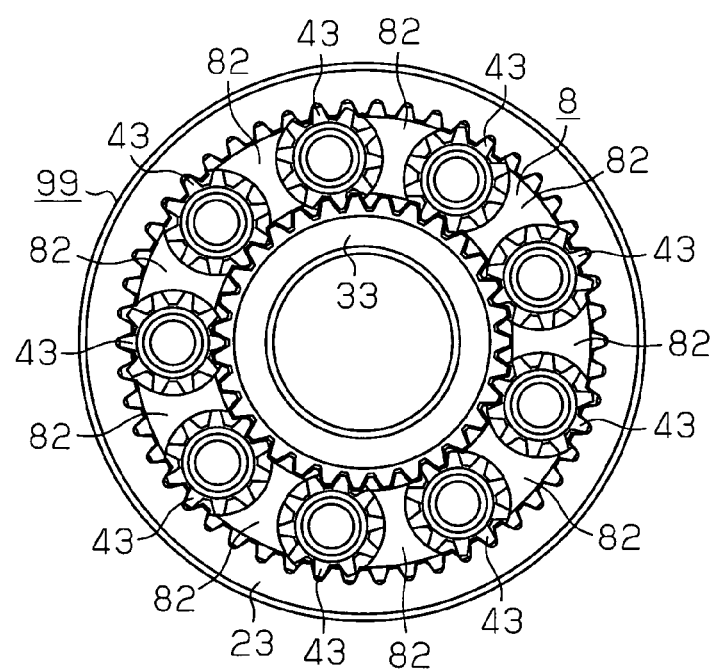
FIG. 28 is a process chart of a process Q in the method for manufacturing the conversion mechanism of FIG. 1.

A description will be given of a structure of the retainer 65 with reference to FIG. 25.

The retainer 65 is structured as a jig for supporting the rear shaft 41R of each of the planetary shaft main bodies 41 in a lump. In other words, in the retainer 65, there are formed a sun bearing hole 65S for inserting the sun shaft main body 31 and a plurality of planetary bearing holes 65P for inserting the rear shaft 41R.

The sun bearing hole 65S is formed in such a manner that its own center line is aligned with the center line of the sun shaft main body 31 in a state in which the retainer 65 is installed to the first assembly 91. The planetary bearing hole 65P is formed in such a manner that an interval between their center lines becomes a uniform interval around the center line of the sun bearing hole 65S. The sun bearing hole 65S and the planetary bearing hole 65P are formed in such a manner that their center lines become in parallel to each other.

In the process N, the retainer 65 is specifically attached to the first assembly 91 through the following operations (a) and (b).

(a) The retainer 65 is arranged at a position in which the center line of each of the planetary bearing holes 65P is aligned with the center line of each of the planetary jigs 64.

(b) The retainer 65 is attached to the first assembly 91 by moving the retainer 65 in parallel along the center line. In other words, the rear shaft 41R of each of the planetary shaft main bodies 41 is inserted into each of the planetary bearing holes 65P of the retainer 65.

[process O (FIG. 26)] The process assembles an assembly (second assembly 92) formed by a combination of the first assembly 91 and the front ring gear 22. In other words, the second assembly 92 is assembled by engaging each of the front planetary gears 42 of the first assembly 91 with the front ring gear 22. As mentioned above, in the first assembly 91, since it is possible to engage each of the front planetary gears 42 with the front ring gear 22, it is possible to assume that one gear having a discontinuous shape is formed by these front planetary gears 42. In the following description, one gear formed by the front planetary gears 42 and engaging with the front ring gear 22 is set as a counter ring gear 45.

In this case, with regard to rotational phases of the counter ring gear 45 and the front ring gear 22, the rotational phase of the counter ring gear 45 coincides with the rotational phase of the front ring gear 22 in a state in which the front ring gear 22 is engaged with the counter ring gear 45. In other words, a difference between the relative rotational phases is not generated between the counter ring gear 45 and the front ring gear 22. In the following description, an annular gear rotational phase difference is set to the difference of the relative rotational phases between the counter ring gear 45 and the front ring gear 22, and an annular gear reference phase RA is set to the rotational phase of the front ring gear 22 with respect to the rotational phase of the counter ring gear 45 in a state in which the annular gear rotational phase difference is not generated.

In the process O, the rotational phase of the front ring gear 22 is set to the annular gear reference phase RA before assembling the second assembly 92. Accordingly, since it is possible to engage the counter ring gear 45 with the front ring gear 22 by moving the front ring gear 22 in parallel along the center line, in the state where the center line of the front ring gear 22 is aligned with the center line of the sun shaft main body 31 of the first assembly 91, it is possible to achieve an improvement of a working efficiency in accordance with the assembling of the second assembly 92.

In the manufacturing method according to the present embodiment, since the first assembly 91 is assembled through the combination of the sun shaft main body 31 and the planetary shaft main body 41 based on the sun indicator 30 of the sun shaft main body 31, the relation between the rotational phase of the sun indicator 30 and the rotational phase of the counter ring gear 45 always comes to a fixed relation. Accordingly, it is possible to set the rotational phase of the front ring gear 22 by previously comprehending the relation between the rotational phase of the sun indicator 30 and the rotational phase of the counter ring gear 45 in the first assembly 91 so as to assume the rotational phase of the sun indicator 30 as the rotational phase of the counter ring gear 45. In other words, it is possible to set the rotational phase of the front ring gear 22 to the annular gear reference phase RA based on the relation between the rotational phase of the sun indicator 30 and the rotational phase of the front ring gear 22.

In the process O, the second assembly 92 is specifically assembled through the following operations (a) to (c).

(a) The front ring gear 22 is arranged at a position in which the center line of the sun shaft main body 31 is aligned with its own center line in the rear of the first assembly 91.

(b) The rotational phase of the front ring gear 22 is set to the annular gear reference phase RA based on the relation between the rotational phase of the sun indicator 30 and the rotational phase of the front ring gear 22.

(c) Each of the front planetary gears 42 (the counter ring gears 45) of the first assembly 91 is engaged with the front ring gear 22 by moving the front ring gear 22 in parallel along the center line in a state of keeping the front ring gear 22 in an attitude which is set through the works (a) and (b) mentioned above.

[process P (FIG. 27)] An assembly (third assembly 93 (axial assembly)) formed by a combination of the second assembly 92 and the ring shaft main body 21 is assembled. In other words, the third assembly 93 is assembled by engaging each of the planetary threaded sections 44 of the second assembly 92 with the annular threaded section 24 of the ring shaft main body 21. As mentioned above, in the second assembly 92, since it is possible to engage the annular threaded section 24 with each of the planetary threaded sections 44, it is possible to assume that one externally threaded section having a discontinuous thread ridge is formed by a plurality of planetary threaded sections 44. In the following description, one externally threaded section formed by these planetary threaded sections 44 and engaging with the annular threaded section 24 is set as a counter annular threaded section 46.

In this case, with regard to the rotational phases of the counter annular threaded section 46 and the annular threaded section 24, the rotational phase of the counter annular threaded section 46 coincides with the rotational phase of the annular threaded section 24, in a state in which the annular threaded section 24 begins to engage with the counter annular threaded section 46. In other words, a difference of the relative rotational phase is not generated between the counter annular threaded section 46 and the annular threaded section 24. In the following description, an annular thread rotational phase difference is set as the difference of the relative rotational phase between the counter annular threaded section 46 and the annular threaded section 24, and an annular threaded section reference phase RB is set as the rotational phase of the annular threaded section 24 with respect to the rotational phase of the counter annular threaded section 46 in the state where the annular thread rotational phase difference is not generated.

In the process P, the rotational phase of the annular threaded section 24 (the ring shaft main body 21) is set to the annular threaded section reference phase RB before assembling the third assembly 93. Accordingly, since it is possible to engage the counter annular threaded section 46 with the annular threaded section 24 by moving the ring shaft main body 21 in parallel along the center line, in the state where the center line of the ring shaft main body 21 is aligned with the center line of the sun shaft main body 31 of the second assembly 92, it is possible to achieve an improvement of a working efficiency in the assembling of the third assembly 93.

In the manufacturing method according to the present embodiment, since the first assembly 91 is assembled through the combination of the sun shaft main body 31 and the planetary shaft main body 41 based on the sun indicator 30 of the sun shaft main body 31, the relation between the rotational phase of the sun indicator 30 and the rotational phase of the counter annular threaded section 46 always comes to a fixed relation. Further, since the annular threaded section 24 is formed based on the annular indicator 20 of the ring shaft main body 21, the relation between the rotational phase of the annular indicator 20 and the rotational phase of the annular threaded section 24 always comes to a fixed relation. Accordingly, the structure is made such as to previously comprehend the relation between the rotational phase of the sun indicator 30 and the rotational phase of the counter annular threaded section 46 in the first assembly 91 (the second assembly 92), and the relation between the rotational phase of the annular indicator 20 and the rotational phase of the annular threaded section 24 in the ring shaft main body 21. Accordingly, it is possible to set the rotational phase of the annular threaded section 24 by assuming that the rotational phase of the sun indicator 30 is the rotational phase of the counter annular threaded section 46 and assuming that the rotational phase of the annular indicator 20 is the rotational phase of the annular threaded section 24. In other words, it is possible to set the rotational phase of the annular threaded section 24 to the annular threaded section reference phase RB based on the relation between the rotational phase of the sun indicator 30 and the rotational phase of the annular indicator 20.

In the process P, the third assembly 93 is specifically assembled through the following operations (a) to (e).

(a) The ring shaft main body 21 is arranged at a position in which the center line of the sun shaft main body 31 is aligned with its own center line in the rear of the second assembly 92.

(b) The rotational phase of the annular threaded section 24 is set to the annular threaded section reference phase RB based on the relation between the rotational phase of the sun indicator 30 and the rotational phase of the annular indicator 20.

(c) Each of the planetary threaded sections 44 (the counter annular threaded section 46) is engaged with the annular threaded section 24 by moving the ring shaft main body 21 in parallel along the center line in a state of keeping the ring shaft main body 21 in an attitude set through the works (a) and (b) mentioned above.

(d) The ring shaft main body 21 is fastened until the relative position in the axial direction of the ring shaft main body 21 with respect to the sun shaft main body 31 comes to a predetermined position.

(e) The front ring gear 22 is fixed to the ring shaft main body 21 by press fitting the front ring gear 22 to the main body gear portion 21B.

[process Q (FIG. 28)] The process assembles an assembly (gear assembly 99 (gear assembly)) formed by a combination of the rear ring gear 23, the rear sun gear 33 and each of the rear planetary gears 43 in a second assembled state. In this case, the second assembled state means a state where the rear planetary gears 43 arranged at a uniform interval around the rear sun gear 33 are engaged with the rear ring gear 23 and the rear sun gear 33, in a state where a relation between the rotational phase of the rear ring gear 23 and the rotational phase of the rear sun gear 33 is in a specific relation. Further, the specific relation means a relation between the rotational phase of the rear ring gear 23 and the rotational phase of the rear sun gear 33 which is set on design.

In the process Q, the gear assembly 99 is assembled by attaching the rear ring gear 23, the rear sun gear 33 and each of the rear planetary gears 43 to a gear jig 8.

Figure 29A:
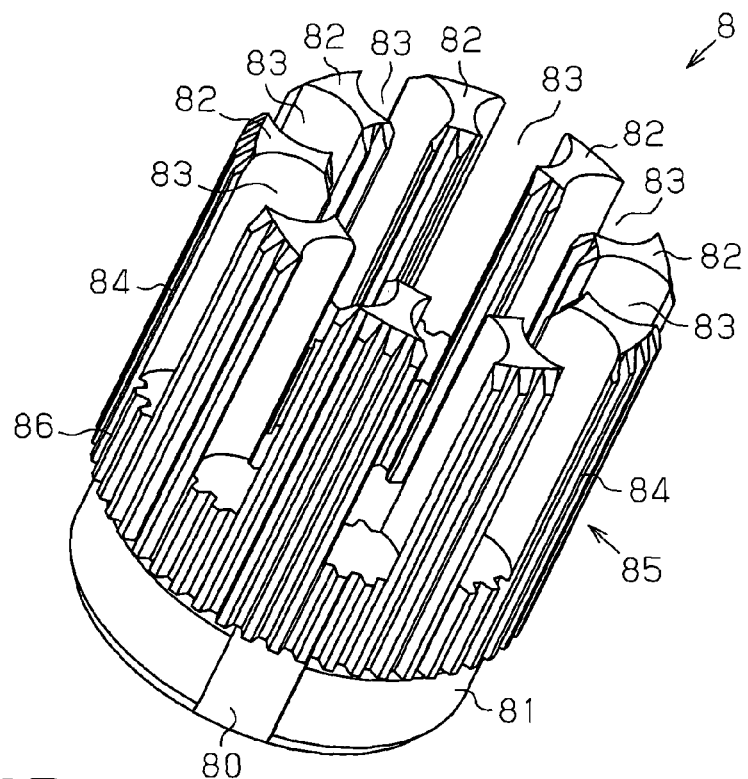
FIG. 29A is a perspective view showing a gear jig used in the method for manufacturing the conversion mechanism of FIG. 1.
Figure 29B:
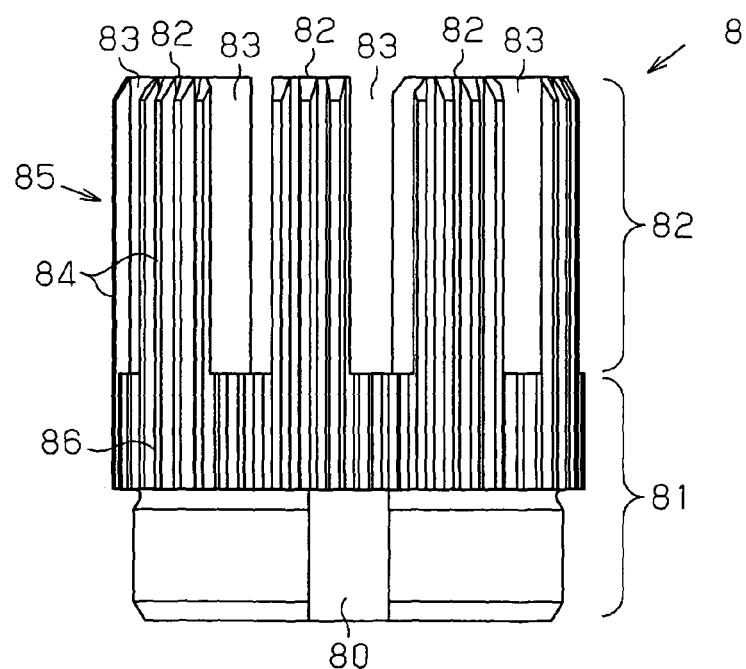
FIG. 29B is a front view showing the gear jig of FIG. 29A.
Figure 30A:
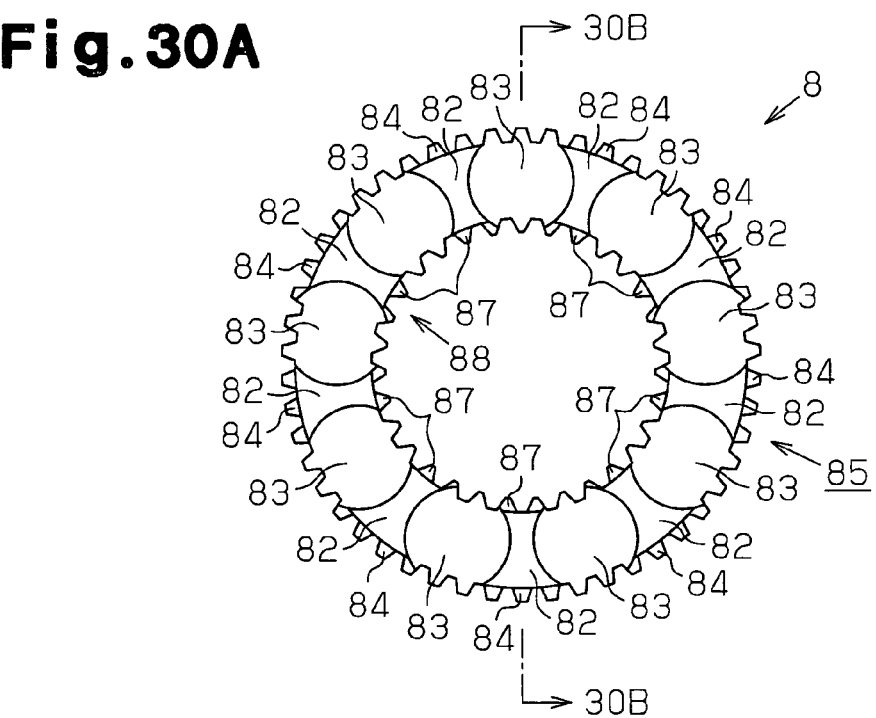
FIG. 30A is a plan view showing the gear jig used in the method for manufacturing the conversion mechanism of FIG. 1.
Figure 30B:
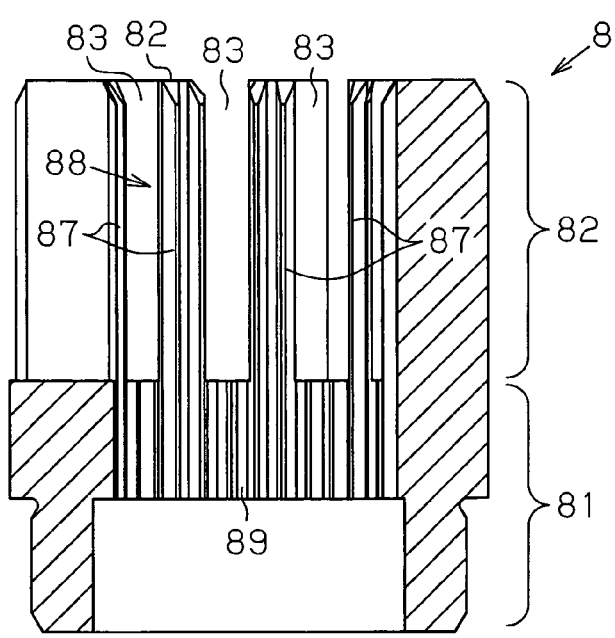
FIG. 30B is a cross-sectional view taken along line 30B-30B in FIG. 30 of the gear jig in FIG. 30A.
Figure 31:
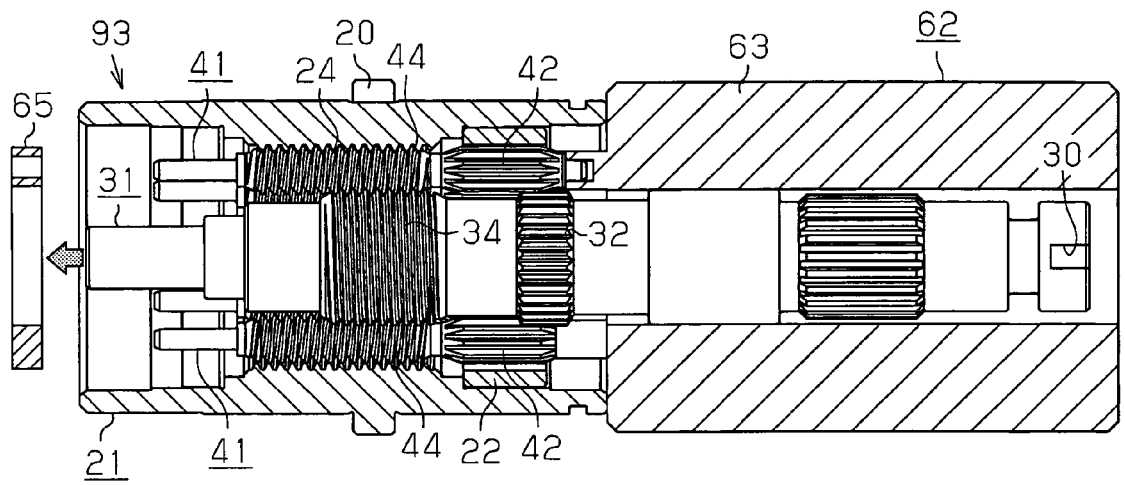
FIG. 31 is a process chart of a process R in the method for manufacturing the conversion mechanism of FIG. 1.
Figure 32:
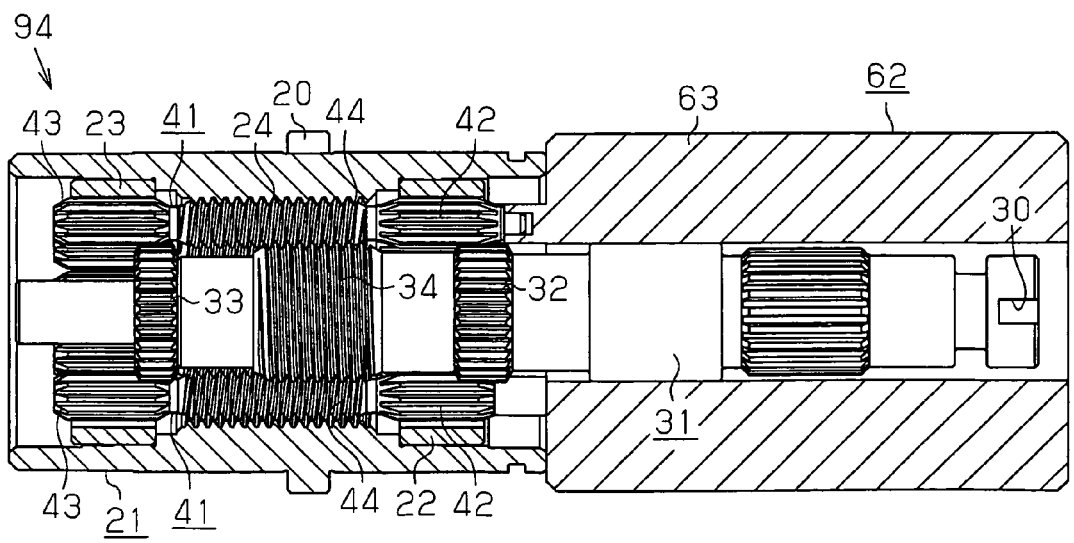
FIG. 32 is a process chart of a process S in the method for manufacturing the conversion mechanism of FIG. 1.
Figure 33:
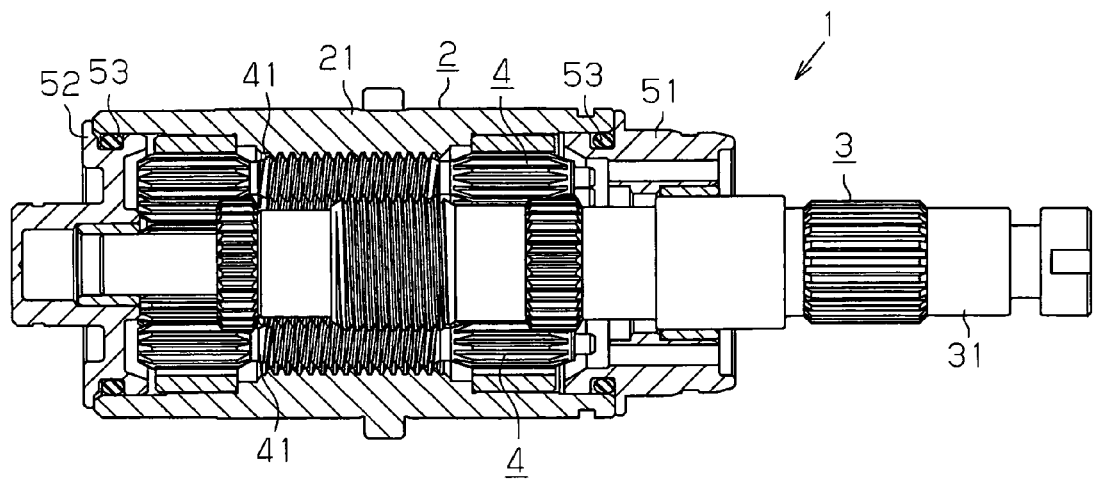
FIG. 33 is a process chart of a process T in the method for manufacturing the conversion mechanism of FIG. 1.

A description will be given of a structure of the gear jig 8 with reference to FIGS. 29 and 30.

The gear jig 8 is structured such as to be provided with a jig main body 81 and a plurality of support columns 82. The support columns 82 are arranged so as to be spaced at a fixed interval in a circumferential direction. A space (gear arrangement portion 83) for arranging one rear planetary gear 43 is formed between the adjacent support columns 82. The gear arrangement portions 83 are formed at the same number as the number of the planetary shafts 4 provided in the conversion mechanism 1.

A tooth (counter annular outer teeth 84) engaging with the rear ring gear 23 is formed in an outer peripheral side of each of the support columns 82. Further, one gear (counter annular gear 85) having a discontinuous shape is formed by the counter annular outer teeth 84 of the support columns 82. In other words, on the assumption that the gear with a continuous shape having the counter annular outer teeth 84 is a counter annular basic gear, the counter annular gear 85 corresponds to a gear having a shape obtained by removing part of the counter annular basic gear at a fixed interval over a plurality of positions.

A gear (counter annular gear 86) engaging with the rear ring gear 23 is formed in an outer peripheral side of the jig main body 81. The counter annular gear 86 is formed as a gear having the same rotational phase as the counter annular gear 85 and having a continuous shape. In other words, it corresponds to a gear in which the discontinuous portions in the counter annular gear 85 are connected by the counter annular outer teeth 84.

Teeth (counter sun internal teeth 87) engaging with the rear sun gear 33 are formed in an inner peripheral side of each of the support columns 82. Further, one gear (counter sun gear 88) having a discontinuous shape is formed by the counter sun internal teeth 87 of the support columns 82. In other words, on the assumption that a gear with a continuous shape having the counter sun internal teeth 87 is a counter sun basic gear, the counter sun gear 88 corresponds to a gear having a shape obtained by removing part of the counter sun basic gear at a fixed interval over a plurality of positions.

A gear (counter sun gear 89) engaging with the rear sun gear 33 is formed in an inner peripheral side of the jig main body 81. The counter sun gear 89 is formed as a gear having the same rotational phase as the counter sun gear 88 and having a continuous shape. In other words, it corresponds to a gear in which the discontinuous portions in the counter sun gear 88 are connected by the counter sun internal teeth 87.

In the gear jig 8, since the counter annular gear 85 is formed as the gear having the discontinuous shape, the rear ring gear 23 and the rear planetary gear 43 are engaged with each other in the discontinuous portion of the counter annular gear 85, at a time of arranging the rear planetary gear 43 in the gear arrangement portion 83 in a state in which the rear ring gear 23 is engaged with the counter annular gear 85. Further, since the counter sun gear 88 is formed as the gear having the discontinuous shape, the rear sun gear 33 and the rear planetary gear 43 are engaged with each other in the discontinuous portion of the counter sun gear 88, at a time of arranging the rear planetary gear 43 in the gear arrangement portion 83 in a state in which the rear sun gear 33 is engaged with the counter sun gear 88.

In the gear jig 8, a relation between the rotational phase of the counter annular gear 85 and the counter annular gear 86 and the rotational phase of the counter sun gear 88 and the counter sun gear 89 is set to a specific relation in the second assembled state of the gear assembly 99.

A notch (jig indicator 80) is formed as an indicator for comprehending the rotational phases of the counter annular gears 85 and 86 and the counter sun gears 88 and 89. The counter annular gears 85 and 86 and the counter sun gears 88 and 89 are formed based on the jig indicator 80.

In the process Q, the following operations (a) to (c) are specifically carried out as a work for assembling the gear assembly 99 and a work going along therewith.

(a) The process engages the rear ring gear 23 with the counter annular gears 85 and 86 of the gear jig 8.

(b) The process engages the rear sun gear 33 with the counter sun gears 88 and 89 of the gear jig 8.

(c) The process arranges each of the rear planetary gears 43 in the gear arrangement portion 83 in a state in which the rear ring gear 23 and the rear sun gear 33 are attached to the gear jig 8. At this time, each of the rear planetary gears 43 engages with the rear ring gear 23 and the rear sun gear 33.

The gear assembly 99 is assembled in a state in which the center line of the rear ring gear 23 is aligned with the center line of the rear sun gear 33, and in a state in which the center line of each of the rear planetary gears 43 becomes parallel to the center line of the rear sun gear 33, through the works mentioned above.

[process R (FIG. 31)] The process detaches the retainer 65 from the third assembly 93. In this connection, since the conversion mechanism 1 employs the structure of constraining the position in the radial direction of each of the planetary shafts 4 through the engagement of the threaded sections and the gears, the retainer 65 is detached from each of the planetary shaft main bodies 41 before assembling the rear planetary gear 43 in each of the planetary shaft main body 41.

[process S (FIG. 32)] The process assembles an assembly (fourth assembly 94 (geared assembly)) of the third assembly 93 and the gear assembly 99. In other words, the fourth assembly 94 is assembled by assembling the gear assembly 99 with respect to the third assembly 93.

In this case, with regard to the rotational phases of the third assembly 93 and the gear assembly 99, it is assumed that the rotational phase of the third assembly 93 coincides with the rotational phase of the gear assembly 99 in the state where the center line of each of the planetary shaft main bodies 41 of the third assembly 93 is aligned with the center line of each of the rear planetary gears 43 of the gear assembly 99. In other words, it is assumed that there is no difference (assembly rotational phase difference) of the relative rotational phases between the third assembly 93 and the gear assembly 99. Further, an assembly reference phase RC is set to the rotational phase of the gear assembly 99 with respect to the rotational phase of the third assembly 93 in the state where the assembly rotational phase difference does not exist.

In a process S, the rotational phase of the gear assembly 99 is set to the assembly reference phase RC before assembling the third assembly 93. Accordingly, since it is possible to combine the gear assembly 99 with the third assembly 93 by moving the gear assembly 99 in parallel along the center line, in the state where the center line of the gear assembly 99 (the rear sun gear 33) is aligned with the center line of the sun shaft main body 31 of the third assembly 93, it is possible to achieve an improvement of a working efficiency for assembling the fourth assembly 94.

In the manufacturing method according to the present embodiment, since the third assembly 93 is assembled through the combination between the second assembly 92 and the ring shaft main body 21 based on the relation between the sun indicator 30 of the sun shaft main body 31 and the annular indicator 20 of the ring shaft main body 21, a relation between the rotational phase of the annular indicator 20 and the circumferential regular position XR of each of the planetary shaft main bodies 41 always comes to a fixed relation. Accordingly, it is possible to set the rotational phase of the gear assembly 99 on the assumption that the rotational phase of the annular indicator 20 is the rotational phase of the third assembly 93 (the circumferential regular position XR of each of the planetary shaft main body 41), by previously comprehending the relation between the rotational phase of the annular indicator 20 in the third assembly 93 and the circumferential regular position XR of each of the planetary shaft main bodies 41. In other words, it is possible to set the rotational phase of the gear assembly 99 to the assembly reference phase RC based on the relation between the rotational phase of the annular indicator 20 and the rotational phase of the jig indicator 80.

In the process S, the fourth assembly 94 is specifically assembled through the following operations (a) to (f).

(a) The process moves the gear jig 8 to a position in which the center lines of the rear ring gear 23 and the rear sun gear 33 are aligned with the center line of the ring shaft main body 21 of the third assembly 93 in the rear of the third assembly 93. The rear ring gear 23 and the rear sun gear 33 are held in an aligned attitude and each of the rear planetary gears 43 is held in a parallel attitude, through the work.

(b) The process sets the rotational phase of the gear assembly 99 to the assembly reference phase RC based on the relation between the rotational phase of the annular indicator 20 and the rotational phase of the jig indicator 80.

(c) The process moves the gear jig 8 to the third assembly 93 side along the center line of the sun shaft main body 31.

(d) The process attaches each of the rear planetary gears 43 of the gear assembly 99 to the rear shaft 41R of the corresponding planetary shaft main body 41.

(e) The process pressure inserts the rear ring gear 23 into the ring shaft main body 21 after fitting the rear ring gear 23 to the main body gear portion 21C of the ring shaft main body 21.

(f) The process pressure inserts the rear sun gear 33 into the sun shaft main body 31 after fitting the rear sun gear 33 to the main body gear portion 31C of the sun shaft main body 31.

[process T (FIG. 33)] The process assembles an assembly (the conversion mechanism 1) formed by a combination of the fourth assembly 94, the front collar 51 and the rear collar 52. In other words, the process assembles the conversion mechanism 1 by assembling the front collar 51 and the rear collar 52 with respect to the fourth assembly 94. Specifically, the process assembles the conversion mechanism 1 through the following operations (a) and (b).

(a) The process attaches the front collar 51 to the main body gear portion 21B of the ring shaft main body 21 after installing the O-ring 53 to the front collar 51.

(b) The process attaches the rear collar 52 to the main body gear portion 21C of the ring shaft main body 21 after installing the O-ring 53 to the rear collar 52.

Effect of Embodiment

As mentioned above in detail, according to the method for manufacturing the conversion mechanism in this embodiment, the effects shown below can be obtained.

(1) In the manufacturing method according to the present embodiment, the sun shaft main body 31 is combined with the planetary shaft main body 41 after setting the planetary shaft main body 41 to circumferential regular position XR, the axial regular position XS and the planetary shaft regular phase XP. Accordingly, since the front planetary gear 42 is accurately engaged with the front sun gear 32 and the planetary threaded section 44 is accurately engaged with the sun threaded section 34 at a time of assembling the first assembly 91, it is possible to achieve an improvement of a working efficiency for manufacturing the conversion mechanism 1.

(2) Further, since the front sun gear 32 is engaged with each of the front planetary gears 42 in the rotational phase set on the design, and the sun threaded section 34 is engaged with each of the planetary threaded sections 44 in the rotational phase set on the design, through the structure (1) mentioned above, it is possible to inhibit a conversion efficiency from the rotational motion to the rectilinear motion in the conversion mechanism 1 from being lowered.

(3) In the manufacturing method according to the present embodiment, the second assembly 92 is assembled after setting the rotational phase of the front ring gear 22 to the annular gear reference phase RA. Accordingly, since the front ring gear 22 is accurately engaged with the counter ring gear 45 at a time of assembling the second assembly 92, it is possible to achieve an improvement of a working efficiency for manufacturing the conversion mechanism 1.

(4) Further, since the front ring gear 22 is engaged with the counter ring gear 45 in the rotational phase set on the design, through the structure (3) mentioned above, it is possible to inhibit the conversion efficiency from the rotational motion to the rectilinear motion in the conversion mechanism 1 from being lowered.

(5) In the manufacturing method according to the present embodiment, the third assembly 93 is assembled after setting the rotational phase of the ring shaft main body 21 (the annular threaded section 24) to the annular threaded section reference phase RB. Accordingly, since the annular gear 24 is accurately engaged with the counter annular threaded section 46 at a time of assembling the third assembly 93, it is possible to achieve an improvement of the working efficiency for manufacturing the conversion mechanism 1.

(6) Further, since the annular threaded section 24 are engaged with the counter annular threaded section 46 in the rotational phase set on the design, through the structure (5) mentioned above, it is possible to inhibit the conversion efficiency from the rotational motion to the rectilinear motion in the conversion mechanism 1 from being lowered.

(7) In the manufacturing method according to the present embodiment, the gear assembly 99 is assembled through the gear jig 8. Accordingly, since it is not necessary to take into consideration the relation of the rotational phase between the gears at a time of engaging the rear ring gear 23, the rear sun gear 33 and each of the rear planetary gears 43 with each other, it is possible to achieve an improvement of the working efficiency for manufacturing the conversion mechanism 1.

(8) Further, since the rear ring gear 23 and the rear sun gear 33 are engaged with each of the rear planetary gears 43 in the rotational phase set on the design, through the structure (7) mentioned above, it is possible to inhibit the conversion efficiency from the rotational motion to the rectilinear motion in the conversion mechanism 1 from being lowered.

(9) In the manufacturing method according to the present embodiment, the fourth assembly 94 is assembled after setting the rotational phase of the gear assembly 99 to the assembly reference phase RC. Accordingly, since each of the rear planetary gears 43 is accurately engaged with the planetary shaft main body 41 at a time of assembling the fourth assembly 94, it is possible to achieve an improvement of the working efficiency for manufacturing the conversion mechanism 1.

(10) In accordance with the manufacturing method of the present embodiment, the conversion mechanism 1 is assembled through the structures (1), (3), (5), (7) and (9) mentioned above. Accordingly, since it is possible to inhibit an interruption of the assembling process or the like caused by inaccurate assembling of the constituent elements from being generated while the conversion mechanism 1 is assembled, it is possible to achieve an improvement of the assembly efficiency.

(11) In the manufacturing method according to the present embodiment, the axial relative position MS is set to the axial regular position XS by abutting the front distal end portion 41T of the planetary shaft main body 41 against the jig end surface 61F of the first jig 61. Accordingly, since it is not necessary to take into consideration a positional relation between the sun shaft main body 31 and the planetary shaft main body 41 at a time of setting the axial regular position XS, it is possible to achieve an improvement of the labor efficiency for manufacturing the conversion mechanism 1.

(12) Further, since the axial relative position MS is set to the axial regular position XS, through the structure (11) mentioned above, it is possible to accurately engage the threaded sections and the gears at a time of assembling the first assembly 91.

(13) In the manufacturing method according to the present embodiment, the rotational phase of the annular threaded section 24 can be comprehended from the annular indicator 20 by forming the annular threaded section 24 of the ring shaft main body 21 based on the annular indicator 20. Accordingly, it is possible to achieve an improvement in the labor efficiency for manufacturing the conversion mechanism 1.

(14) In the manufacturing method according to the present embodiment, the rotational phase of the sun threaded section 34 can be comprehended from the sun indicator 30 by forming the sun threaded section 34 of the sun shaft main body 31 based on the sun indicator 30. Accordingly, it is possible to achieve an improvement of the labor efficiency for manufacturing the conversion mechanism 1.

(15) In the manufacturing method according to the present embodiment, the rotational phase of the gear assembly 99 can be comprehended from the jig indicator 80 by forming the jig indicator 80 in the gear jig 8. Accordingly, it is possible to achieve an improvement of the labor efficiency for manufacturing the conversion mechanism 1.

(16) In the manufacturing method according to the present embodiment, the ring indicator 20 is formed in the flange 25 of the ring shaft main body 21. Accordingly, since it is possible to accurately recognize the annular indicator 20 at a time of assembling the constituent elements, it is possible to more accurately join the constituent elements based on the rotational phase of the annular indicator 20.

(17) In the manufacturing method according to the present embodiment, the sun indicator 30 is formed in the front distal end portion 41T of the sun shaft main body 31. Accordingly, since it is possible to accurately recognize the sun indicator 30 at a time of assembling the constituent elements, it is possible to more accurately join the constituent elements based on the rotational phase of the sun indicator 30.

(18) In the manufacturing method according to the present embodiment, the jig indicator 80 is formed in the outer peripheral side of the jig main body 81 of the gear jig 8. Accordingly, since it is possible to accurately recognize the jig indicator 80 at a time of assembling the constituent elements, it is possible to more accurately join the constituent elements based on the rotational phase of the jig indicator 80.

(19) In the conversion mechanism 1, since physical constitution of the planetary shaft main body 41 becomes comparatively small, there is a case that it becomes hard to form the indicator for comprehending its own rotational phase in the same manner as the ring shaft main body 21 and the sun shaft main body 31 in the planetary shaft main body 41. Further, even if the indicator mentioned above is formed, there is assumed that it becomes hard to accurately recognize the indicator at a time of assembling the constituent elements. In this regard, in the manufacturing method according to the present embodiment, since the rotational phase of the planetary shaft main body 41 is comprehended through the threaded jig 7, it is possible to accurately comprehend the rotational phase of the planetary shaft main body 41 regardless of the physical constitution of the planetary shaft main body 41.

Modification of Embodiment

The above-described first embodiment may be modified, for example, as described below.

In the first embodiment mentioned above, the planetary shaft relative phase MP is set to the planetary shaft regular phase XP based on the relation between the rotational phase of the sun indicator 30 and the planetary shaft reference phase BP, however, the method for setting the planetary shaft relative phase MP to the planetary shaft regular phase XP may be changed, for example, as follows. In other words, the length of the internally threaded section 73 of each of the threaded jigs 7 may be set to a different length in such a manner that the planetary shaft relative phase MP of each of the planetary shaft main bodies 41 comes to the planetary shaft regular phase XP, in the state where the planetary shaft main body 41 is fastened to each of the threaded jigs 7. In this case, the position of the threaded jig 7 is previously set with respect to the sun shaft main body 31, in such a manner that the planetary shaft relative phase MP comes to the planetary shaft regular phase XP at a time of fastening the planetary shaft main body 41 to the threaded jig 7. In accordance with the structure mentioned above, since the planetary shaft relative phase MP is set to the planetary shaft regular phase XP by attaching the planetary shaft main body 41 to the threaded jig 7, it is possible to achieve an improvement of the working efficiency for assembling the conversion mechanism 1.

In the first embodiment mentioned above, there is employed the threaded jig 7 structured such that the planetary shaft main body 41 can be fastened until the main body threaded portion 41A abuts part of the threaded jig 7, however, the structure of the threaded jig 7 may be modified as follows. In other words, it is possible to change to the structure in which the planetary shaft main body 41 can be fastened until the rear shaft 41R abuts part of the threaded jig 7. In this case, a hole closed in a bottom portion side of the threaded jig 7 through part of the first divided body 71 and the second divided body 72 is provided as a space for inserting the rear shaft 41R, in place of the insertion hole 74.

In the first embodiment mentioned above, the second assembly 92 is assembled by combining the front ring gear 22 with respect to the first assembly 91, however, the process to the assembling of the third assembly 93 may be changed as follows. In other words, after assembling an assembly formed by a combination of the first assembly 91 and the ring shaft main body 21, the third assembly 93 may be assembled with the combination of the assembly and the front ring gear 22.

A second embodiment of the present invention will now be described.

The first embodiment employs the method of setting the planetary shaft relative phase MP to the planetary shaft regular phase XP through the threaded jig 7, with regard to each of the planetary shaft main bodies 41. On the contrary, in the present embodiment, there is employed a method that the planetary shaft relative phase MP can be set to the planetary shaft regular phase XP without using any threaded jig 7. In this case, in the manufacturing method according to the present embodiment, the same structures as those of the manufacturing method according to the first embodiment are employed except the structures described blow.

<Method for Manufacturing Rotational Rectilinear Motion Conversion Mechanism>

The manufacturing method according to the present embodiment corresponds to a manufacturing method obtained by adding the following change to the manufacturing method according to the first embodiment.

[process HX] is carried out after [process H].
[process K] and [process L] are omitted.
[process L] is changed to the following contents.

A description will be given below of detailed contents of the changed point.

Figure 34:
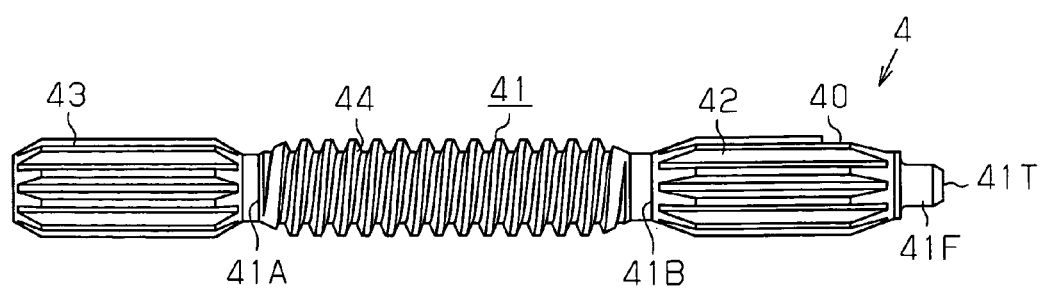
FIG. 34 is a front view showing a planetary shaft in a second embodiment of a method for manufacturing the conversion mechanism of FIG. 1.

[process HX (FIG. 34)] The process forms an indicator (planetary indicator 40) for comprehending the rotational phases of the front planetary gear 42 and the planetary threaded section 44 in each of the planetary shaft main bodies 41. Specifically, the process forms one of a plurality of teeth provided in the front planetary gear 42 in a different shape from the other teeth (standard teeth), and employs the tooth (the different formed tooth) having the different shape as the planetary indicator 40. Accordingly, the front planetary gear 42 after passing through the process has a plurality of standard teeth having the same shape, and one different formed tooth having the different shape from the standard teeth.

In the manufacturing method according to the present embodiment, since the front planetary gear 42 and the planetary threaded section 44 are simultaneously rolled through the previous process H, the rotational phase of the planetary indicator 40 is set in a fixed relation to the rotational phases of the front planetary gear 42 and the planetary threaded section 44. Accordingly, it is possible to comprehend the rotational phases of the front planetary gear 42 and the planetary threaded section 44 based on the planetary indicator 40.

[process L] The process sets the planetary shaft relative phase MP to the planetary shaft regular phase XP by the relation between the rotational phase of the sun indicator 30 and the rotational phase of the planetary indicator 40. Specifically, the planetary shaft relative phase MP is set to the planetary shaft regular phase XP by comprehending a difference between the rotational phase of the planetary indicator 40 and the planetary shaft regular phase XP based on a comparison between the rotational phase of the sun indicator 30 and the rotational phase of the planetary indicator 40, and rotating the planetary shaft main body 41 in such a manner that the relative rotational phase difference runs short.

Effects of the Embodiment

As mentioned above in detail, according to the method for manufacturing the rotational rectilinear motion conversion mechanism of the second embodiment, the following effect can be obtained in addition to the effects (1) to (18) according to the previous first embodiment.

(20) In accordance with the manufacturing method of the present embodiment, since it is possible to set the planetary shaft relative phase MP to the planetary shaft regular phase XP without using any threaded jig 7, it is possible to reduce cost of the threaded jig 7 and labor hours required for management.

Modification of Embodiment

The second embodiment may be modified, for example, as described below.

In the second embodiment mentioned above, the threading method of the front planetary gear 42 and the planetary threaded section 44 may be changed, for example, as follows. In other words, it is possible to employ a method of forming a groove as the planetary indicator 40 in the basic planetary shaft main body before threading, and thereafter simultaneously threading the front planetary gear 42 and the planetary threaded section 44 based on the planetary indicator 40, or a method of separately threading the front planetary gear 42 and the planetary threaded section 44 based on the planetary indicator 40.

A third embodiment of the present invention will now be described.

In the first embodiment, the third assembly 93 is assembled by combining the sun shaft main body 31 and the planetary shaft main body 41 so as to assemble the first assembly 91, and thereafter combining the front ring gear 22 and the ring shaft main body 21 with the first assembly 91. On the contrary, in the present embodiment, the third assembly 93 is assembled by forming an assembly of a combination of the ring shaft main body 21 and the planetary shaft main body 41, and thereafter combining the sun shaft main body 31 and the front sun gear 32 with respect to the assembly. In this case, in the manufacturing method according to the present embodiment, there are employed the same structures as the manufacturing method according to the first embodiment except the structures described below.

<Structure of Rotational Rectilinear Motion Conversion Mechanism>

The structure of the rotational rectilinear motion conversion mechanism 1 according to the present embodiment is different from the rotational rectilinear motion conversion mechanism according to the first embodiment in the following points.

The front ring gear 22 is integrally formed with the ring shaft main body 21.

The front sun gear 32 is formed separately from the sun shaft main body 31.

The sun shaft main body 31 is structured such that the front sun gear 32 can be attached to the main body gear portion 31B from the front of the sun shaft main body 31. In other words, a portion of the sun shaft main body 31 is formed separately from the sun shaft main body 31, the portion being interfered with the front sun gear 32 at a time of moving the front sun gear 32 from the front to the rear on the sun shaft main body 31. In this case, these separately formed elements are assembled to a specified position on the sun shaft main body 31 after the front sun gear 32 is assembled in the main body gear portion 31B.

<Method for Manufacturing Rotational Rectilinear Motion Conversion Mechanism>

The method for manufacturing the rotational rectilinear motion conversion mechanism 1 according to the present embodiment is different from the method for manufacturing the rotational rectilinear motion conversion mechanism according to the first embodiment in the following points.

Figure 35:
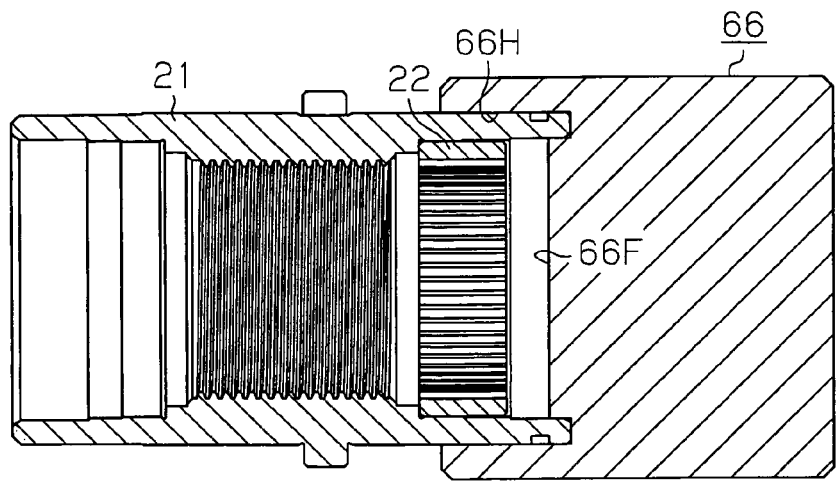
FIG. 35 is a process chart of a process J in a third embodiment of a method for manufacturing the conversion mechanism of FIG. 1.

[process J (FIG. 35)] The ring shaft main body 21 is attached to a third jig 66.

The third jig 66 is structured such that the ring shaft main body 21 can be fixed in a state in which the ring shaft main body 21 is inserted to a bearing hole 66H. Further, it is structured such that the front distal end portion 41T can be brought into contact with a jig end surface 66F at a time of arranging the planetary shaft main body 41 so as to be spaced at a fixed interval in a radial direction in an inner peripheral side with respect to the ring shaft main body 21.

[process K] The rotational phase with respect to the threaded jig 7 is set to the identical rotational phase in all the planetary shaft main bodies 41 by attaching each of the planetary shaft main bodies 41 to the threaded jig 7, as a preparation for assembling an assembly (fifth assembly 95) formed by a combination between the ring shaft main body 21 in the third assembled state and the planetary shaft main body 41. In this case, the third assembled state means a state where the engagement between the front ring gear 22 and each of the front planetary gears 42 and the engagement between the annular threaded section 24 and each of the planetary threaded sections 44 are obtained in the state where the planetary shaft main bodies 41 are arranged at a uniform interval around the center line of the ring shaft main body 21.

Figure 36:
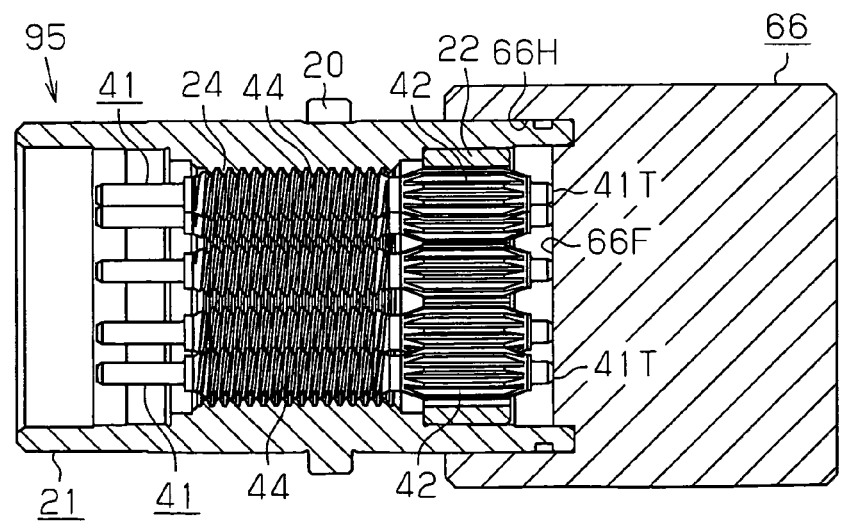
FIG. 36 is a process chart of a process L in the method for manufacturing the conversion mechanism of FIG. 1.

[process L (FIG. 36)] The process assembles a fifth assembly 95. In other words, the fifth assembly 95 is assembled by engaging the front ring gear 22 of the ring shaft main body 21 and the annular threaded section 24, and the front planetary gear 42 of each of the planetary shaft main bodies 41 and the planetary threaded section 44 with each other.

In this case, as a factor indicating the relation of the planetary shaft main body 41 with respect to the ring shaft main body 21, "circumferential relative position MR", "radial relative position ML", "axial relative position MS" and "planetary shaft relative phase MP" are respectively defined as follows.

A circumferential relative position MR is defined by a position in a circumferential direction of the planetary shaft main body 41 with respect to the ring shaft main body 21.

A radial relative position ML is defined by a position in a radial direction of the planetary shaft main body 41 with respect to the ring shaft main body 21.

An axial relative position MS is defined by a position in an axial direction of the planetary shaft main body 41 with respect to the ring shaft main body 21.

A planetary shaft relative phase MP is defined by the rotational phase of the planetary shaft main body 41 with respect to the rotational phase of the ring shaft main body 21.

Further, "circumferential relative position MR", "radial relative position ML", "axial relative position MS" and "planetary shaft relative phase MP" in the fifth assembly 95 are respectively defined as follows.

A circumferential regular position XR is defined by the circumferential relative position MR in the fifth assembly 95.

A radial regular position XL is defined by the radial relative position ML in the fifth assembly 95.

An axial regular position XS is defined by the axial relative position MS in the fifth assembly 95.

A planetary shaft regular phase XP is defined by the planetary shaft relative phase MP in the fifth assembly 95.

In the manufacturing method according to the present embodiment, the circumferential relative position MR, the radial relative position ML, the axial relative position MS and the planetary shaft relative phase MP of each of the planetary shaft main bodies 41 are respectively set through the following methods (A) to (D), at a time of assembling the ring shaft main body 21 and each of the planetary shaft main bodies 41.

(A) The circumferential relative position MR can be set to the circumferential regular position XR based on the rotational phase of the annular indicator 20 by previously comprehending a corresponding relation between the rotational phase of the annular indicator 20 of the ring shaft main body 21 and the circumferential regular position XR.

(B) The radial relative position ML can be set to the radial regular position XL by abutting the planetary shaft main body 41 against the ring shaft main body 21 from the radial direction in the inner peripheral side.

(C) The axial relative position MS can be set to the axial regular position XS based on the position of the front distal end portion 41T by previously comprehending a corresponding relation between the ring shaft main body 21 and the front race side distal end portion 41T of the planetary shaft main body 41 at the axial regular position XS.

(D) The planetary shaft relative phase MP can be set to the planetary shaft regular phase XP based on the rotational phase of the annular indicator 20 by previously comprehending a corresponding relation between the rotational phase of the annular indicator 20 of the ring shaft main body 21 and the planetary shaft regular phase XP. Specifically, the setting of the planetary shaft regular phase XP based on the annular indicator 20 is achieved as follows.

In the manufacturing method according to the present embodiment, a relation between the rotational phase of the annular indicator 20 and the rotational phase of the annular threaded section 24 always comes to a fixed relation by forming the annular threaded section 24 based on the annular indicator 20 of the ring shaft main body 21. Further, the relation between the rotational phase of the annular indicator 20 and the rotational phase of the annular threaded section 24 is previously comprehended. Further, the rotational phase (planetary shaft reference phase BP) of the planetary shaft main body 41 is previously comprehended with respect to the rotational phase of the ring shaft main body 21 at a time of fastening the planetary shaft main body 41 to the threaded jig 7 in a state in which the center line of the ring shaft main body 21 becomes parallel to the center line of the internally threaded section 73 (the planetary shaft main body 41) of the threaded jig 7.

Accordingly, since it is possible to set the relation between the rotational phase of the annular threaded section 24 and the rotational phase of the planetary shaft main body 41 on the assumption that the rotational phase of the annular indicator 20 is the rotational phase of the annular threaded section 24, it is possible to set the planetary shaft relative phase MP to the planetary shaft regular phase XP based on the rotational phase of the annular indicator 20 and the planetary shaft reference phase BP. In other words, it is possible to set the planetary shaft relative phase MP to the planetary shaft regular phase XP based on the rotational phase of the annular indicator 20 by attaching the planetary shaft main body 41 to the threaded jig 7 so as to index the planetary shaft reference phase BP.

In the process L, the fifth assembly 95 is specifically assembled in accordance with the following [process L] to [process L].

Prior to a description of each of the assembling procedures, a description will be given of "reference plane VP", "reference line VL" and "reference position VR".

(a) A plane which is orthogonal to the center line of the ring shaft main body 21 is set to a reference plane VP.

(b) A point on the reference plane VP is set to a first reference point PA, in the center line of the ring shaft main body 21.

(c) A point on the reference plate VP is set to a second reference point PB, in the center line of the planetary shaft main body 41 positioned at the circumferential regular position XR.

(d) A line passing through the first reference point PA and the second reference point PB is set to a reference line VL on the reference plane VP.

(e) A position except the radial regular position XL in the position in which its own center line is orthogonal to the reference line VL is set to a reference position VR, in the planetary shaft main body 41. In other words, the reference position VR corresponds to a position in which the circumferential relative position MR is the circumferential regular position XR and the radial relative position ML is not the radial regular position XL.

A description will be given of an assembling procedure for the fifth assembly 95. In this case, the processes L1 to L5 show an assembling procedure of one planetary shaft main body 41.

[process L] The planetary shaft main body 41 is detached from the threaded jig 7 by dividing the threaded jig 7. At this time, the planetary shaft main body 41 is in a state where its own center line becomes parallel to the center line of the sun shaft main body 31.

[process L] The planetary shaft main body 41 is arranged in the reference position VR based on the rotational phase of the annular indicator 20. In other words, the planetary shaft main body 41 is moved to a position (reference position VR) in which its own center line intersects the reference line VL obtained by the second reference point PB and the first reference point PA of its own circumferential regular position XR. At this time, the planetary shaft main body 41 is moved in a state of keeping the relation to the rotational phase of the ring shaft main body 21 (the annular indicator 20). Further, the reference position VR selects a position at which the front distal end portion 41T can be struck against the jig end surface 66F of the third jig 66 at a time of moving in parallel the planetary shaft main body 41 along the center line.

[process L] The planetary shaft relative phase MP is set to the planetary shaft regular phase XP based on the rotational phase of the annular indicator 20. Specifically, the planetary shaft relative phase MP is set to the planetary shaft regular phase XP by rotating the planetary shaft main body 41 in such a manner that a difference of the relative rotational phases runs short, after comprehending the difference between the planetary reference phase BP and the planetary shaft regular phase XP based on a comparison between the rotational phase of the annular indicator 20 and the planetary shaft reference phase BP.

[process L] The axial relative position MS is set to the axial regular position XS by moving the planetary shaft main body 41 in parallel along the center line so as to abut the front distal end portion 41T against the jig end surface 66F.

[process L] The radial relative position ML is set to the radial regular position XL by moving the planetary shaft main body 41 in parallel so as to abut against the ring shaft main body 21 in the state where the center line of the planetary shaft main body 41 becomes parallel to the center line of the ring shaft main body 21. Specifically, the planetary shaft main body 41 is moved in parallel from the reference position VR to the radial regular position XL in such a manner that a locus of the center line (the second reference point PB) of the planetary shaft main body 41 on the reference plane VP is aligned with the reference line VL. At this time, since the planetary shaft main body 41 is arranged at the radial regular position XL in a state in which the planetary shaft main body 41 is set to the circumferential regular position XR, the axial regular position XS and the planetary shaft regular phase XP, it is possible to simultaneously obtain the engagement between the front planetary gear 42 and the front ring gear 22 and the engagement between the planetary threaded section 44 and the annular threaded section 24.

Figure 37:
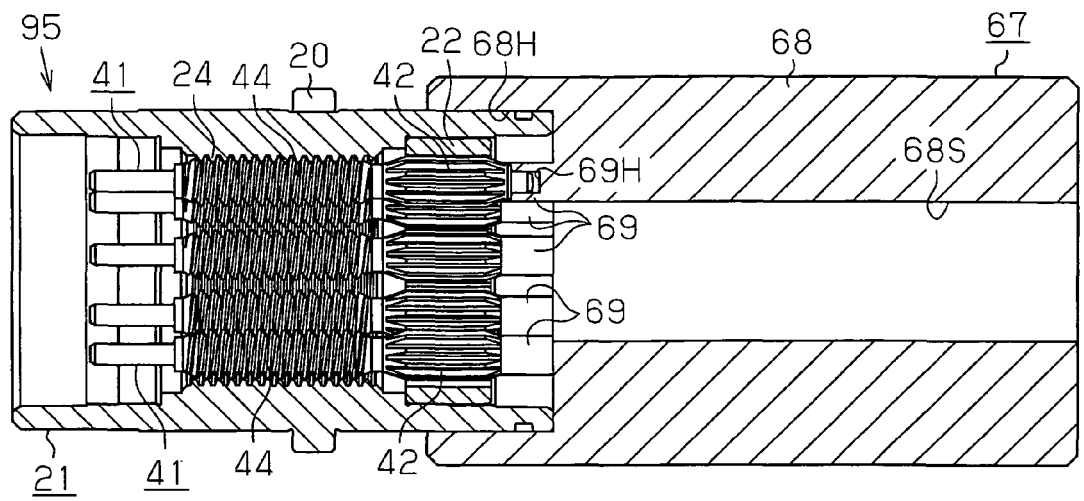
FIG. 37 is a process chart of a process M in the method for manufacturing the conversion mechanism of FIG. 1.

[process M (FIG. 37)] The jig attached to the fifth assembly 95 is changed from the third jig 66 to a fourth jig 67.

The fourth jig 67 is structured such as to be provided with an annular jig 68 for fixing the ring shaft main body 21 and a planetary jig 69 for supporting the front shaft 41F of the planetary shaft main body 41. In other words, the same number of planetary jigs 69 as the number of the planetary shafts 4 provided in the conversion mechanism 1 are integrally formed with the annular jig 68.

The annular jig 68 is structured such that its own center line (center line of a support hole 68H) is aligned with the center line of the ring shaft main body 21 in a state in which the ring shaft main body 21 is inserted to the support hole 68H. Further, the structure is made such that its own center line is aligned with the center line of the sun shaft main body 31 in a state in which the sun shaft main body 31 is inserted to a bearing hole 68S. Each of the planetary jigs 69 is structured such that their center lines are spaced at a uniform interval around the center line of the bearing hole 68H. The annular jig 68 and each of the planetary jigs 69 are structured such that their center lines become in parallel to each other. A hole (support hole 69H) corresponding to a shape of the front shaft 41F of the planetary shaft main body 41 is formed in a distal end portion of each of the planetary jigs 69.

In the process M, the fifth assembly 95 is specifically attached to the fourth jig 67 through the following operations (a) to (c).

(a) The fifth assembly 95 is detached from the third jig 66 in a state of keeping the relation between the ring shaft main body 21 and each of the planetary shaft main bodies 41 in the fifth assembly 95.

(b) The fifth assembly 95 is moved to the position in which the center line of the fourth jig 67 is aligned with the center line of the ring shaft main body 21, and the position in which the center line of the planetary jig 69 is aligned with the center line of the planetary shaft main body 41.

(c) The fifth assembly 95 is attached to the fourth jig 67 by moving the fifth assembly 95 in parallel along the center line. In other words, the ring shaft main body 21 is inserted to the support hole 68H and the front shaft 41F of each of the planetary shaft main bodies 41 is fitted to the support hole 69H of the corresponding planetary jig 69.

[process N] The retainer 65 is installed to each of the planetary shaft main bodies 41 of the fifth assembly 95.

Figure 38:
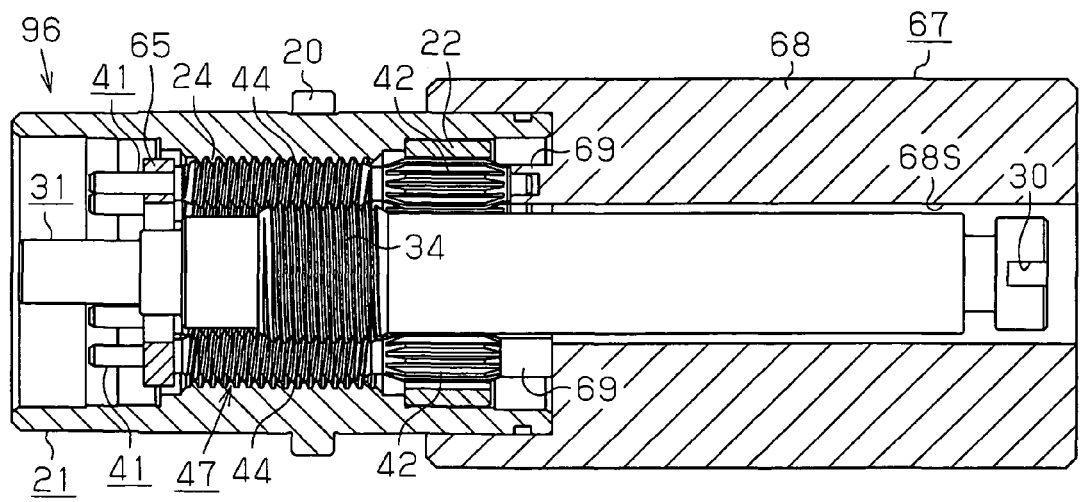
FIG. 38 is a process chart of a process O in the method for manufacturing the conversion mechanism of FIG. 1.

[process O (FIG. 38)] The process assembles an assembly (sixth assembly 96) formed by a combination of the fifth assembly 95 and the sun shaft main body 31. In other words, the sixth assembly 96 is assembled by engaging each of the planetary threaded sections 44 of the fifth assembly 95 with the sun threaded section 34 of the sun shaft main body 31. As mentioned above, in the fifth assembly 95, since it is possible to engage each of the planetary threaded sections 44 with the sun threaded section 34, it is possible to assume that one externally threaded section having a discontinuous thread ridge is formed by these planetary threaded sections 44. In the following description, one externally threaded section formed by the planetary threaded sections 44 and engaging with the sun threaded section 34 is set as a counter sun threaded section 47.

In this case, with regard to rotational phases of the counter sun threaded section 47 and the sun threaded section 34, the rotational phase of the counter sun threaded section 47 coincides with the rotational phase of the sun threaded section 34 in a state in which the sun threaded section 34 begins to be engaged with the counter sun threaded section 47. In other words, it is assumed that a difference between the relative rotational phases is not generated between the counter sun threaded section 47 and the sun threaded section 34. Further, a sun threaded section reference phase RD is set to the rotational phase of the sun threaded section 34 with respect to the rotational phase of the counter sun threaded section 47 in a state in which the sun threaded section rotational phase difference is not generated.

In the process O, the rotational phase of the sun threaded section 34 (the sun shaft main body 31) is set to the sun threaded section reference phase RD before assembling the sixth assembly 96. Accordingly, since it is possible to engage the counter sun threaded section 47 with the sun threaded section 34 by moving the sun shaft main body 31 in parallel along the center line, in the state where the center line of the sun shaft main body 31 is aligned with the center line of the ring shaft main body 21 of the fifth assembly 95, it is possible to achieve an improvement in labor efficiency for assembling the sixth assembly 96.

In the manufacturing method according to the present embodiment, since the fifth assembly 95 is assembled through the combination of the ring shaft main body 21 and the planetary shaft main body 41 based on the annular indicator 20 of the ring shaft main body 21, the relation between the rotational phase of the annular indicator 20 and the rotational phase of the counter sun threaded section 47 always comes to a fixed relation. Further, since the sun threaded section 34 is formed based on the sun indicator 30 of the sun shaft main body 31, the relation between the rotational phase of the sun indicator 30 and the rotational phase of the sun threaded section 34 always comes to a fixed relation. Accordingly, the structure is made such as to previously comprehend the relation between the rotational phase of the annular indicator 20 and the rotational phase of the counter sun threaded section 47 in the fifth assembly 95, and the relation between the rotational phase of the sun indicator 30 and the rotational phase of the sun threaded section 34 in the sun shaft main body 31. Therefore, it is possible to set the rotational phase of the sun threaded section 34 on the assumption that the rotational phase of the annular indicator 20 is the rotational phase of the counter sun threaded section 47, and the rotational phase of the sun indicator 30 is the rotational phase of the sun threaded section 34. In other words, it is possible to set the rotational phase of the sun threaded section 34 to the sun threaded section reference phase RD based on the relation between the rotational phase of the annular indicator 20 and the rotational phase of the sun indicator 30.

In the process O, the sixth assembly 96 is specifically assembled through the following operations (a) to (d).

(a) The sun shaft main body 31 is arranged at a position in which the center line of the ring shaft main body 21 is aligned with its own center line in the rear of the fifth assembly 95.

(b) The rotational phase of the sun threaded section 34 is set to the sun threaded section reference phase RD based on the relation between the rotational phase of the annular indicator 20 and the rotational phase of the sun indicator 30.

(c) Each of the planetary threaded sections 44 (the counter sun threaded section 47) of the fifth assembly 95 is engaged with the sun threaded section 34 by moving the sun shaft main body 31 in parallel along the center line in a state of keeping the sun shaft main body 31 in an attitude which is set through the works (a) and (b) mentioned above.

(d) The sun shaft main body 31 is fastened until the relative position in the axial direction of the sun shaft main body 31 comes to a predetermined position with respect to the ring shaft main body 21.

Figure 39:
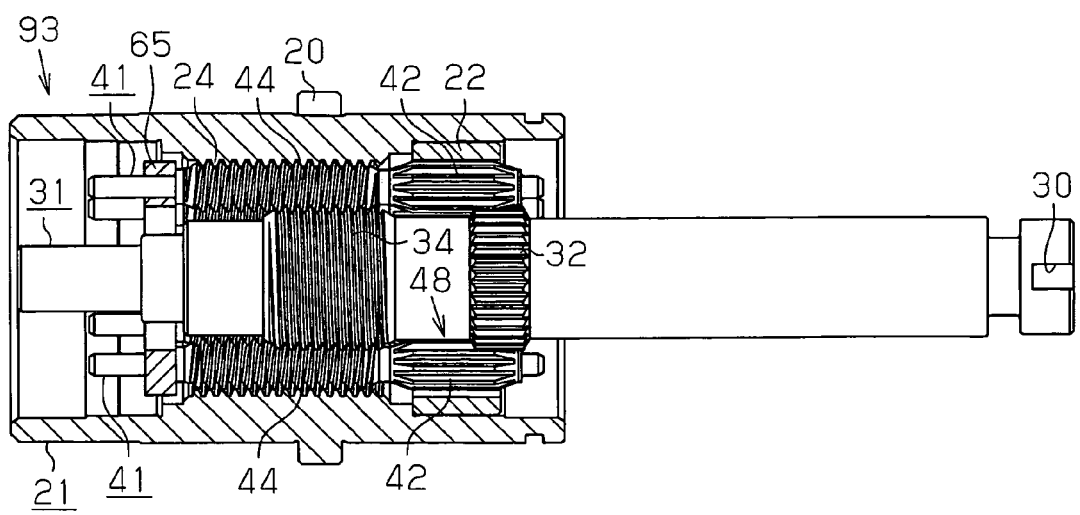
FIG. 39 is a process chart of a process P in the method for manufacturing the conversion mechanism of FIG. 1.

[process P (FIG. 39)] An assembly (third assembly 93) formed by a combination of the sixth assembly 96 and the front sun gear 32 is assembled. In other words, the third assembly 93 is assembled by engaging the front planetary gear 42 of the sixth assembly 96 with the front sun gear 32. As mentioned above, in the sixth assembly 96, since it is possible to engage the front sun gear 32 with each of the front planetary gears 42, it is possible to assume that one gear having a discontinuous shape is formed by the front planetary gear 42. In the following description, one gear formed by these front planetary gears 42 and engaging with the front sun gear 32 is set as a counter sun gear 48.

In this case, with regard to the rotational phases of the counter sun gear 48 and the front sun gear 32, the rotational phase of the counter sun gear 48 coincides with the rotational phase of the front sun gear 32, in a state in which the front sun gear 32 engages with the counter sun gear 48. In other words, it is assumed that a difference (sun gear rotational phase difference) of the relative rotational phase is not generated between the counter sun gear 48 and the front sun gear 32. Further, a sun gear reference phase RE is set as the rotational phase of the front sun gear 32 with respect to the rotational phase of the counter sun gear 48 in the state where the sun gear rotational phase difference is not generated.

In the process P, the rotational phase of the front sun gear 32 is set to the sun gear reference phase RE before assembling the third assembly 93. Accordingly, since it is possible to engage the counter sun gear 48 with the front sun gear 32 by moving the front sun gear 32 in parallel along the center line, in the state where the center line of the front sun gear 32 is aligned with the center line of the ring shaft main body 21 of the sixth assembly 96, it is possible to achieve an improvement of the working efficiency for assembling of the third assembly 93.

In the manufacturing method according to the present embodiment, since the fifth assembly 95 is assembled through the combination of the ring shaft main body 21 and the planetary shaft main body 41 based on the annular indicator 20 of the ring shaft main body 21, the relation between the rotational phase of the annular indicator 20 and the rotational phase of the counter sun gear 48 always comes to a fixed relation. Accordingly, the structure is made so as to set the rotational phase of the front sun gear 32 while assuming that the rotational phase of the annular indicator 20 is the rotational phase of the counter sun gear 48, by previously comprehending the relation between the rotational phase of the annular indicator 20 and the rotational phase of the counter sun gear 48 in the fifth assembly 95 (the sixth assembly 96). In other words, it is possible to set the rotational phase of the front sun gear 32 to the sun gear reference phase RE based on the relation between the rotational phase of the annular indicator 20 and the rotational phase of the front sun gear 32.

In the process P, the third assembly 93 is specifically assembled through the following operations (a) to (d).

(a) The front sun gear 32 is arranged at a position in which the center line of the sun shaft main body 31 is aligned with its own center line in the front of the sixth assembly 96.

(b) The rotational phase of the front sun gear 32 is set to the sun gear reference phase RE based on the relation between the rotational phase of the annular indicator 20 and the rotational phase of the front sun gear 32.

(c) Each of the front planetary gears 42 (the counter sun gear 48) is engaged with the front sun gear 32 by moving the front sun gear 32 in parallel along the center line in a state of keeping the front sun gear 32 in an attitude set through the works (a) and (b) mentioned above.

(d) The front sun gear 32 is fixed to the sun shaft main body 31 by press fitting the front sun gear 32 to the main body gear portion 31B.

Effects of the Embodiment

As mentioned above in detail, according to the method for manufacturing the conversion mechanism of the third embodiment, it is possible to obtain effects in proportion to the effects (1) to (19) mentioned above according to the previous first embodiment.

Modifications of the Embodiment

The third embodiment may be modified, for example, as described below.

In the third embodiment, the sixth assembly 96 is assembled by combining the front ring gear 22 with respect to the fifth assembly 95, however, the process until assembling the third assembly 93 may be changed as follows. In other words, an assembly formed by a combination of the fifth assembly 95 and the sun shaft main body 31 may be assembled, and the third assembly 93 may be assembled thereafter by the combination between the assembly and the front ring gear 22.

A fourth embodiment of the present invention will now be described with reference to FIGS. 40 to 72 while focusing on differences from the first embodiment.

Aim of the Present Embodiment

In the conversion mechanism 1, since the ring shaft main body 21, the front ring gear 22 and the rear ring gear 23 are separately formed, and the sun shaft main body 31 and the rear sun gear 33 are separately formed, there is generated a reduction of a rate (work conversion efficiency HS) of the work of the sun shaft 3 with respect to the work of the ring shaft 2, that is, a reduction of a conversion efficiency from the rotational motion to the rectilinear motion. A description will be given below of a reason why the reduction in work conversion efficiency HS mentioned above is generated.

First of all, since the ring shaft main body 21, the front ring gear 22 and the rear ring gear 23 are separately formed, there is a case that the ring shaft 2 is assembled in a state in which the relative rotational phases of the front ring gear 22 and the rear ring gear 23 are shifted at a time of assembling the conversion mechanism 1. Further, in the case that each of the front planetary gear 42 and the rear planetary gear 43 is engaged with the corresponding ring gear in a state of greatly diverging from the engagement state at the design time, going with a displacement of the relative rotational phases of the front ring gear 22 and the rear ring gear 23, the reduction of the work conversion efficiency HS is caused due to an increase of a sliding resistance between the ring shaft 2 and the sun shaft 3, and the planetary shaft 4. Specifically, in the case that the relative rotational phases of the front ring gear 22 and the rear ring gear 23 are deviated in the ring shaft 2, that is, the relative rotational phases of the front ring gear 22 and the rear ring gear 23 do not substantially coincide with each other, the planetary shaft 4 comes to a state where the planetary shaft 4 is inclined to the ring shaft 2 and the sun shaft 3 in the assembled conversion mechanism 1 due to the displacement of the rotational phase mentioned above. Further, since a pitch circle diameter of engagement of the threaded sections is accordingly deviated greatly from the design value, and the engaging state of the threaded sections becomes excessively uneven in the axial direction, a sliding resistance in the engagement portion of the threaded sections is increased, and the reduction of the work conversion efficiency HS is going to be generated.

Next, since the sun shaft main body 31 and the rear sun gear 33 are separately formed, there is a case that the sun shaft 3 is assembled in a state in which the relative rotational phases of the front sun gear 32 and the rear sun gear 33 is deviated at a time of assembling the conversion mechanism 1. Further, in the case that each of the front planetary gear 42 and the rear planetary gear 43 is engaged with the corresponding sun gear in the state of being deviated greatly from the engagement state at the design time, going with the displacement of the relative rotational phases of the front sun gear 32 and the rear sun gear 33, the reduction of the work conversion efficiency HS is caused due to an increase of the sliding resistance between the ring shaft 2 and the sun shaft 3, and the planetary shaft 4. Specifically, in the case that the relative rotational phases between the front sun gear 32 and the rear sun gear 33 are deviated in the sun shaft 3, that is, the relative rotational phases of the front sun gear 32 and the rear sun gear 33 do not substantially coincide with each other, the planetary shaft 4 comes to a state where the planetary shaft 4 is inclined to at least one of the ring shaft 2 and the sun shaft 3 in the conversion mechanism 1 after being assembled due to the displacement of the rotational phases. Further, since the pitch circle diameter of the engagement of the threaded sections are accordingly deviated greatly from the design value, and the engagement state of the threaded sections becomes excessively uneven in the axial direction, the sliding resistance in the engagement portion of the threaded sections is increased, and the reduction of the work conversion efficiency HS is going to be generated.

In the manufacturing method according to the present embodiment, in order to accurately suppress the reduction of the work conversion efficiency HS as mentioned above, the constituent elements are combined so as to make the degree of inclination of each of the planetary shafts 4 with respect to the ring shaft 2 and the sun shaft 3 in the conversion mechanism after being assembled smaller than the reference degree.

Figure 40:
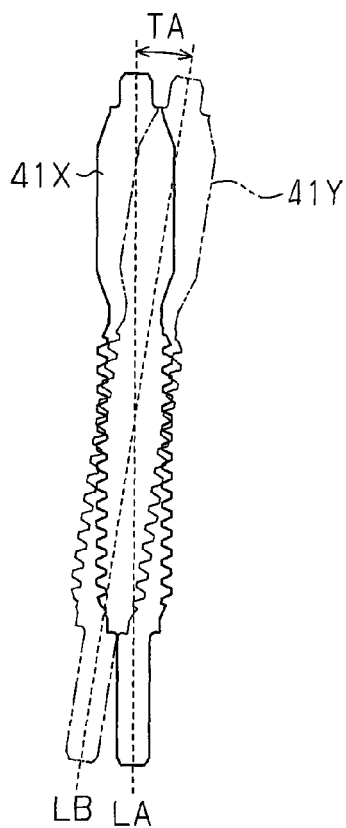
FIG. 40 is a schematic diagram showing a change of an attitude of the planetary shaft in a fourth embodiment of a method for manufacturing the conversion mechanism of FIG. 1.

As shown in FIG. 40, the degree of inclination of the planetary shaft 4 can be defined as an angle (slant angle TA) formed by a center line LA of a reference planetary shaft main body 41X and a center line LB of an inclined planetary shaft main body 41Y, on the assumption that the reference planetary shaft main body 41X is set to the planetary shaft main body 41 in a state of being in parallel to the sun shaft 3 or the ring shaft 2, and the inclined planetary shaft main body 41Y is set to the planetary shaft main body 41 in a state of being inclined to the sun shaft 3 or the ring shaft 2.

Figure 41:
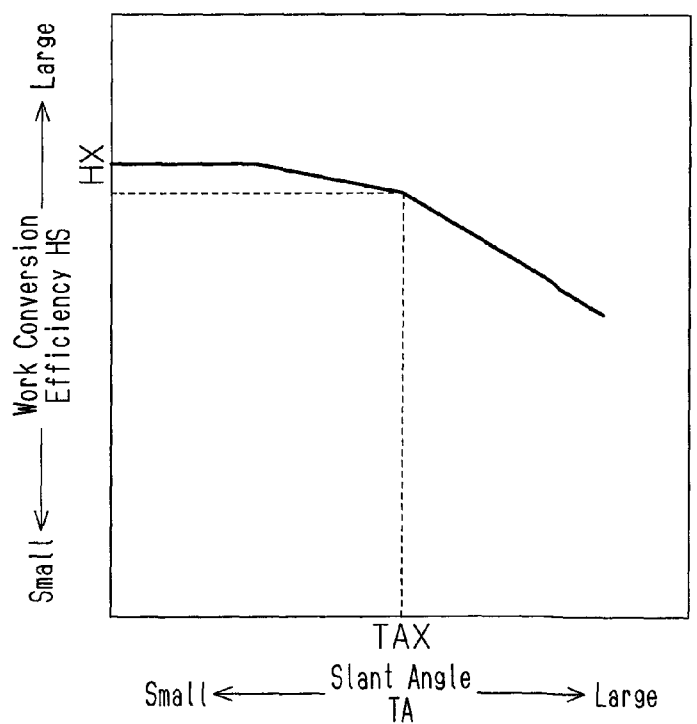
FIG. 41 is a graph showing the relation between an angle of slant of the planetary shaft and a work conversion efficiency of the conversion mechanism.
Figure 42:
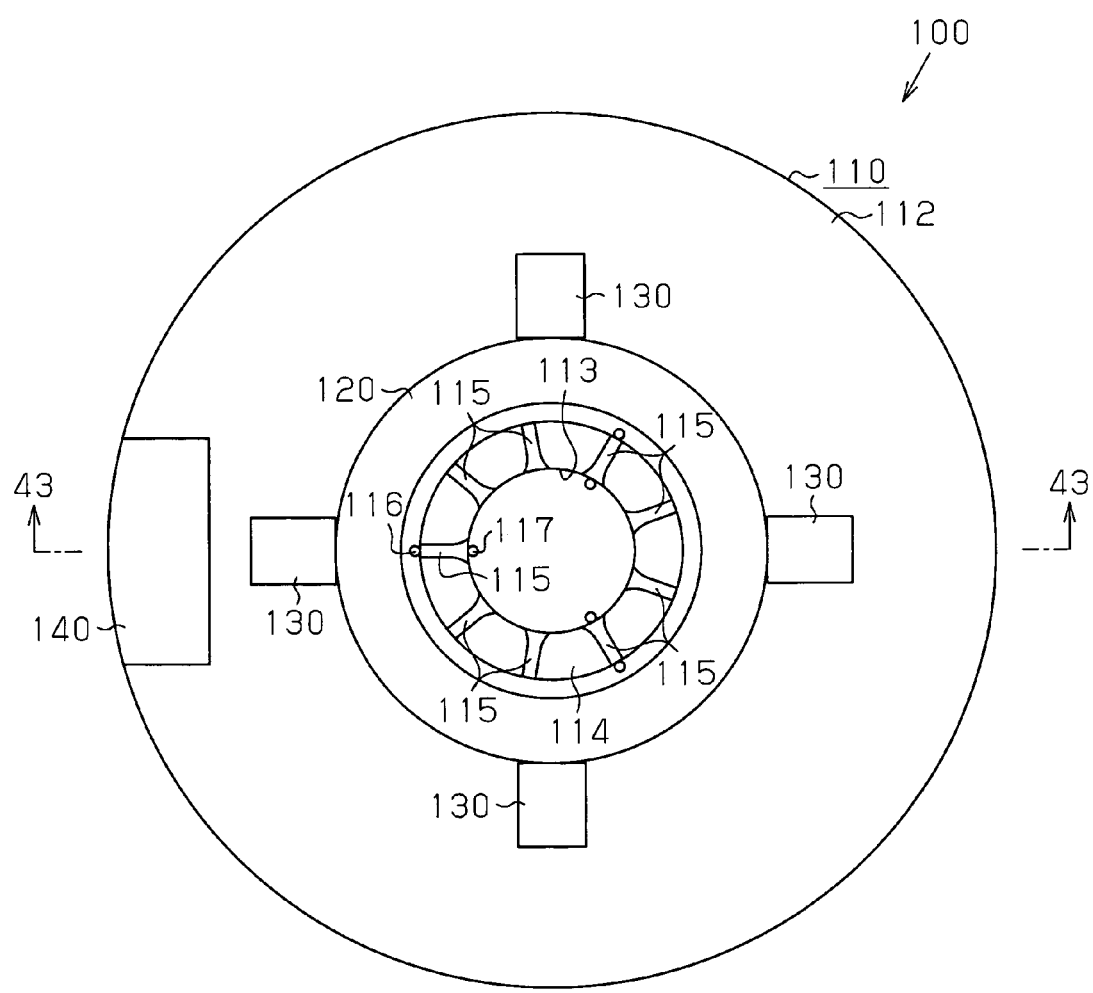
FIG. 42 is a plan view showing an assembling jig used in the method for manufacturing the conversion mechanism of FIG. 1.
Figure 43:
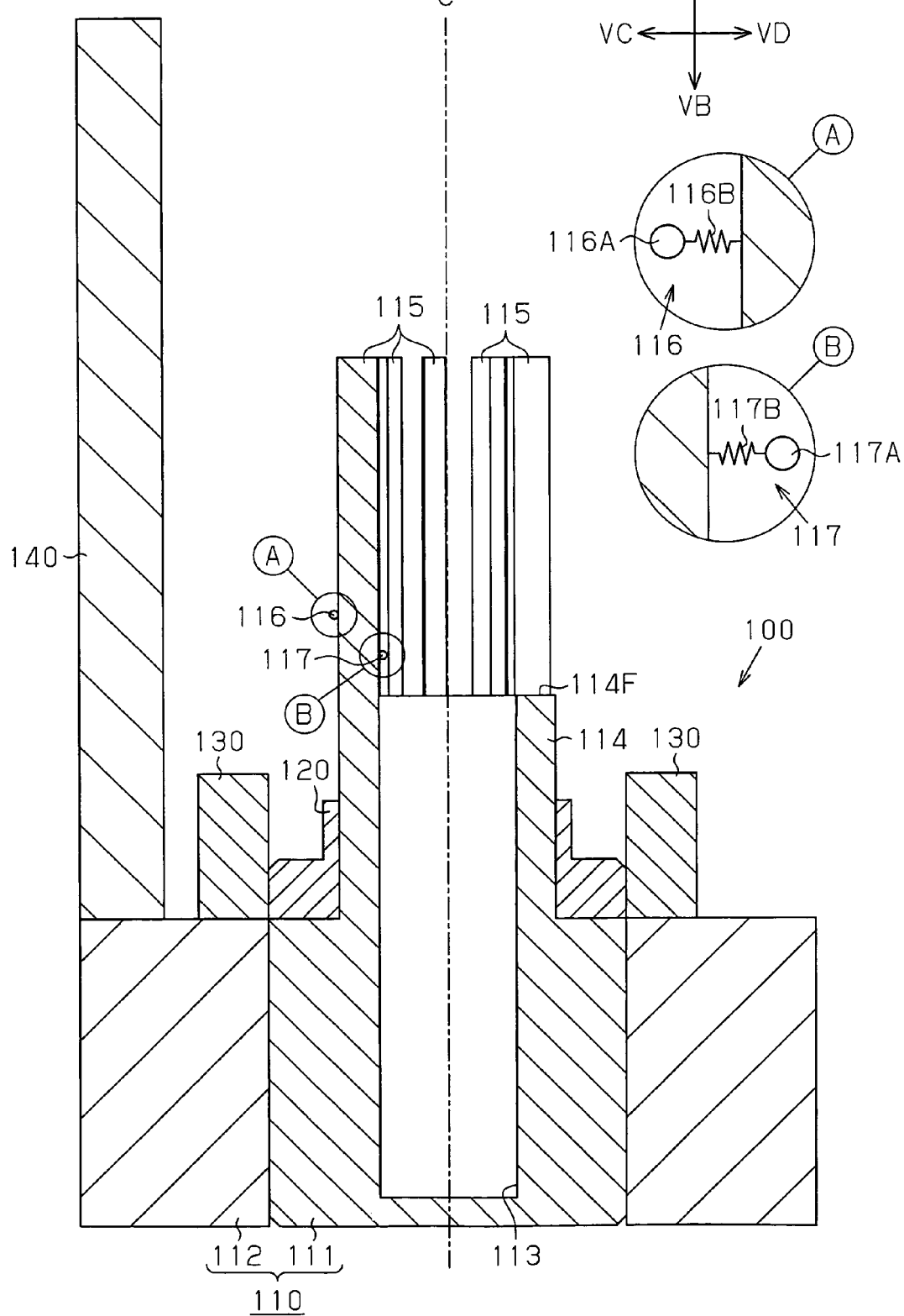
FIG. 43 is a cross-sectional view showing the cross-sectional structure taken along a line 43-43 in FIG. 42 of the assembling jig used in the method for manufacturing the conversion mechanism of FIG. 1.
Figure 44:
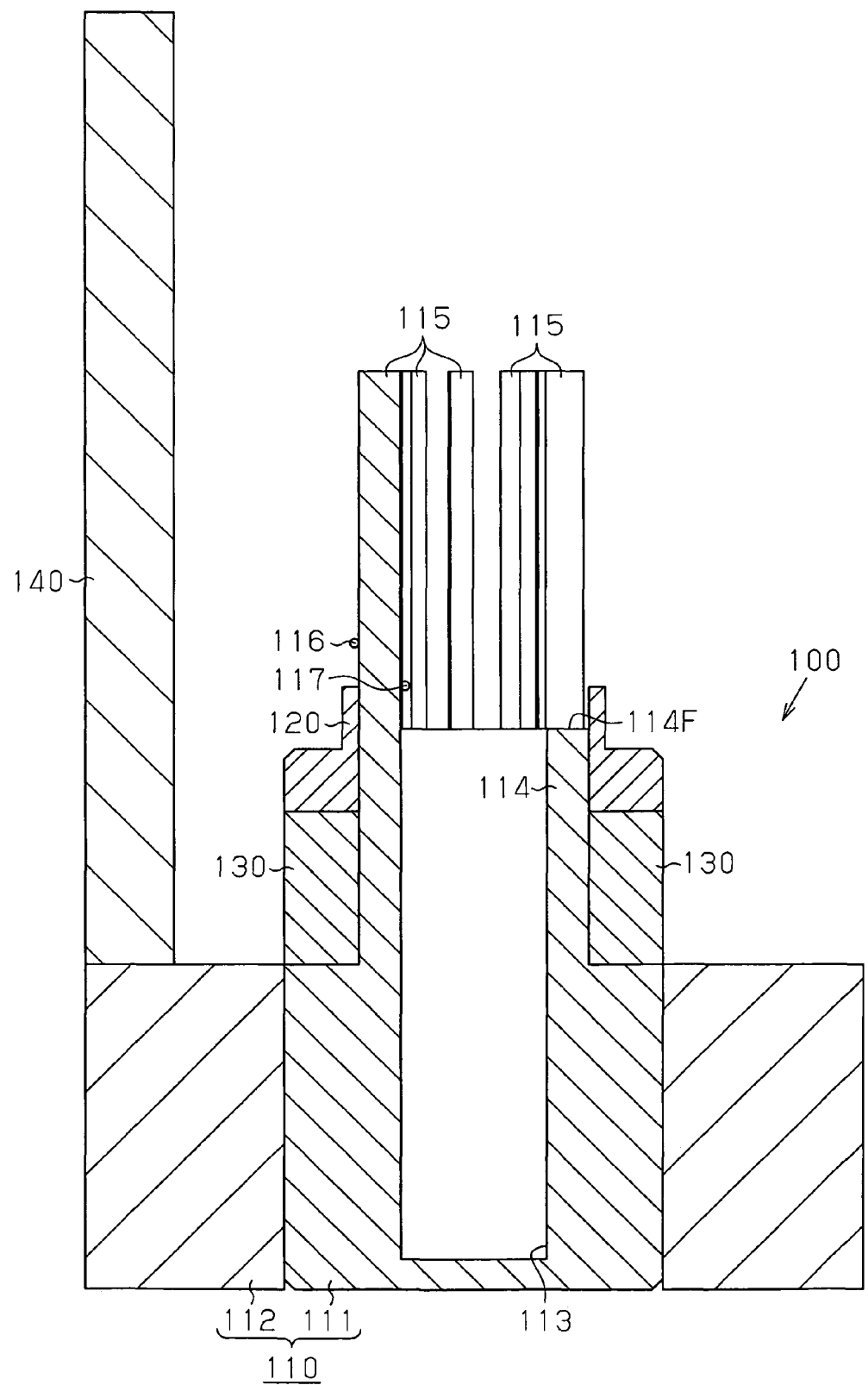
FIG. 44 is a cross-sectional view of the assembling jig used in the method for manufacturing the conversion mechanism of FIG. 1.

Further, the suppression of the reduction of the work conversion efficiency HS mentioned above corresponds to the fact that the slant angle TA in the conversion mechanism 1 after being assembled becomes smaller than a reference slant angle TAX, that is, a demand conversion efficiency HX is secured as the work conversion efficiency HS, on the assumption that the work conversion efficiency HS demanded in the conversion mechanism 1 is set to the demand conversion efficiency HX, and the slant angle TA corresponding to the demand conversion efficiency HX is set to the reference slant angle TAX in a relation between the slant angle TA and the work conversion efficiency HS shown in a graph in FIG. 41.

Main Difference From the First Embodiment

The manufacturing method according to the present embodiment is different from the manufacturing method according to the first embodiment in the following point. In other words, the manufacturing method according to the first embodiment is structured such as to assemble the gear assembly 99 through the gear jig 8, and thereafter assembling the gear assembly 99 in a lump to the ring shaft main body 21, the sun shaft main body 31 and each of the planetary shaft main body 41 of the third assembly 93 (refer to FIGS. 29 to 32), however, the manufacturing method according to the present embodiment is structured so as to install the rear ring gear 23 and the rear sun gear 33 to the ring shaft main body 21 or the sun shaft main body 31 of the corresponding assembly so as to assemble a fourteenth assembly 9D shown in FIG. 65, and thereafter installing the rear planetary gear 43 to each of the planetary shaft main bodies 41 of the assembly 9D. In this case, the same structures as the first embodiment are basically employed except the different point mentioned above.

<Outline of Manufacturing Method>

Figure 45:
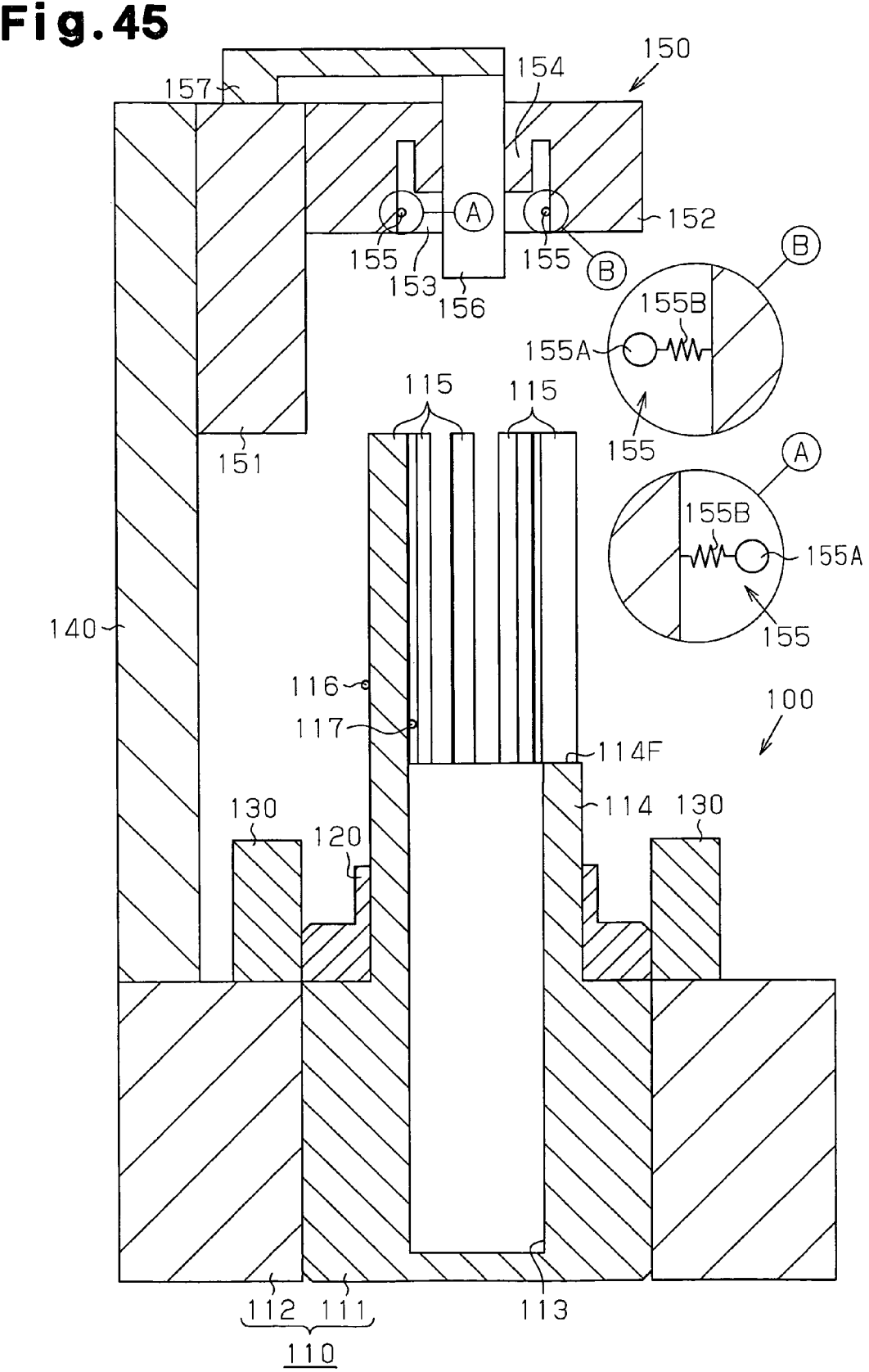
FIG. 45 is a cross-sectional view of the assembling jig used in the method for manufacturing the conversion mechanism of FIG. 1.
Figure 46:
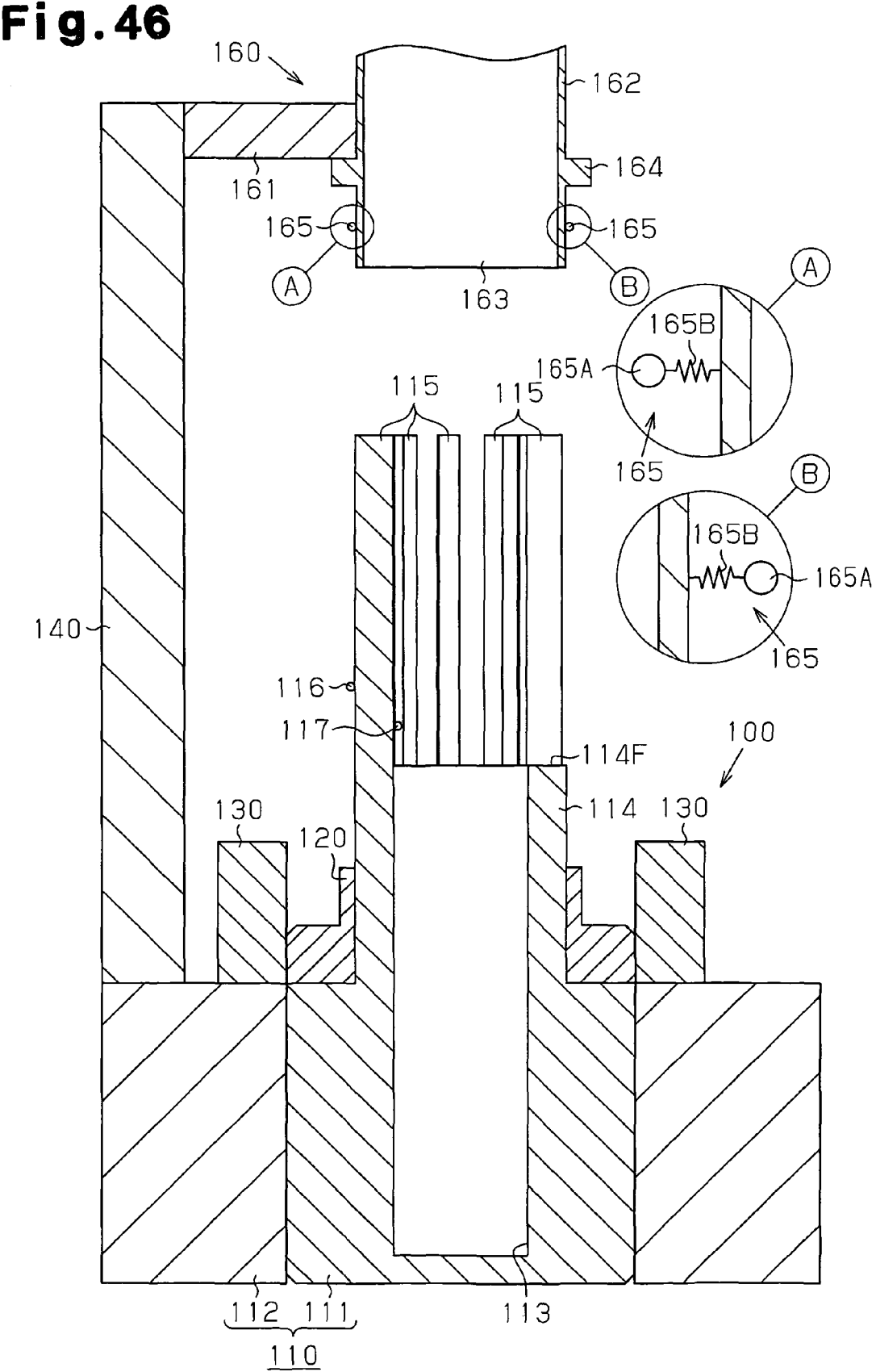
FIG. 46 is a cross-sectional view of the assembling jig used in the method for manufacturing the conversion mechanism of FIG. 1.
Figure 47A:
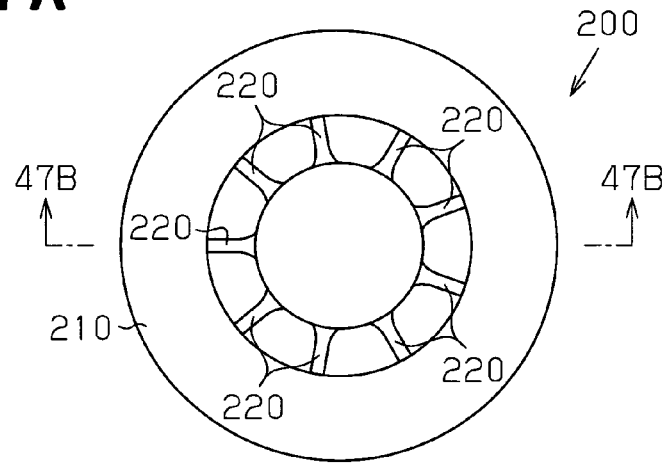
FIG. 47A is a plan view showing a support jig used in the method for manufacturing the conversion mechanism of FIG. 1.
Figure 47B:
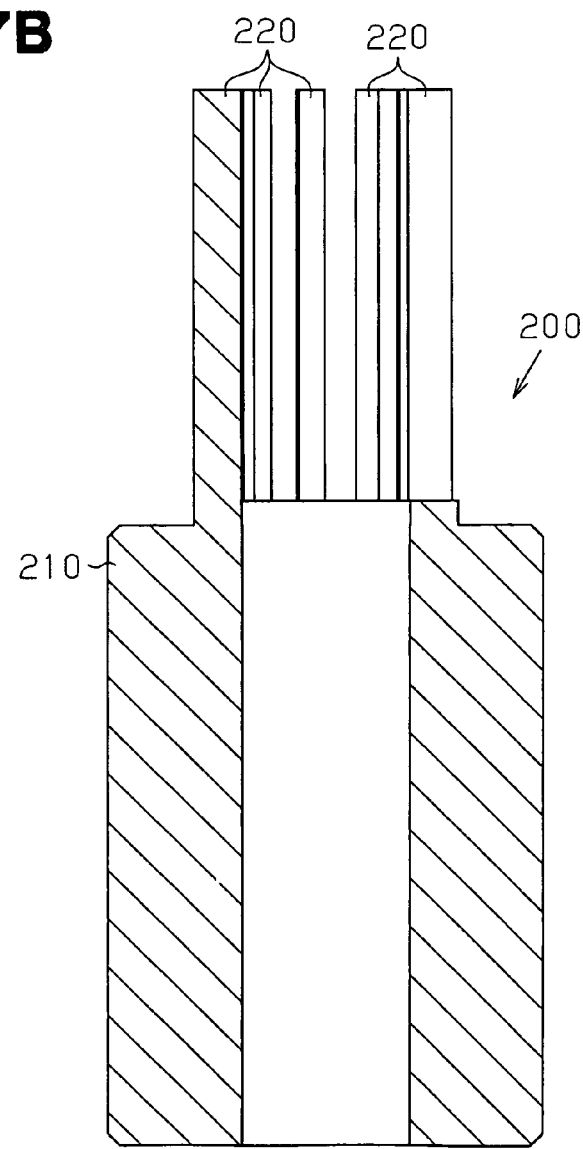
FIG. 47B is a cross-sectional view taken along line 47B-47B in FIG. 47A.
Figure 48:
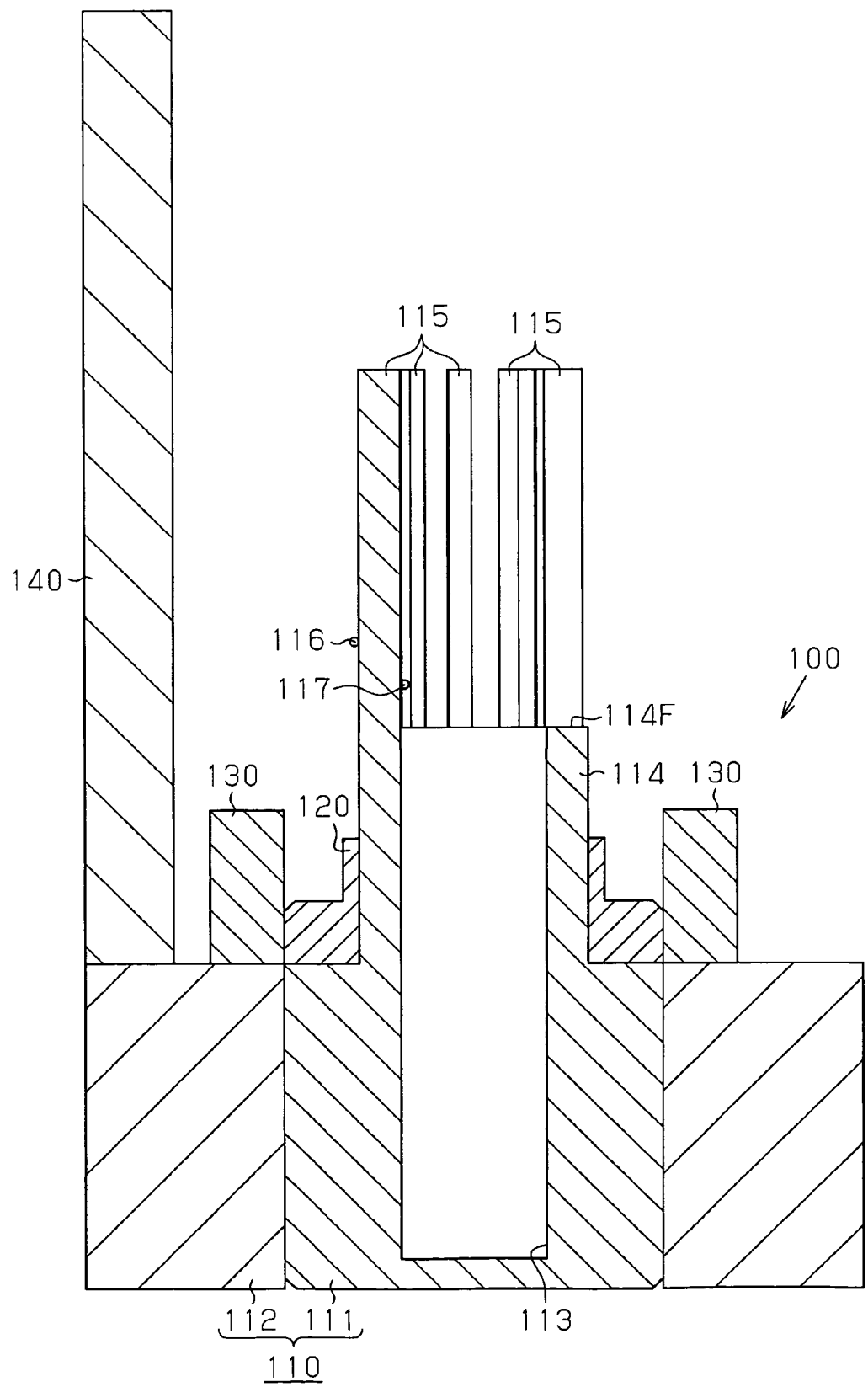
FIG. 48 is a process chart of a process KA in the method for manufacturing the conversion mechanism of FIG. 1.
Figure 49:
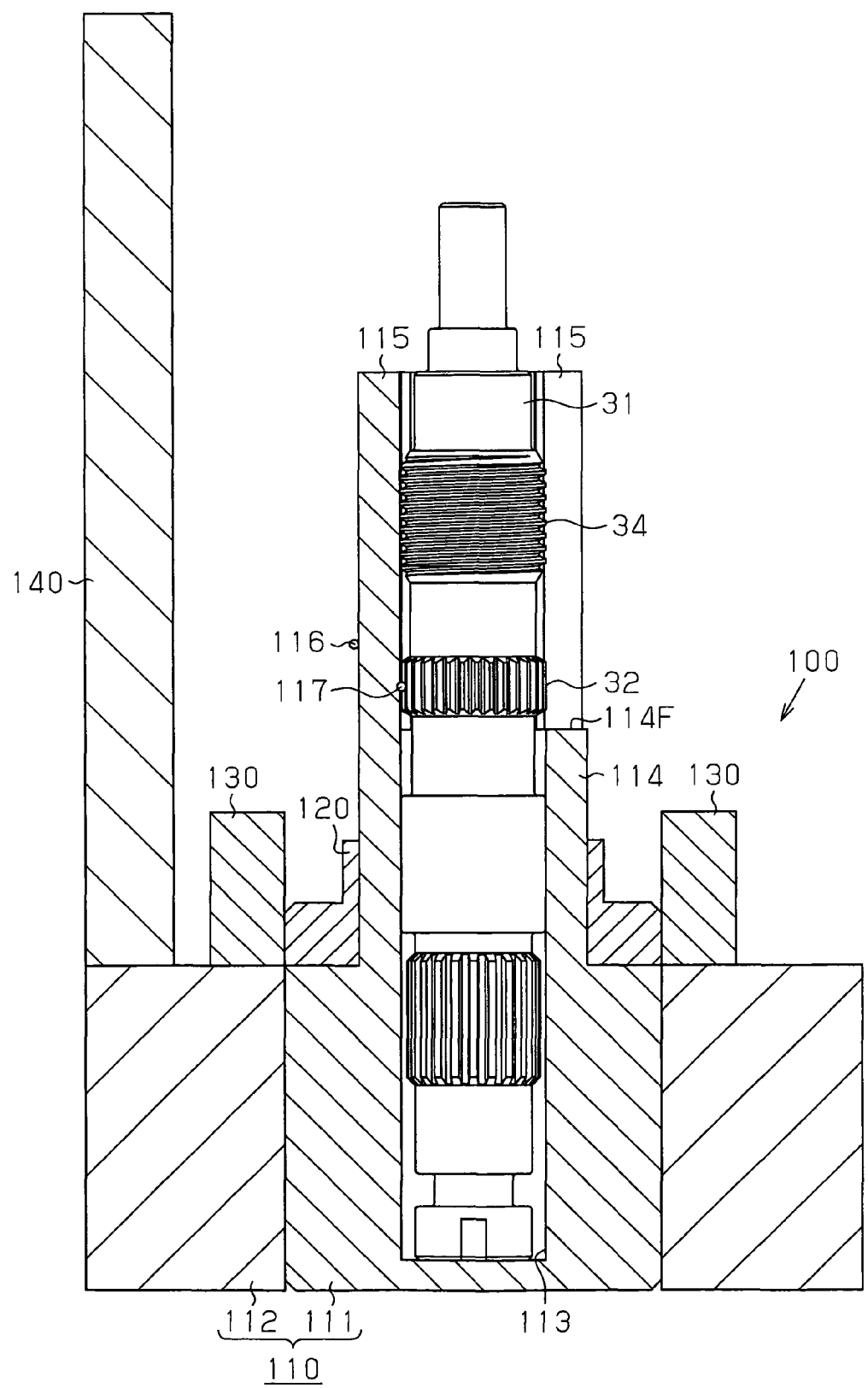
FIG. 49 is a process chart of a process XB in the method for manufacturing the conversion mechanism of FIG. 1.
Figure 50:
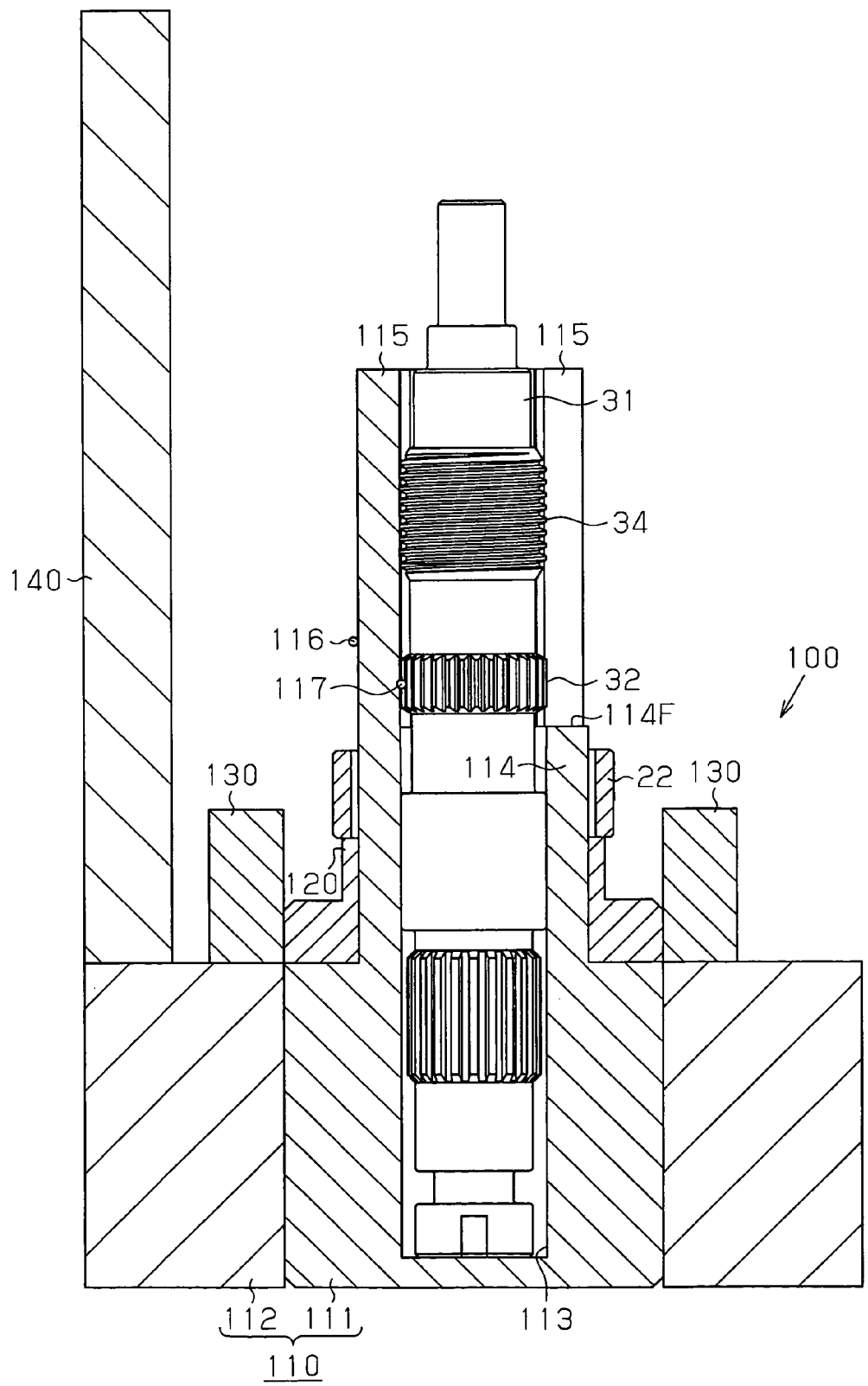
FIG. 50 is a process chart of a process XC in the method for manufacturing the conversion mechanism of FIG. 1.
Figure 51:
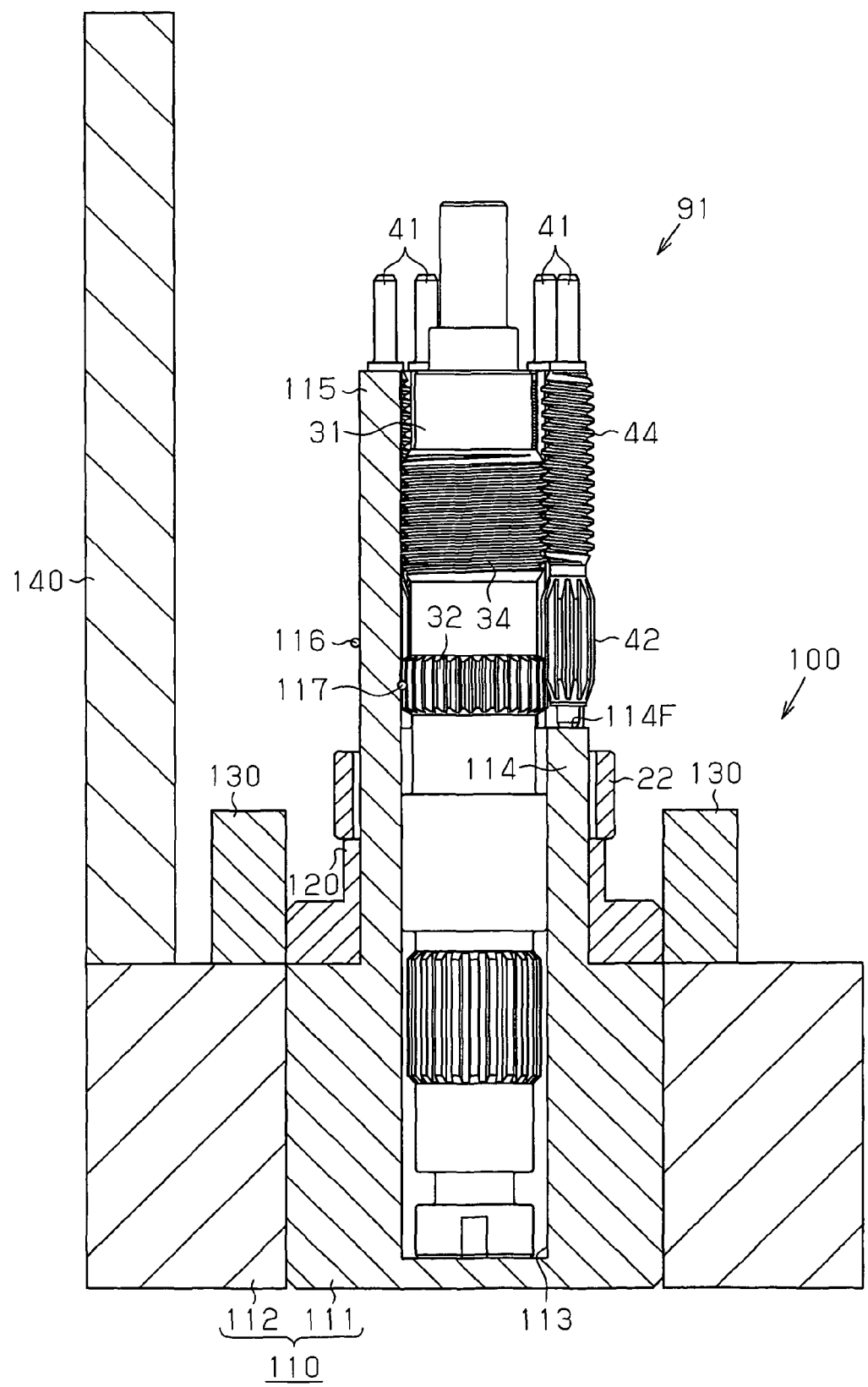
FIG. 51 is a process chart of a process XE in the method for manufacturing the conversion mechanism of FIG. 1.
Figure 52:
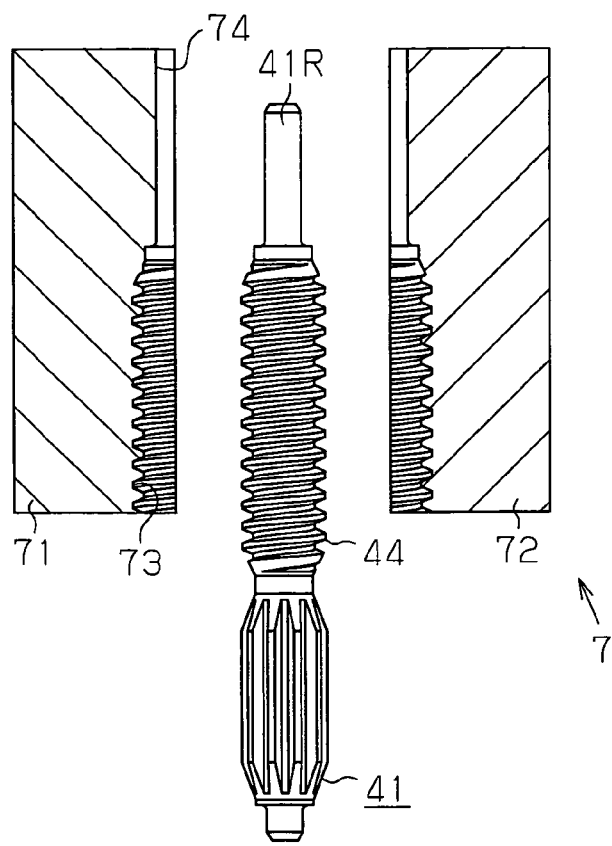
FIG. 52 is a process chart of a process XE1 in the method for manufacturing the conversion mechanism of FIG. 1.
Figure 53:
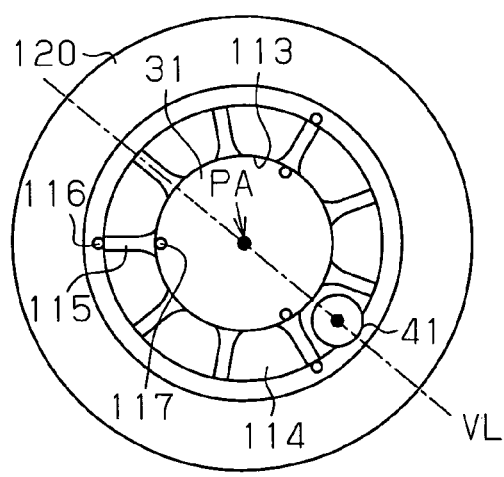
FIG. 53 is a process chart of processes XE2 and XE3 in the method for manufacturing the conversion mechanism of FIG. 1.
Figure 54:
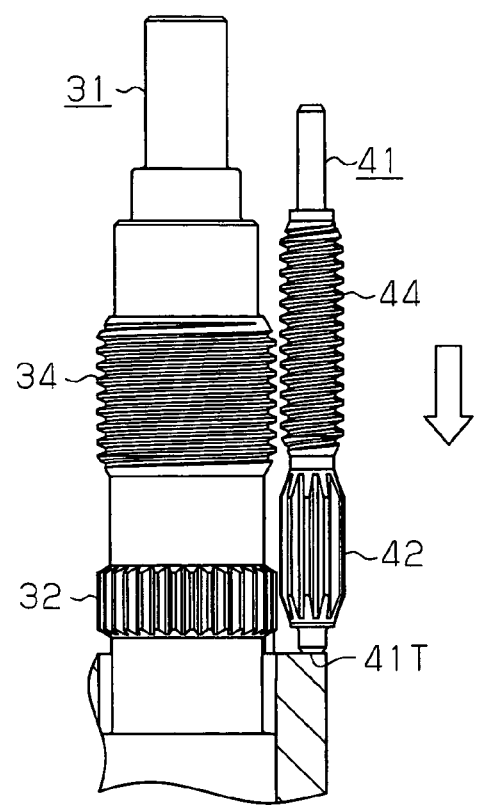
FIG. 54 is a process chart of a process XE4 in the method for manufacturing the conversion mechanism of FIG. 1.
Figure 55:
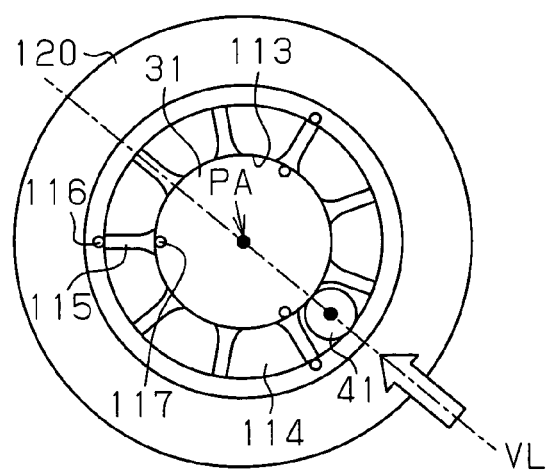
FIG. 55 is a process chart of a process XE5 in the method for manufacturing the conversion mechanism of FIG. 1.
Figure 56:
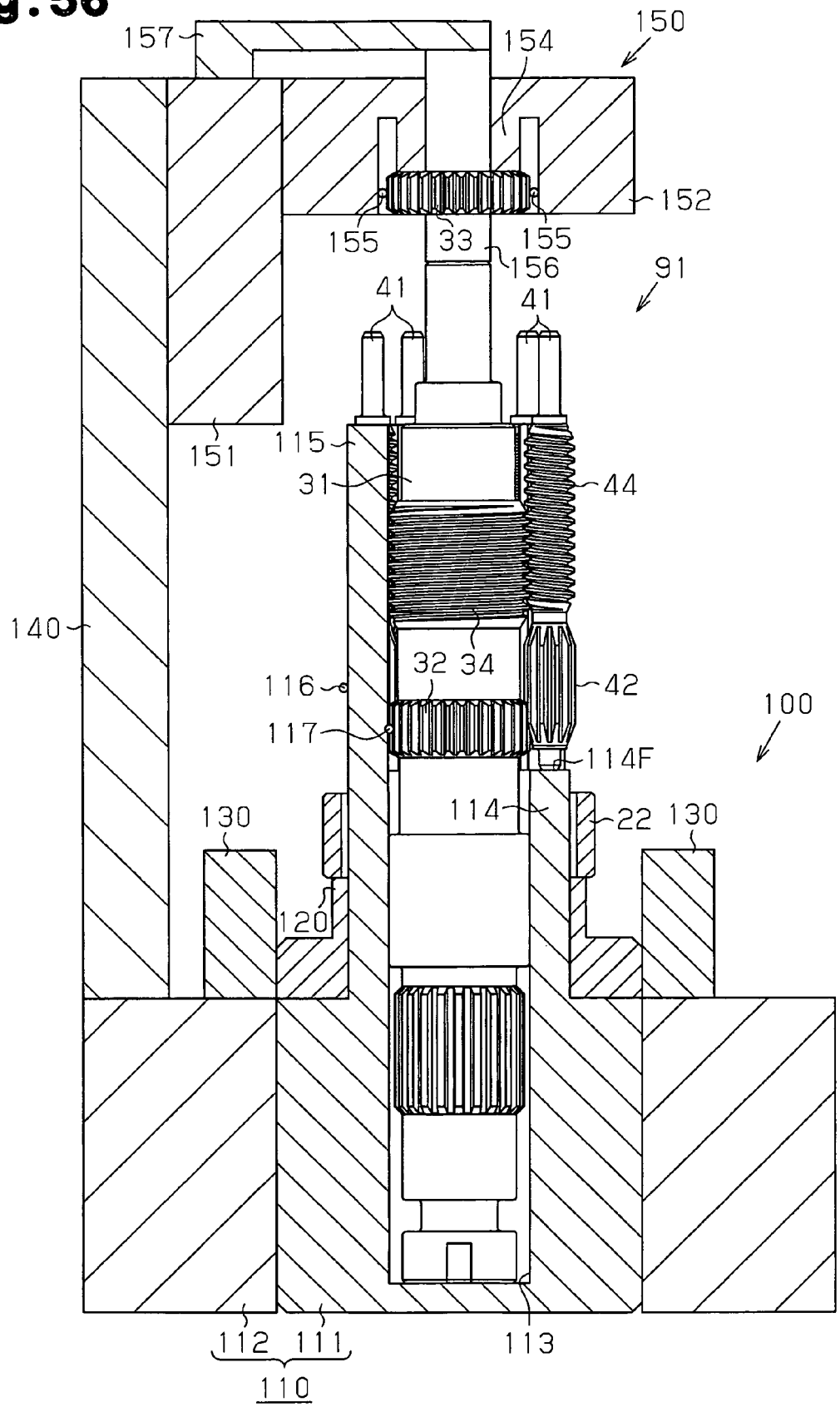
FIG. 56 is a process chart of a process XF in the method for manufacturing the conversion mechanism of FIG. 1.
Figure 57:
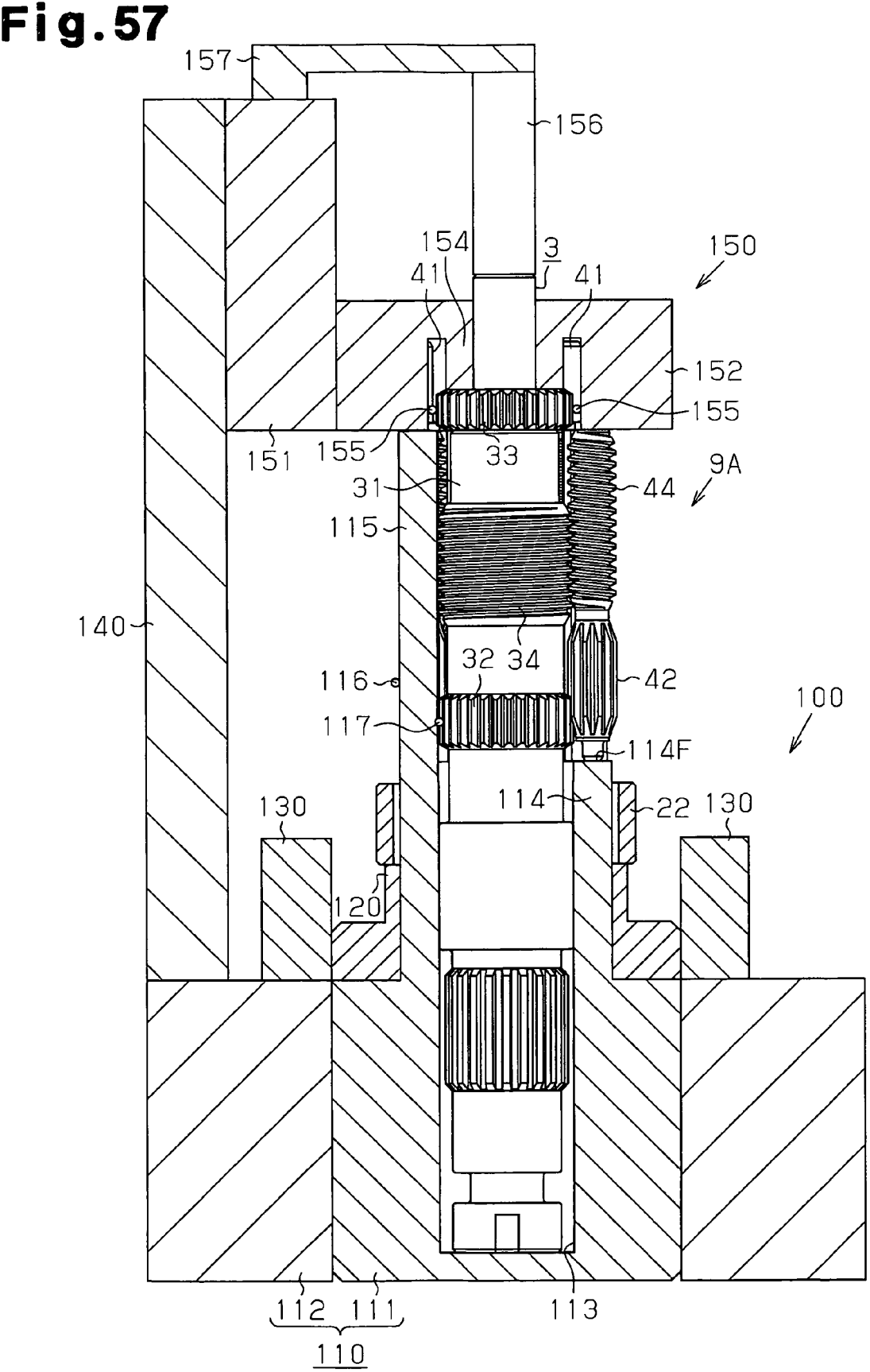
FIG. 57 is a process chart of a process XG in the method for manufacturing the conversion mechanism of FIG. 1.
Figure 58:
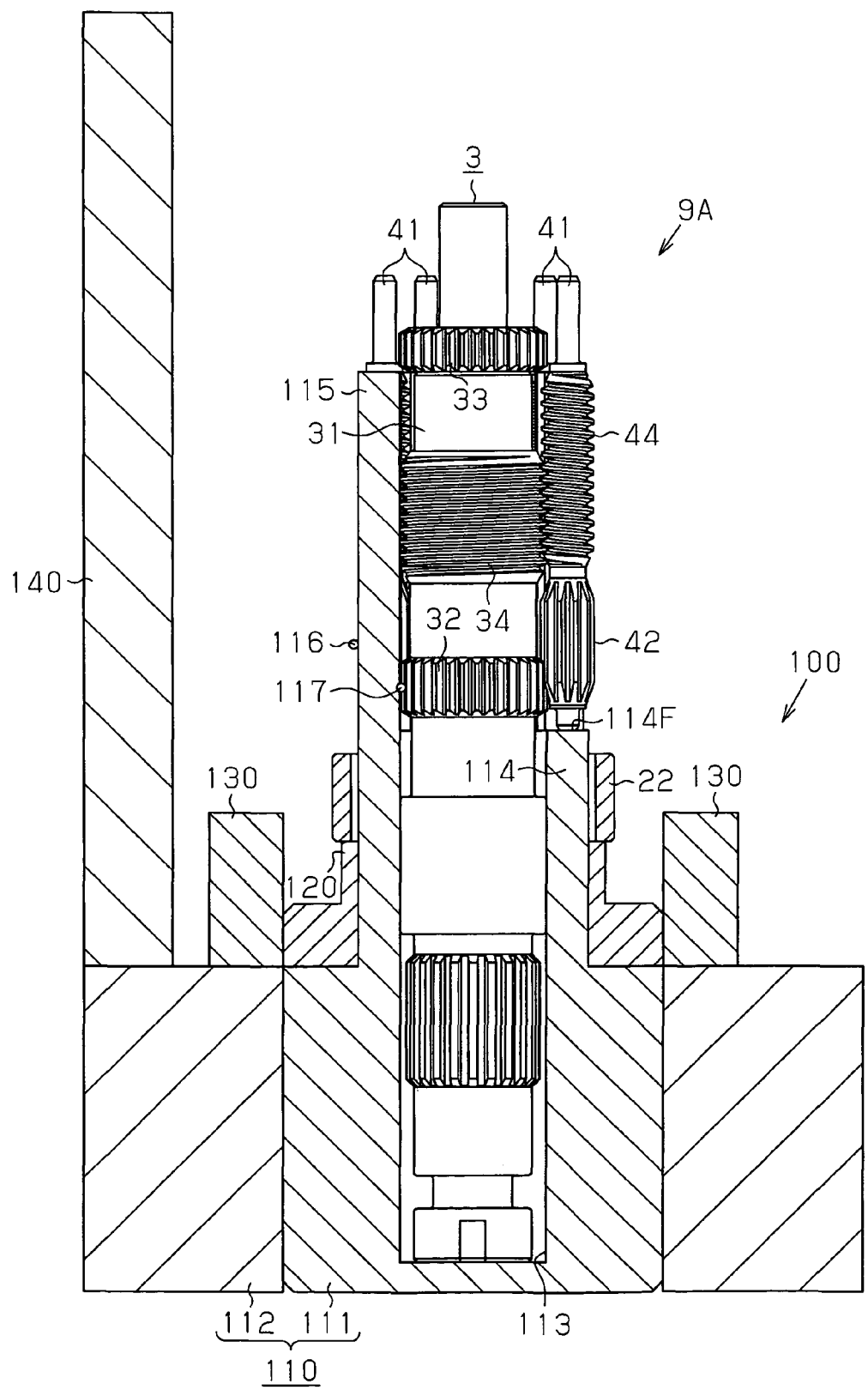
FIG. 58 is a process chart of a process XH in the method for manufacturing the conversion mechanism of FIG. 1.

The manufacturing method according to the present embodiment is structured such as to sequentially assemble a first assembly 91 (the first assembly 91 (FIG. 51) having the same structure as the first embodiment) in which the planetary shaft main body 41 is assembled with respect to the sun shaft main body 31, an eleventh assembly 9A (FIG. 58) in which the rear sun gear 33 is assembled with respect to the assembly 91, a twelfth assembly 9B (FIG. 60) in which the front ring gear 22 is assembled with respect to the assembly 9A, a thirteenth assembly 9C (FIG. 61) in which the ring shaft main body 21 is installed with respect to the assembly 9B, a fourteenth assembly 9D (FIG. 64) in which the rear ring gear 23 is assembled with respect to the assembly 9C, and a fourth assembly 94 (the fourth assembly 94 (FIG. 68) having the same structure as the first embodiment) in which the rear planetary gear 43 is assembled with respect to the assembly 9D, through an assembling jig 100 shown in FIGS. 42 to 46 and a support jig 200 shown in FIG. 47.

Specifically, after manufacturing each of the constituent elements through processes in proportion to the processes A to H according to the first embodiment, and washing the constituent elements through the process I, the constituent elements are combined on the assembling jig 100, and the assemblies are formed in the order of the first assembly 91, the eleventh assembly 9A, the twelfth assembly 9B, the thirteenth assembly 9C and the fourteenth assembly 9D (process XA (FIG. 48) to a process XM (FIG. 64)). Thereafter, in a state of supporting the fourteenth assembly 9D by the support jig 200 in place of the assembling jig 100, the fourth assembly 94 is assembled by installing the rear planetary gear 43 to each of the planetary shaft main bodies 41 of the assembly 9D (process XN (FIG. 65) to a process XR (FIG. 69)). Then, the conversion mechanism 1 is finished through a process in proportion to the process T according to the first embodiment.

<Structure of Assembling Jig>

A description will be given of a structure of the assembling jig 100 with reference to FIGS. 42 to 46.

In the following description, a direction extending along a center line C of the assembling jig 100 or the support jig 200 is set to an axial direction, a direction of an arrow VA in the axial direction is set to an upper side in the axial direction, and a direction of an arrow VB opposing to the upper side in the axial direction is set to a lower side in the axial direction. Further, a direction which is orthogonal to the center line C of the assembling jig 100 or the support jig 200 is set to a radial direction, a direction of an arrow VC coming close to the center line C in the radial direction is set to an inner side in the radial direction, and a direction of an arrow VD opposing to the inner side in the radial direction is set to an outer side in the radial direction.

The assembling jig 100 is structured such as to be provided with a jig main body 110 for holding the sun shaft 3 in a state of restricting a change of an attitude with respect to the jig 100, a first movable portion 120 provided on the jig main body 110 so as to be movable in the axial direction with respect to the jig main body 110, a second movable portion 130 provided on the jig main body 110 so as to be movable in the radial direction with respect to the jig main body 110, and an installation portion 140 provided on the jig main body 110 for attaching a first attached body 150 and a second attached body 160 respectively shown in FIGS. 45 and 46.

The jig main body 110 is formed by a first main body 111 provided with a space (insertion hole 113) for inserting the sun shaft 3, and a second main body 112 provided with the second movable portion 130 and the installation portion 140.

In the first main body 111, around an opening portion of the insertion hole 113, there is provided a abutting portion 114 for setting the axial relative position MS of each of the planetary shaft main bodies 41 to the axial regular position XS at a time of installing each of the planetary shaft main bodies 41 with respect to the sun shaft main body 31 inserted to the insertion hole 113. In other words, the abutting portion 114 is formed as an element for setting the axial relative position MS to the axial regular position XS by the front distal end portion 41T of the planetary shaft main body 41 being struck against a jig end surface 114F in the same manner as the first jig 61 used in the first embodiment mentioned above.

A plurality of support portions 115 for supporting each of the planetary shafts 4 are provided on the abutting portion 114. Each of the support portions 115 is formed as an element for restricting inclination of the planetary shaft 4 in a circumferential direction in a state in which the single planetary shaft 4 is arranged between the adjacent support portions 115 in a circumferential direction. Further, it is structured such that the planetary shaft 4 can be arranged between the support portions 115 from an outer side in the radial direction.

A first sun gear ball plunger 117 is provided in an inner side of at least one of the support portions 115, the first sun gear ball plunger 117 being provided for disenabling the rotation of the sun shaft main body 31 attached to the jig main body 110 with respect to the jig main body 110. In the assembling jig 100 according to the present embodiment, the first sun gear ball plunger 117 is provided in each of three support portions 115 which are spaced at a uniform interval in the circumferential direction. In this case, as an arranged aspect of the first sun gear ball plunger 117, for example, there can be employed an aspect that they are provided in a pair of support portions 115 having a substantially opposed relationship based on the center line C of the assembling jig 100, in addition to the aspect mentioned above. Further, the first sun gear ball plunger 117 corresponds to one of structures obtained by embodying the first restriction portion restricting the rotation of the first sun gear.

Each of the first sun gear ball plungers 117 is formed by a ball 117A (support body) arranged between the teeth of the front sun gear 32, and a spring 117B (pressing body) pressing the ball 117A toward an inner side in the radial direction of the gear 32 against the teeth of the front sun gear 32. Further, an attaching position of the ball plunger 117 to the support portion 115 is set in such a manner that the ball 117A comes into contact with a corresponding tooth surface on a pitch circle of the front sun gear 32 or near the pitch circle. Accordingly, in the case that the sun shaft main body 31 is attached to the jig main body 110, the ball 117A of each of the ball plungers 117 is arranged between the corresponding teeth, and is pressed against the front sun gear 32 in a state of coming into contact with the tooth surface on the pitch circle or near the pitch circle. Accordingly, the sun shaft main body 31 is going to be held by the jig main body 110 in a state in which the rotation is made disenable with respect to the jig main body 110.

In an outer side of at least one of the support portions 115, there is provided a first ring gear ball plunger 116 for disenabling the rotation of the ring gear 22 with respect to the jig main body 110, with regard to the front ring gear 22 (specifically, the front ring gear 22 in the thirteenth assembly 9C mentioned above) in a state of being held to the jig main body 110 through the assembling to the ring shaft main body 21. In the assembling jig 100 according to the present embodiment, the first ring gear ball plunger 116 is provided in each of three support portions 115 spaced at a uniform interval in the circumferential direction. In this case, as an arranged aspect of the first ring gear ball plunger 116, for example, there can be employed an aspect that the first ring gear ball plunger 116 is provided in a pair of support portions 115 having a substantially opposing relationship based on the center line C of the assembling jig 100, in addition to the aspect mentioned above. Further, the first ring gear ball plunger 116 corresponds to one of structures obtained by embodying the first restriction portion restricting the rotation of the first annular gear.

Each of the first ring gear ball plungers 116 is formed by a ball 116A (support body) arranged between the teeth of the front ring gear 22, and a spring 116B (pressing body) pressing the ball 116A toward an outer side in the radial direction of the gear 22 against the teeth of the front ring gear 22. Further, an attaching position of the ball plunger 116 to the support portion 115 is set in such a manner that the ball 116A comes into contact with a corresponding tooth surface on a pitch circle of the front ring gear 22 or near the pitch circle. Accordingly, in the case that the ring shaft main body 21 is attached to the jig main body 110 through the assembly to the sun shaft main body 31, the ball 116A of each of the ball plungers 116 is arranged between the corresponding teeth, and is pressed against the front ring gear 22 in a state of coming into contact with the tooth surface on the pitch circle or near the pitch circle. Accordingly, the ring shaft main body 21 is going to be held by the jig main body 110 in a state in which the rotation is made disenable with respect to the jig main body 110.

The first movable portion 120 is formed as an element for supporting the ring gear 22 in a state in which the center line of the front ring gear 22 is aligned with the center line of the sun shaft main body 31, and installing the front ring gear 22 to the ring shaft main body 21 through the movement in the axial direction with respect to the jig main body 110 while keeping the aligned state. Further, the first movable portion 120 is set to a retracted position shown in FIG. 43 so as to support the front ring gear 22 before installing the front ring gear 22 to the ring shaft main body 21, and is set to an assembling position shown in FIG. 44 through the movement to an upper side in the axial direction, thereby installing the front ring gear 22 to the ring shaft main body 21. The first movable portion 120 is provided with the following function in addition to the function mentioned above. In other words, the first movable portion 120 is formed as an element of being movable from the retracted position to the assembling, position while keeping the rotational phase of the front ring gear 22 with respect to the ball plunger 116, in such a manner that the ball 116A of each of the first ring gear ball plungers 116 is arranged between the teeth of the front ring gear 22, at a time of being set to the assembling position.

The second movable portion 130 is formed as an element for restricting the movement of the first movable portion 120 moving to the assembling position toward the lower side in the axial direction through the movement in the radial direction with respect to the jig main body 110. In other words, when the first movable portion 120 is set to the retracted position, the second movable portion 130 is set to a retracted position shown in FIG. 43, and when the first movable portion 120 is set to the assembling position, it is set to a support position shown in FIG. 44 so as to support the first movable portion 120 from the lower side in the axial direction.

The installation portion 140 is formed as an element for attaching the first attached body 150 shown in FIG. 45 and attaching the second attached body 160 shown in FIG. 46. In other words, it is formed as an element which can hold each of the first attached body 150 and the second attached body 160 in an upper portion of the assembly formed on the jig main body 110.

As shown in FIG. 45, the first attached body 150 is formed as an element for holding the sun gear 33 in a state in which the rotation of the rear sun gear 33 is disabled with respect to its own, and a state where the center line of the rear sun gear 33 is aligned with the center line of the sun shaft main body 31, and installing the rear sun gear 33 to the sun shaft main body 31 through the movement to the lower side in the axial direction with respect to the jig main body 110 while keeping the state. Specifically, it is formed by an attached body main body 151 attached to the installation portion 140, an attached movable body 152 which can support the rear sun gear 33 according to the aspect mentioned above and can move in the axial direction of the jig main body 110 with respect to the main body 151, a guide body 156 more securely guiding the movement in the axial direction of the movable body 152 in cooperation to the attached body main body 151, and a coupling body 157 fixing the guide body 156 to the attached body main body 151.

The attached movable body 152 is provided with a gear arrangement portion 153 for attaching the rear sun gear 33, a gear restriction portion 154 for restricting the movement of the sun gear 33 to the upper side in the axial direction with respect to the movable body 152 at a time of pressure inserting the rear sun gear 33 attached to the arrangement portion 153 to the sun shaft main body 31, and a pair of second sun gear ball plungers 155 for disenabling the rotation of the rear sun gear 33 attached to the gear arrangement portion 153 with respect to the movable body 152 (the first attached body 150). Further, the attached movable body 152 is structured so as to be prevented from being interfered with the assembly formed by including the sun shaft main body 31 at a time of installing the rear sun gear 33 to the sun shaft main body 31 through the movement in the axial direction with respect to the attached body main body 151.

Each of the ball plungers 155 is formed by a ball 155A (support body) arranged between the teeth of the rear sun gear 33, and a spring 155B (pressing body) pressing the ball 155A toward an inner side in the radial direction of the gear 33 against the teeth of the rear sun gear 33. Further, an attaching position of the ball plunger 155 to the attached movable body 152 is set in such a manner that the ball 155A comes into contact with a corresponding tooth surface on a pitch circle of the rear sun gear 33 or near the pitch circle. Further, it is provided in the attached movable body 152 in an aspect of substantially opposing via the rear sun gear 33. Accordingly, in the case that the rear sun gear 33 is arranged in the gear arrangement portion 153, the ball 155A of each of the ball plungers 155 is arranged between the corresponding teeth, and is pressed against the rear sun gear 33 in a state of coming into contact with the tooth surface on the pitch circle or near the pitch circle. Accordingly, the rear sun gear 33 is going to be held by the gear arrangement portion 153 in a state in which the rotation is made disenabled with respect to the attached movable body 152.

In the assembling jig 100, a relation between the first sun gear ball plunger 117 of the jig main body 110 and the second sun gear ball plunger 155 of the first attached body 150 is set as follows. In other words, the structure is made such that the relative rotational phases substantially coincide with each other between the corresponding first sun gear ball plunger 117 and second sun gear ball plunger 155, in a state in which the first attached body 150 is attached to the jig main body 110. In other words, the relative rotational phases of the first sun gear ball plunger 117 and the second sun gear ball plunger 155 are set in such a manner that the relative rotational phases substantially coincide between the front sun gear 32 and the rear sun gear 33, in the state where the sun shaft main body 31 is held to the jig main body 110 and the state where the first attached body 150 holding the rear sun gear 33 is attached to the installation portion 140. In this case, the second sun gear ball plunger 155 corresponds to one of structures obtained by embodying the second regulation portion restricting the rotation of the second sun gear.

As shown in FIG. 46, the second attached body 160 is formed as an element for holding the ring gear 23 in a state in which the rotation of the rear ring gear 23 is disabled with respect to its own, and a state where the center line of the rear ring gear 23 is aligned with the center line of the sun shaft main body 31, and installing the rear ring gear 23 to the ring shaft main body 21 through the movement to the lower side in the axial direction with respect to the jig main body 110 while keeping the state. Specifically, it is formed by an attached body main body 161 attached to the installation portion 140, and an attached movable body 162 which can support the rear ring gear 23 according to the aspect mentioned above and can move in the axial direction of the jig main body 110 with respect to the main body 161.

The attached movable body 162 is provided with a gear arrangement portion 163 for attaching the rear ring gear 23, a gear restriction portion 164 for restricting the movement of the ring gear 23 to the upper side in the axial direction with respect to the movable body 162 at a time of pressure inserting the rear ring gear 23 attached to the arrangement portion 163 to the ring shaft main body 21, and a pair of ball plungers 165 for disenabling the rotation of the rear ring gear 23 attached to the gear arrangement portion 163 with respect to the movable body 162 (the second attached body 160). Further, the attached movable body 162 is structured such as to be prevented from being interfered with the assembly formed by including the ring shaft main body 21 at a time of installing the rear ring gear 23 to the ring shaft main body 21 through the movement in the axial direction with respect to the attached body main body 161.

Each of the ball plungers 165 is formed by a ball 165A (support body) arranged between the teeth of the rear ring gear 23, and a spring 165B (pressing body) pressing the ball 165A toward an outer side in the radial direction of the gear 23 against the teeth of the rear ring gear 23. Further, an attaching position of the ball plunger 165 to the attached movable body 162 is set in such a manner that the ball 165A comes into contact with a corresponding tooth surface on the pitch circle of the rear ring gear 23 or near the pitch circle. Further, it is provided in the attached movable body 162 in an aspect of substantially opposing via the rear ring gear 23. Accordingly, in the case that the rear ring gear 23 is arranged in the gear arrangement portion 163, the ball 165A of each of the ball plungers 165 is arranged between the corresponding teeth, and is pressed against the rear ring gear 23 in a state of coming into contact with the tooth surface on the pitch circle or near the pitch circle. Accordingly, the rear ring gear 23 is going to be held by the gear arrangement portion 163 in a state in which the rotation is made disenable with respect to the attached movable body 162.

In the assembling jig 100, the relation between the first ring gear ball plunger 116 of the jig main body 110 and the second ring gear ball plunger 165 of the second attached body 160 is set as follows. In other words, the structure is made so that the relative rotational phases substantially coincide with each other between the corresponding first ring gear ball plunger 116 and second ring gear ball plunger 165, in a state in which the second attached body 160 is attached to the jig main body 110. In other words, the relative rotational phases of the first ring gear ball plunger 116 and the second ring gear ball plunger 165 are set in such a manner that the relative rotational phases substantially coincide between the front ring gear 22 and the rear ring gear 23, in the state where the ring shaft main body 21 is held to the jig main body 110 through the assembling to the sun shaft main body 31, the state where the front ring gear 22 is installed to the ring shaft main body 21 (specifically, the state where the thirteenth assembly 9C is held by the jig main body 110), and the state where the second attached body 160 holding the rear ring gear 23 is attached to the installation portion 140. In this case, the second ring gear ball plunger 165 corresponds to one of structures obtained by embodying the second regulation portion restricting the rotation of the second annular gear.

<Structure of Support Jig>

A description will be given of a structure of the support jig 200 with reference to FIG. 47.

The support jig 200 is structured such as to be provided with a jig main body 210 for holding the fourteenth assembly 9D in a state of restricting a change of an attitude with respect to the jig 200, and a plurality of jig support columns 220 for holding each of the planetary shaft main bodies 41 of the assembly 9D in a parallel state with respect to at least one of the sun shaft main body 31 and the ring shaft main body 21. Each of the jig support columns 220 is formed as an element which can be inserted between the planetary shafts 4 from a lower side in the axial direction of the fourteenth assembly 9D and can reform the planetary shaft main body 41 inclined with respect to the sun shaft main body 31 in a parallel attitude to at least one of the sun shaft main body 31 and the ring shaft main body 21.

<Method for Manufacturing Rotational Rectilinear Motion Conversion Mechanism>

A description will be given of the method for manufacturing the rotational rectilinear motion conversion mechanism 1 with reference to FIGS. 48 to 69. In this case, the description will be given below of each of processes after the processes in proportion to the processes A to I according to the first embodiment are carried out.

[process XA (FIG. 48)] The process sets the first movable portion 120 of the assembling jig 100 to the retracted position, and sets the second movable portion 130 to the retracted position. Further, the process sets a state where the first attached body 150 or the second attached body 160 is not attached to the installation portion 140.

[process XB (FIG. 49)] The process inserts the sun shaft main body 31 to the insertion hole 113 of the assembling jig 100. At this time, the sun shaft main body 31 is inserted until the main body distal end portion 31D abuts the bottom wall of the assembling jig 100. Further, the ball 117A of each of the first sun gear ball plungers 117 is arranged between the teeth of the corresponding front sun gear 32. Accordingly, it is possible to secure a state where each of the balls 117A comes into point contact with each of the corresponding tooth surfaces, and a state where each of the balls 117A is pressed to the sun shaft main body 31 through the spring 117B.

[process XC (FIG. 50)] The process attaches the front ring gear 22 to the first movable portion 120 of the assembling jig 100. Accordingly, it is possible to secure a state where the ball 116A of each of the first ring gear ball plungers 116 is arranged between the teeth of the front ring gear 22 at a time of moving the first movable portion 120 from the retracted position to the assembling position.

[process XD (FIG. 14)] The process carries out assembly work in proportion to the process K according to the first embodiment. In other words, the process sets the rotational phase with respect to the threaded jig 7 to the identical rotational phase in all the planetary shaft main bodies 41, by attaching each of the planetary shaft main bodies 41 to the threaded jig 7, as a preparation for assembling the first assembly 91 formed by the combination between the sun shaft main body 31 and each of the planetary shaft main bodies 41 in the first assembling state.

[process XE (FIG. 51)] The process assembles the first assembly 91 through a work in proportion to the step L according to the first embodiment. Specifically, the process assembles the first assembly 91 through the following processes XE1 to XE5 corresponding to the processes in proportion to the processes L1 to L5 (FIGS. 18 to 21) according to the first embodiment. In this case, each of the following processes shows the assembling procedure of one planetary shaft main body 41. Further, the present process XE corresponds to one of structures obtained by embodying the sun shaft assembly assembling process. Further, the first assembly 91 corresponds to one of structures obtained by embodying the sun shaft assembly.

[process XE1 (FIG. 52)] The process detaches the planetary shaft main body 41 from the threaded jig 7 by dividing the threaded jig 7. At this time, the planetary shaft main body 41 is in a state where its own center line becomes parallel to the center line of the sun shaft main body 31.

[process XE2 (FIG. 53)] The process arranges the planetary shaft main body 41 at the reference position VR based on the rotational phase of the sun indicator 30. In other words, the process moves the planetary shaft main body 41 to a position (the reference position VR) at which its own center line intersects the reference line VL obtained by the second reference point PB and the first reference point PA of its own circumferential regular position XR. At this time, the process moves the planetary shaft main body 41 in a state of keeping the relation to the rotational phase of the sun shaft main body 31 (the sun indicator 30). Further, the process selects a position at which the front distal end portion 41T can be struck against the jig end surface 114F of the abutting portion 114 of the assembling jig 100 at a time of moving the planetary shaft main body 41 in parallel along the center line, as the reference position VR. In this case, details of the reference position VR, the circumferential regular position XR, the first reference point PA, the second reference point PB and the reference line VL are in proportion to the contents shown in the first embodiment mentioned above.

[process XE3 (FIG. 53)] The process sets the planetary shaft relative phase MP to the planetary shaft regular phase XP based on the rotational phase of the sun indicator 30. Specifically, the process sets the planetary shaft relative phase MP to the planetary shaft regular phase XP by rotating the planetary shaft main body 41 in such a manner that a difference of the relative rotational phases runs short, after comprehending the difference between the planetary shaft reference phase BP and the planetary shaft regular phase XP based on a comparison between the rotational phase of the sun indicator 30 and the planetary shaft reference phase BP. In this case, details of the planetary shaft relative phase MP, the planetary shaft regular phase XP and the planetary shaft reference phase BP are in proportion to the contents shown in the first embodiment.

[process XE4 (FIG. 54)] The process sets the axial relative position MS to the axial regular position XS by moving the planetary shaft main body 41 in parallel along the center line so as to abut the front distal end portion 41T against the jig end surface 114F. In this case, details of the axial relative position MS and the axial regular position XS are in proportion to the contents shown in the first embodiment.

[process XE5 (FIG. 55)] The process sets the radial relative position ML to the radial regular position XL by moving the planetary shaft main body 41 in parallel so as to abut against the sun shaft main body 31 in the state where the center line of the planetary shaft main body 41 becomes parallel to the center line of the sun shaft main body 31. Specifically, the process moves the planetary shaft main body 41 in parallel from the reference position VR to the radial regular position XL in such a manner that a locus of the center line (the second reference point PB) of the planetary shaft main body 41 on the reference plane VP is aligned with the reference line VL. At this time, since the planetary shaft main body 41 is arranged at the radial regular position XL in a state in which the planetary shaft main body 41 is set to the circumferential regular position XR, the axial regular position XS and the planetary shaft regular phase XP, it is possible to simultaneously obtain the engagement between the front planetary gear 42 and the front sun gear 32 and the engagement between the planetary threaded section 44 and the sun threaded section 34. In this case, details of the radial relative position ML, the radial regular position XL and the reference plane VP are in proportion to the contents shown in the first embodiment. Further, in the case that the change of the attitude of each of the planetary shaft main bodies 41 with respect to the sun shaft main body 31 (particularly the change of the attitude in the radial direction) comes into question, with regard to the first assembly 91 assembled on the assembling jig 100 through each of the processes mentioned above, it is possible to regulate the change of the attitude mentioned above through an appropriate holding body (for example, the retainer 65 according to the first embodiment).

[process XF (FIG. 56)] The process attaches the rear sun gear 33 to the attached movable body 152 of the first attached body 150. At this time, the ball 155A of each of the second sun gear ball plungers 155 is arranged between the teeth of the corresponding rear sun gear 33. Accordingly, it is possible to secure a state where each of the balls 155A comes into point contact with the corresponding tooth surface, and a state where each of the balls 155A is pressed against the rear sun gear 33 through the spring 155B. Thereafter, the process attaches the first attached body 150 to the installation portion 140 of the jig main body 110. Accordingly, it is possible to secure a state where the relative rotational phases substantially coincide with each other between the front sun gear 32 held to the jig main body 110 and the rear sun gear 33 held to the first attached body 150. In this case, the present process XF corresponds to one of structures obtained by embodying the holding process.

[process XG (FIG. 57)] The process assembles the eleventh assembly 9A formed by a combination of the first assembly 91 and the rear sun gear 33. Specifically, the attached movable body 152 is moves to the lower side in the axial direction with respect to the attached body main body 151, and the rear sun gear 33 is pressure inserted to the sun shaft main body 31. Accordingly, the sun shaft 3 is assembled in the state where the relative rotational phases substantially coincide between the front sun gear 32 and the rear sun gear 33. In this case, the present process XG corresponds to one of the structures embodying the second sun gear assembling process.

[process XH (FIG. 58)] The process detaches the first attached body 150 from the installation portion 140, and restricts the rotational phase of the front ring gear 22 according to the following aspect.

In this case, since the front ring gear 22 can be engaged with each of the front planetary gears 42 in the eleventh assembly 9A, it is possible to assume that one gear (the counter ring gear 45) having the discontinuous shape is formed by each of the front planetary gears 42 in the same manner as the first assembly 91 according to the first embodiment. Accordingly, in proportion to the first embodiment, the rotational phase of the front ring gear 22 is set to the annular gear reference phase RA in the process XH by setting the difference of the relative rotational phases between the counter ring gear 45 and the front ring gear 22 to the annular gear rotational phase difference, and setting the rotational phase of the front ring gear 22 with respect to the rotational phase of the counter ring gear 45 in the state where the annular gear rotational phase difference does not exist to the annular gear reference phase RA. Specifically, the rotational phase of the front ring gear 22 is set to the annular gear reference phase RA based on the relation between the rotational phase of the sun indicator 30 and the rotational phase of the front ring gear 22. As the setting aspect of the rotational phase mentioned above, for example, there can be employed an aspect or rotating only the front ring gear 22 with respect to the jig main body 110, or rotating the front ring gear 22 together with the first movable portion 120 with respect to the jig main body 110. Further, the rotational phase of the front ring gear 22 after being set can be held until it is installed to the counter ring gear 45, by disenabling the rotation of the ring gear 22 with respect to the jig main body 110. Further, in accordance with the setting of the rotational phase, since it becomes possible to engage the counter ring gear 45 with the front ring gear 22 by moving the front ring gear 22 in parallel along the center line, in the state where the center line of the front ring gear 22 is aligned with the center line of the sun shaft main body 31 of the eleventh assembly 9A, it is possible to achieve an improvement of labor efficiency for assembling the twelfth assembly 9B.

In this connection, in the manufacturing method according to the present embodiment, since the first assembly 91 is assembled through the combination of the sun shaft main body 31 and each of the planetary shaft main bodies 41 based on the sun indicator 30 of the sun shaft main body 31, the relation between the rotational phase of the sun indicator 30 and the rotational phase of the counter ring gear 45 is always maintained in a fixed relation. Accordingly, it is possible to assume that the rotational phase of the sun indicator 30 is the rotational phase of the counter ring gear 45 and set the rotational phase of the front ring gear 22, by previously comprehending the rotational phase of the sun indicator 30 and the rotational phase of the counter ring gear 45 in the first assembly 91. In other words, it is possible to set the rotational phase of the front ring gear 22 to the annular gear reference phase RA based on the relation between the rotational phase of the sun indicator 30 and the rotational phase of the front ring gear 22.

Figure 59:
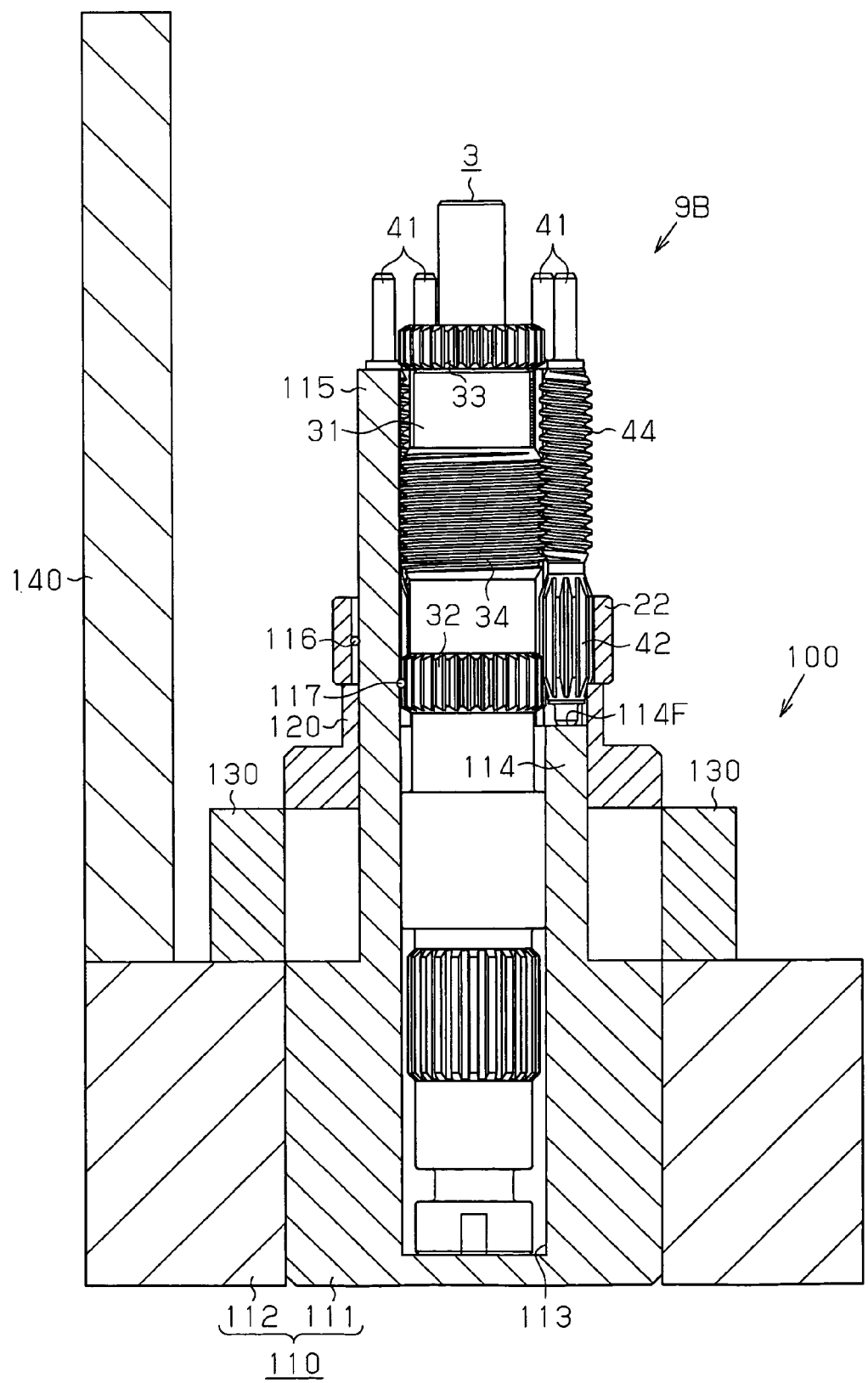
FIG. 59 is a process chart of a process XI in the method for manufacturing the conversion mechanism of FIG. 1.
Figure 60:
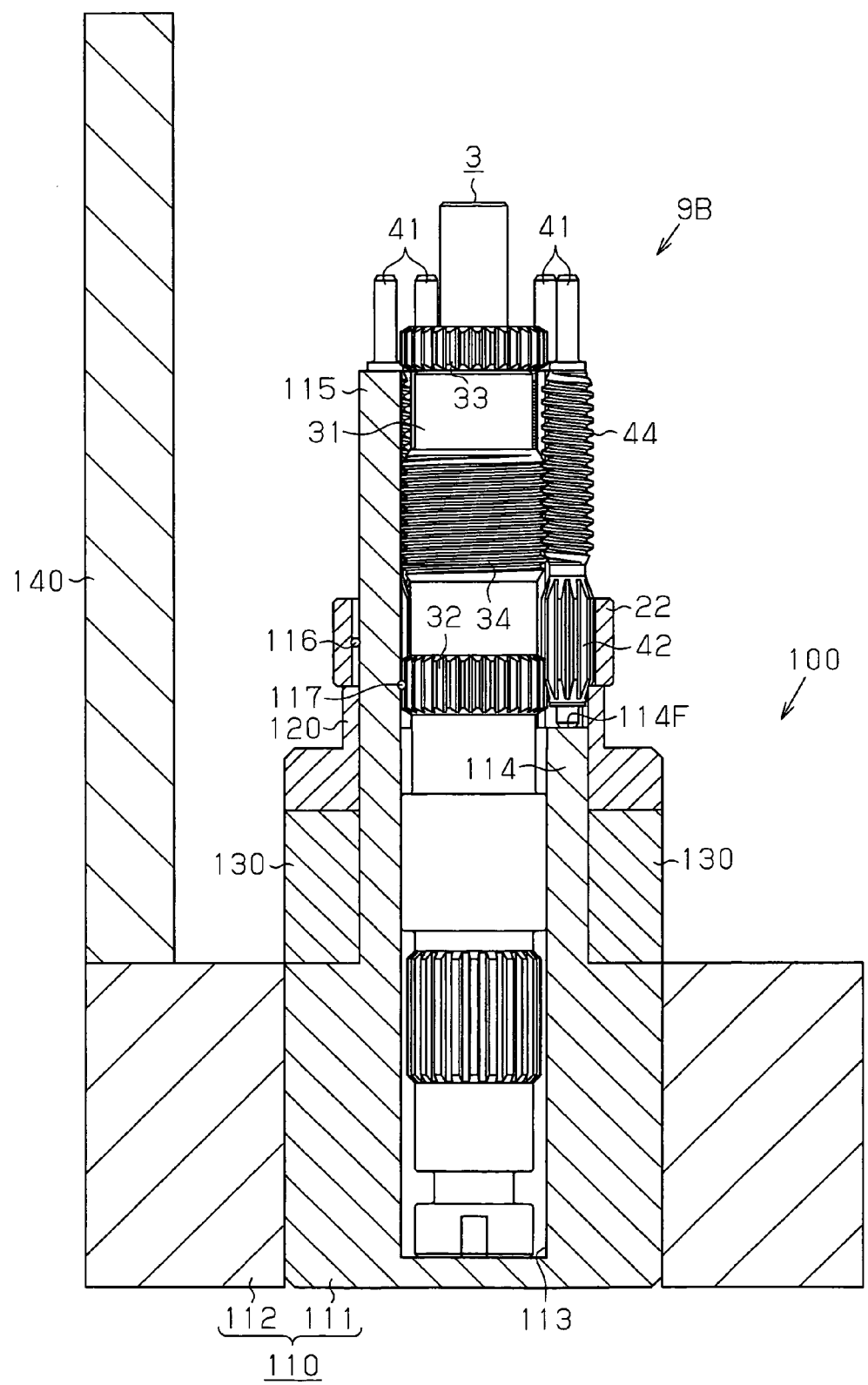
FIG. 60 is a process chart of the process XI in the method for manufacturing the conversion mechanism of FIG. 1.
Figure 61:
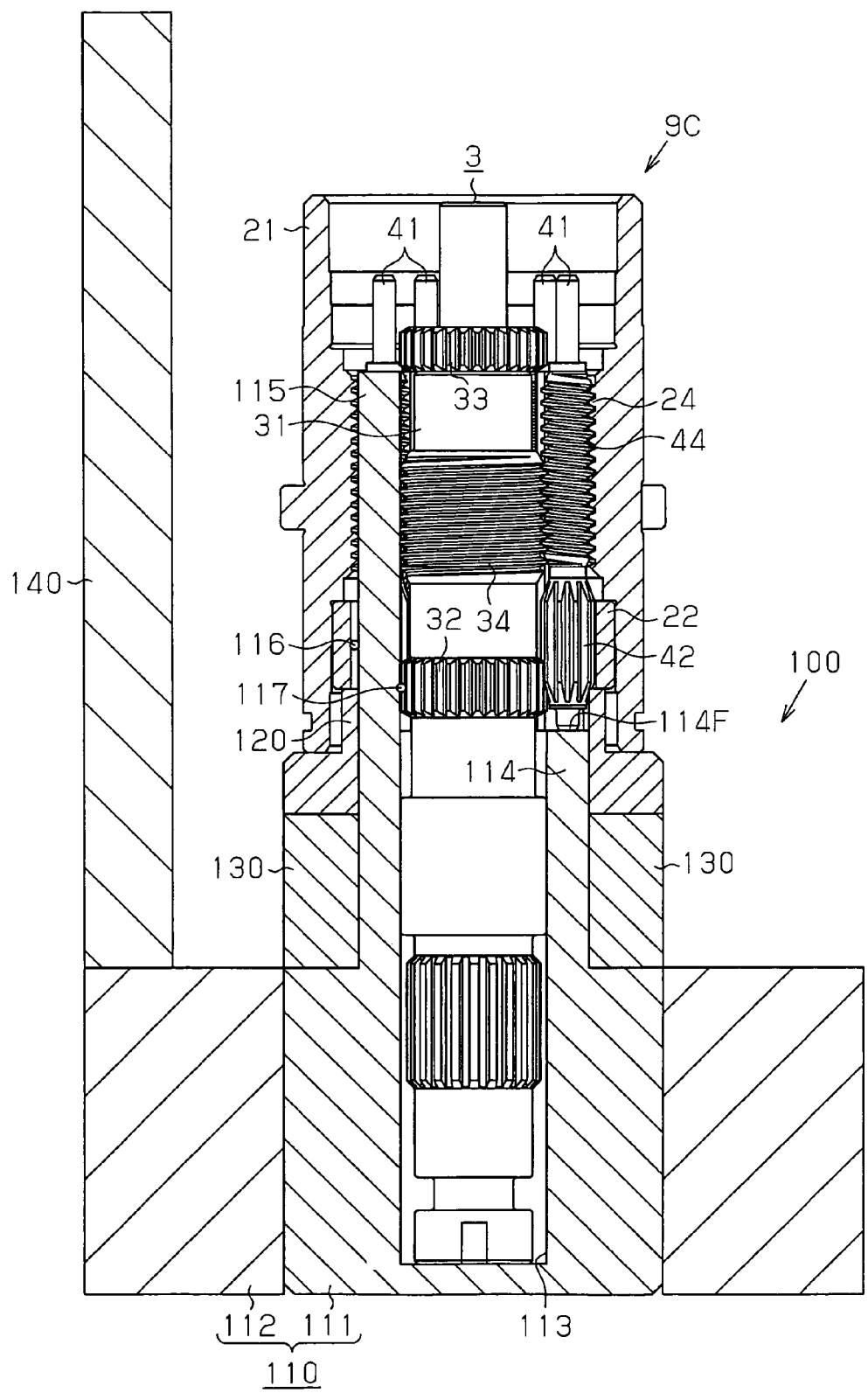
FIG. 61 is a process chart of a process XJ in the method for manufacturing the conversion mechanism of FIG. 1.
Figure 62:
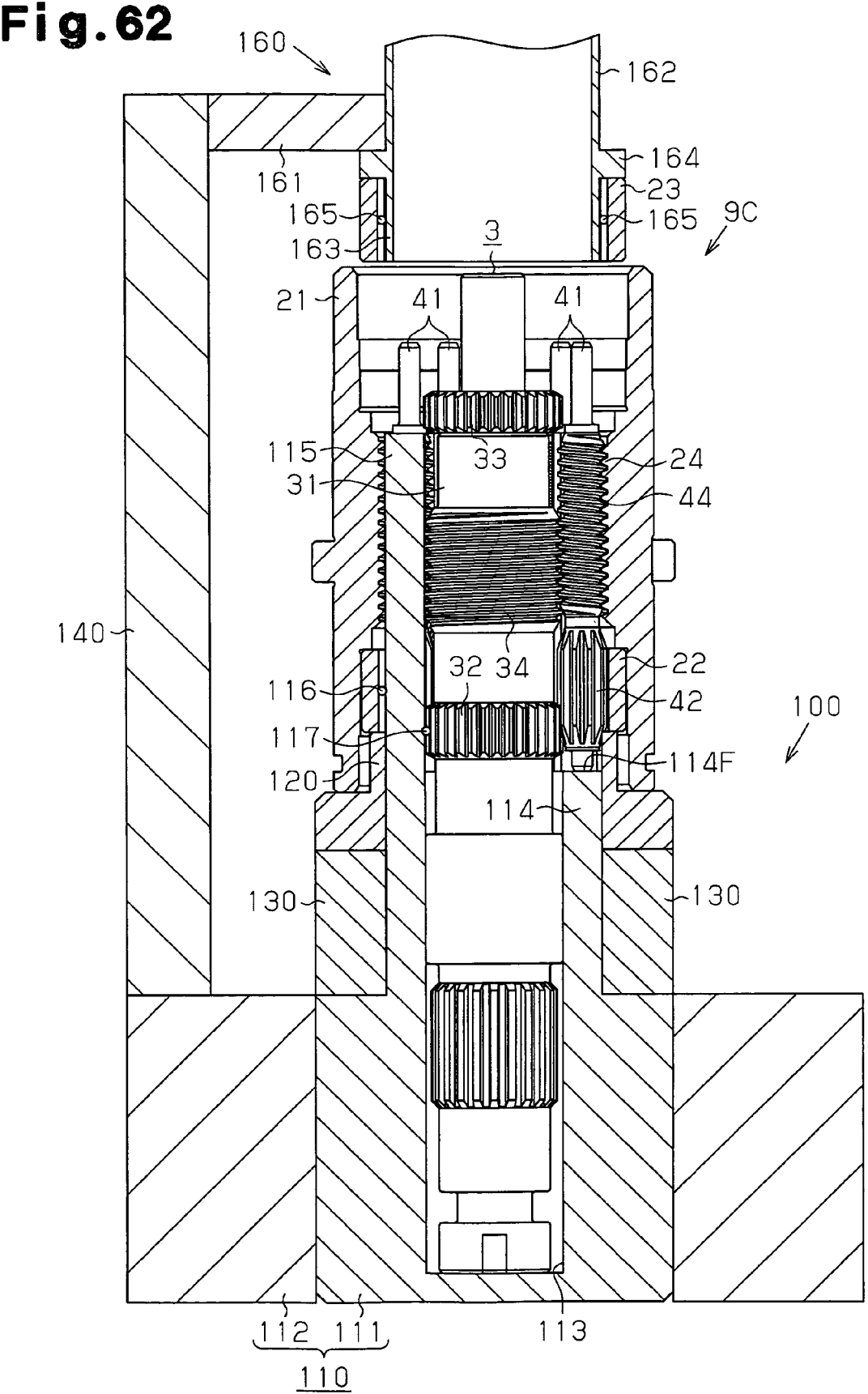
FIG. 62 is a process chart of a process XK in the method for manufacturing the conversion mechanism of FIG. 1.
Figure 63:
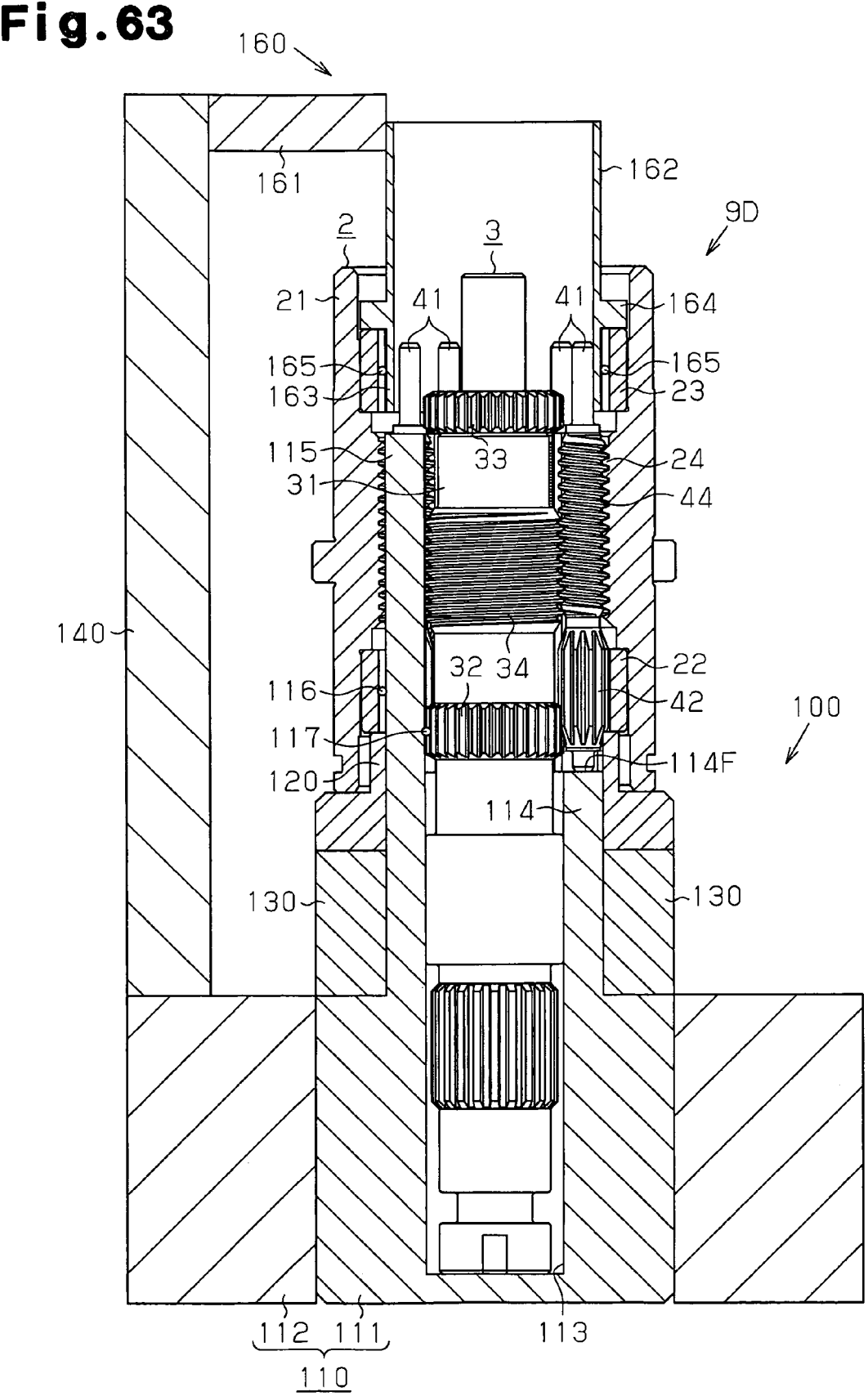
FIG. 63 is a process chart of a process XL in the method for manufacturing the conversion mechanism of FIG. 1.
Figure 64:
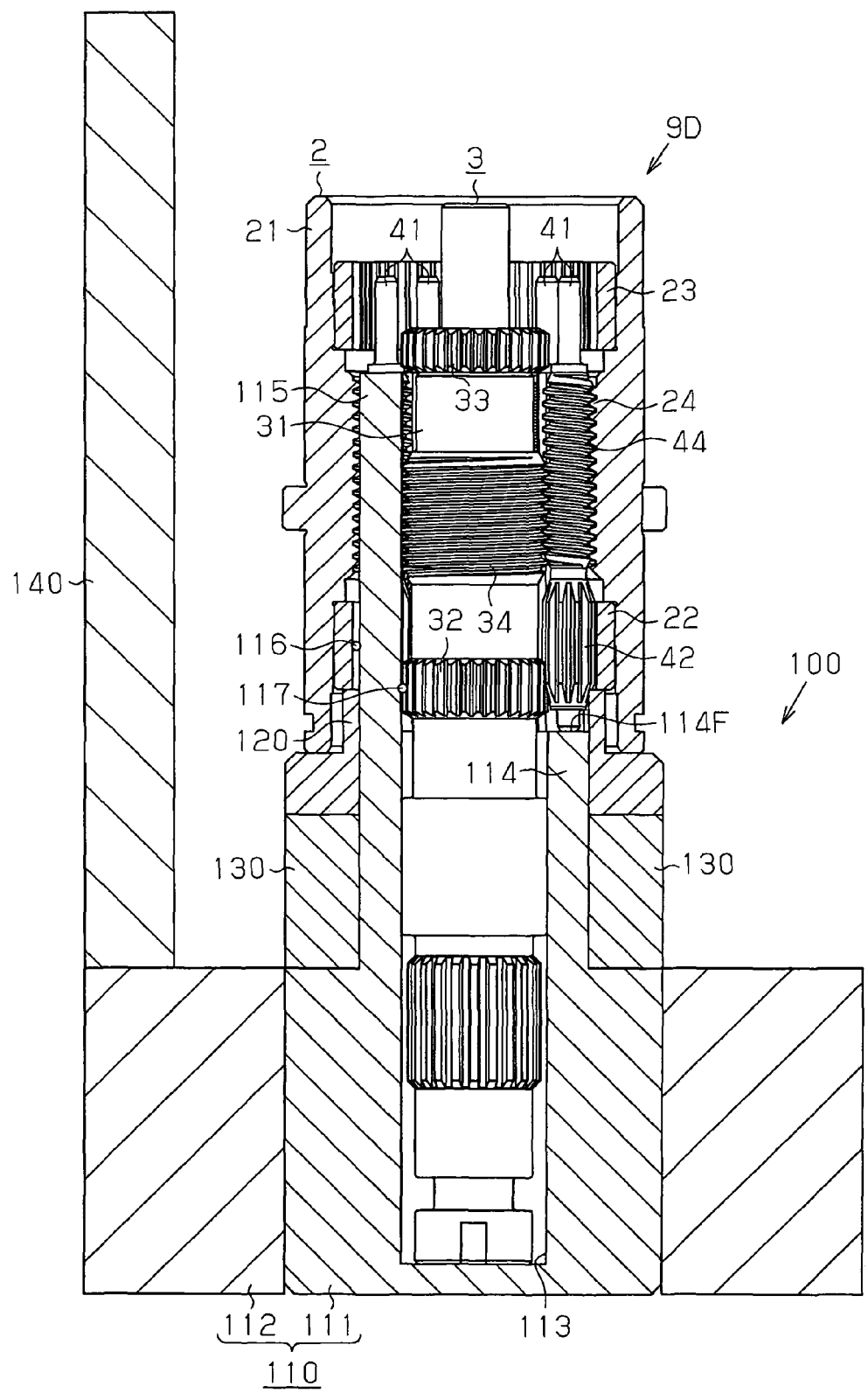
FIG. 64 is a process chart of a process XM in the method for manufacturing the conversion mechanism of FIG. 1.
Figure 65:
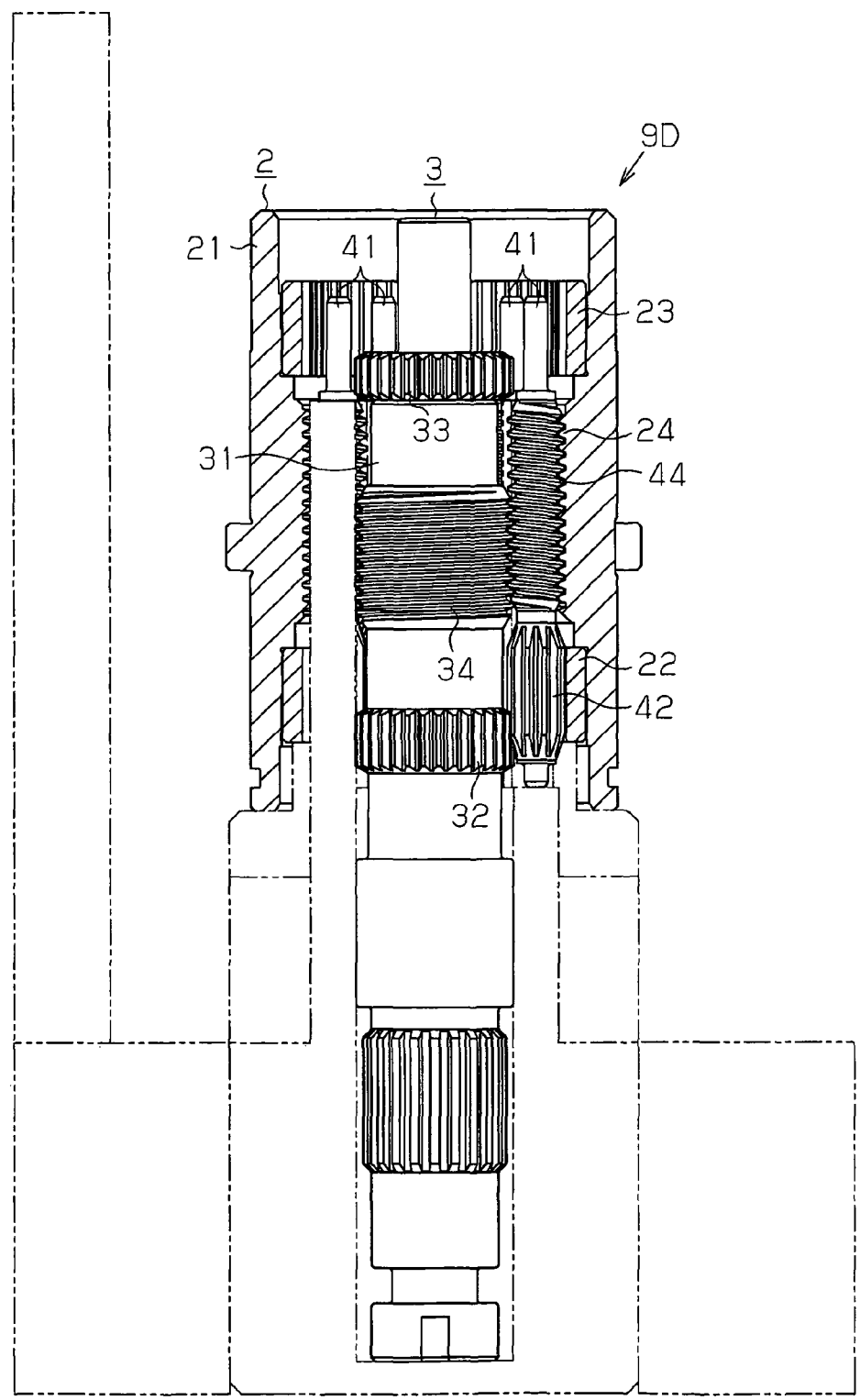
FIG. 65 is a process chart of a process XN in the method for manufacturing the conversion mechanism of FIG. 1.
Figure 66:
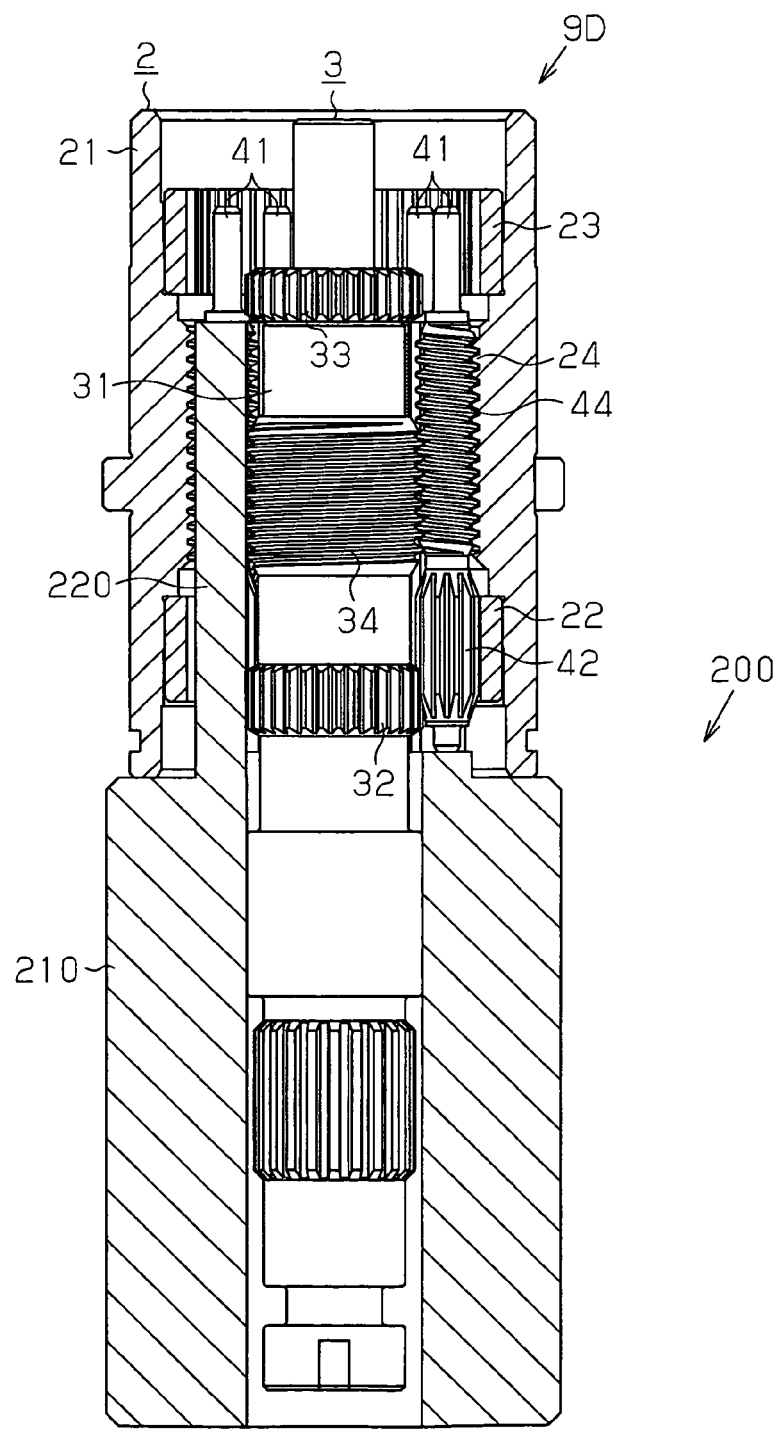
FIG. 66 is a process chart of a process XO in the method for manufacturing the conversion mechanism of FIG. 1.
Figure 67:
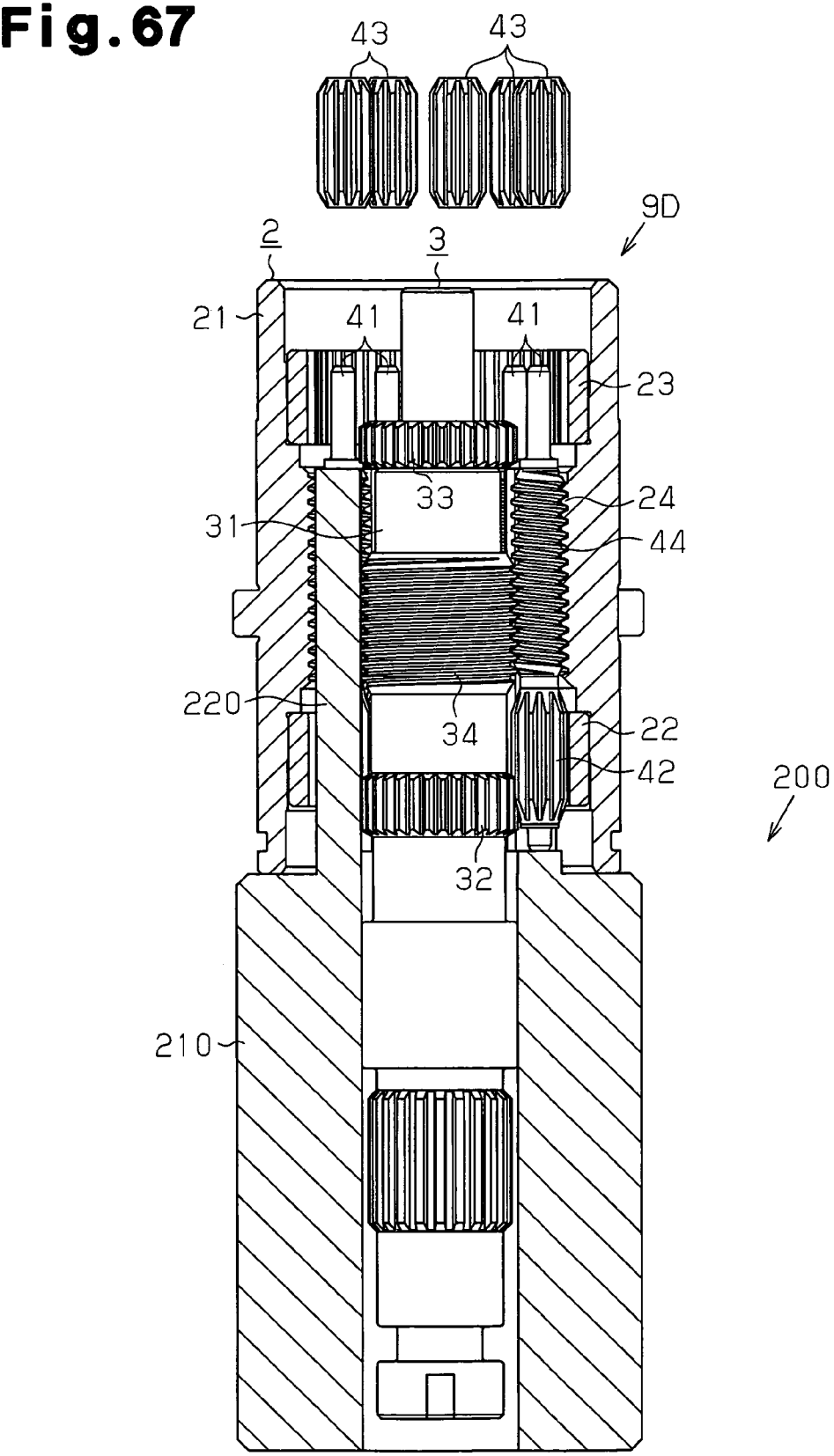
FIG. 67 is a process chart of a process XP in the method for manufacturing the conversion mechanism of FIG. 1.
Figure 68:
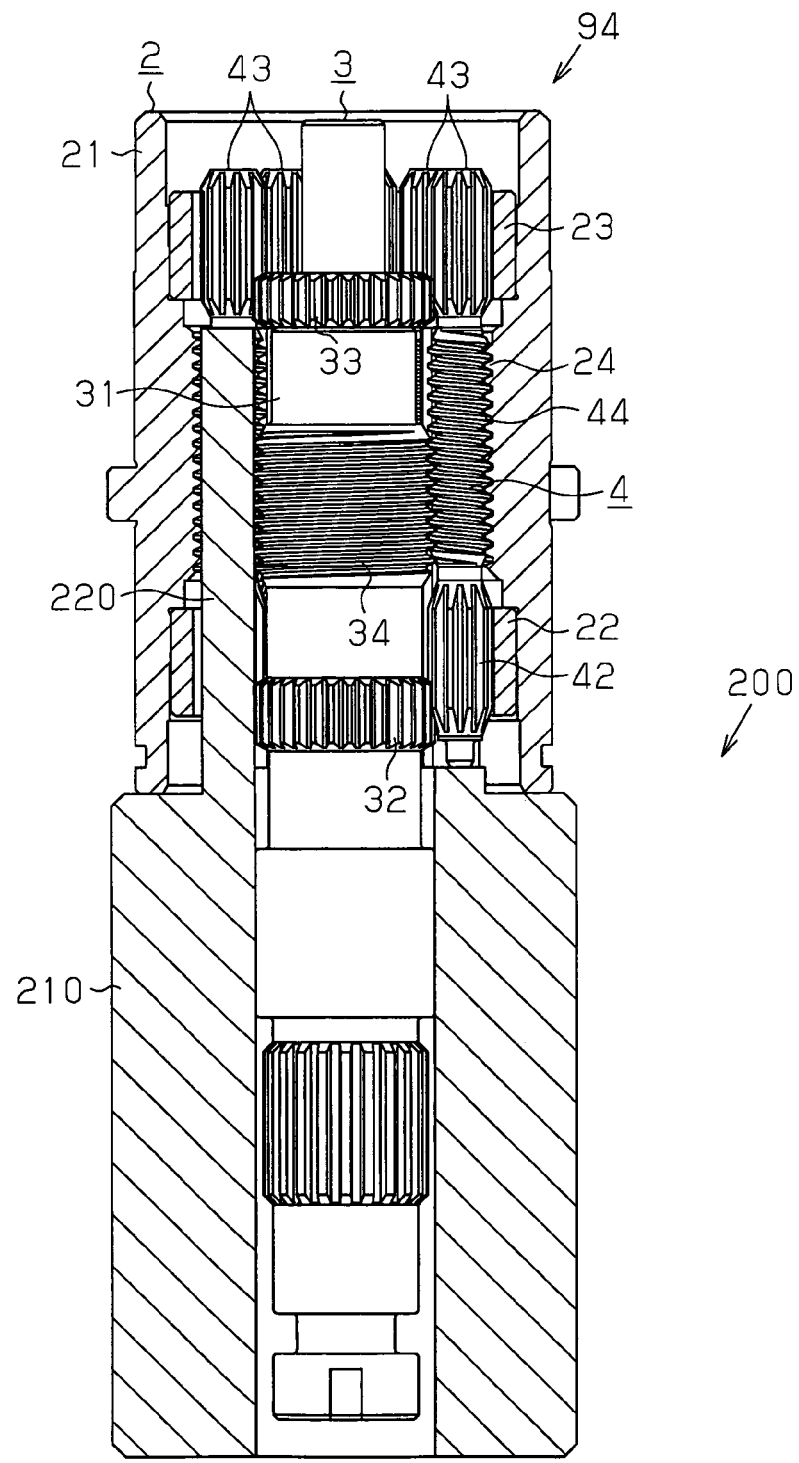
FIG. 68 is a process chart of a process XQ in the method for manufacturing the conversion mechanism of FIG. 1.
Figure 69:
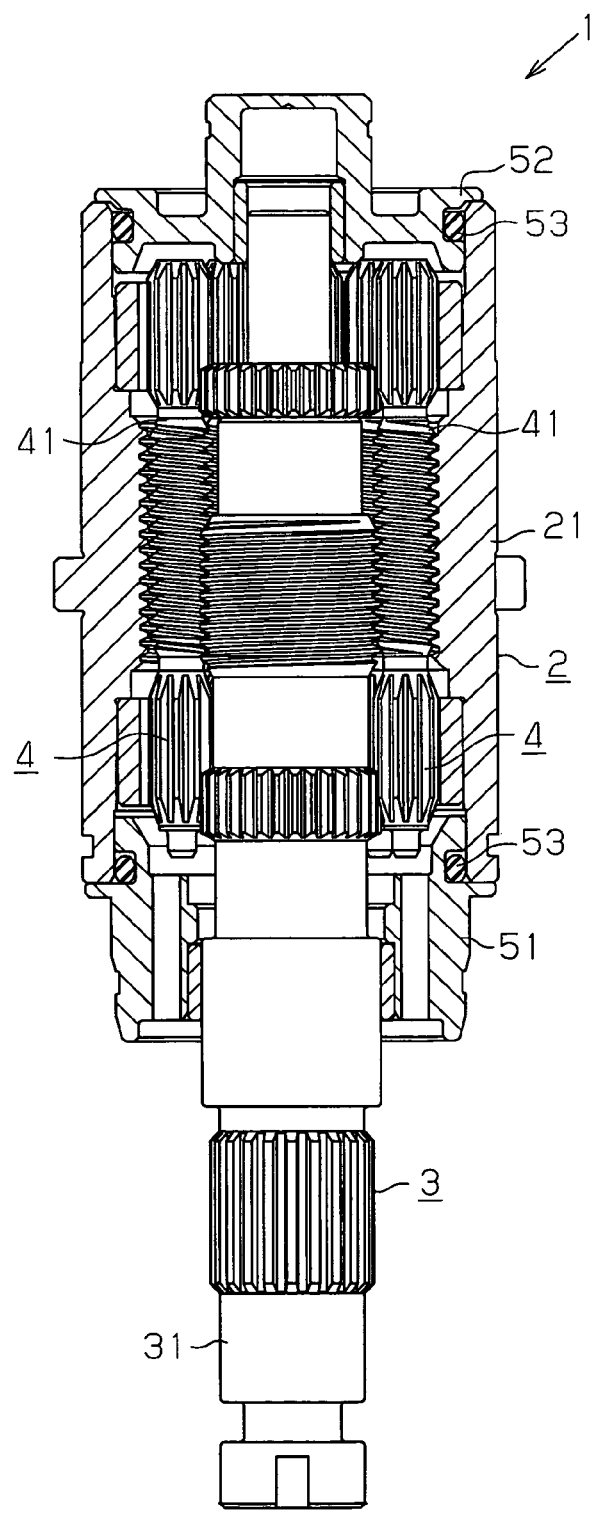
FIG. 69 is a process chart of a process XR in the method for manufacturing the conversion mechanism of FIG. 1.
Figure 70A:
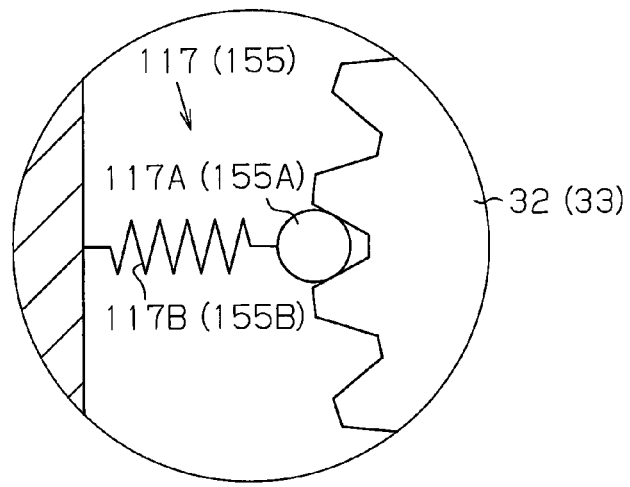
FIG. 70A is a schematic diagram showing a ball plunger for a sun gear of an assembling jig used in the method for manufacturing the conversion mechanism of FIG. 1 and the sun gear.
Figure 70B:
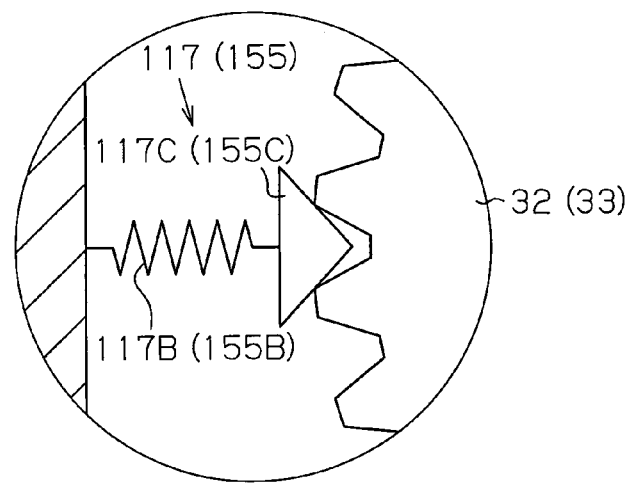
FIG. 70B is a schematic diagram showing a modification of the ball plunger for the sun gear in FIG. 70A.
Figure 70C:
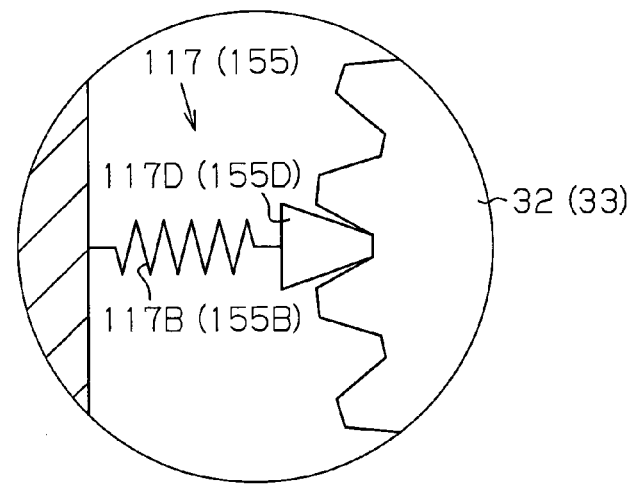
FIG. 70C is a schematic diagram showing a further modification of the ball plunger for the sun gear in FIG. 70A.
Figure 71A:
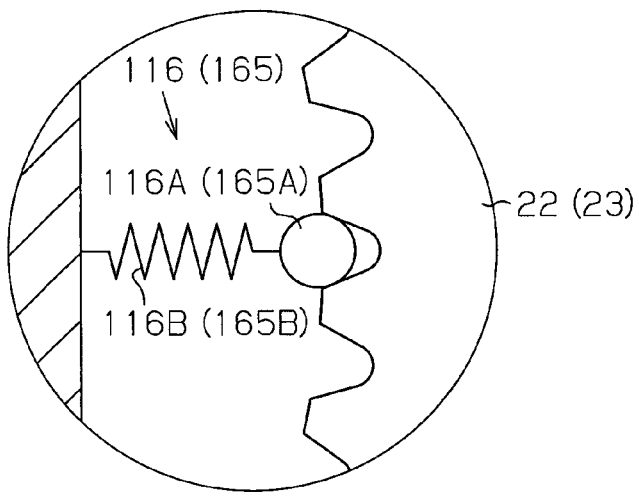
FIG. 71A is a schematic diagram showing a ball plunger for a ring gear of an assembling jig used in the method for manufacturing the conversion mechanism of FIG. 1 and the ring gear.
Figure 71B:
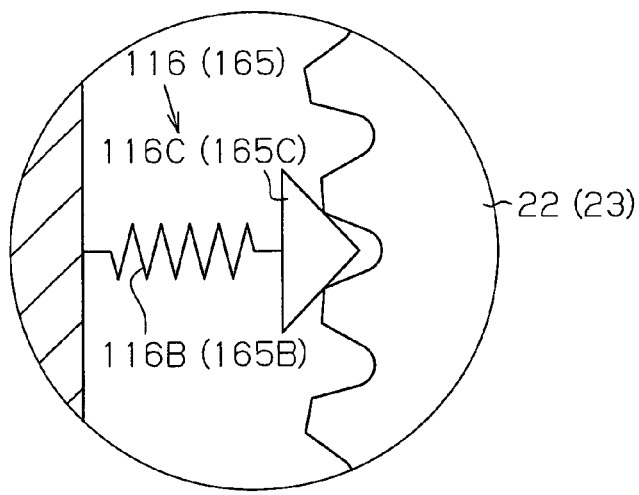
FIG. 71B is a schematic diagram showing a modification of the ball plunger for the ring gear in FIG. 71A.
Figure 71C:
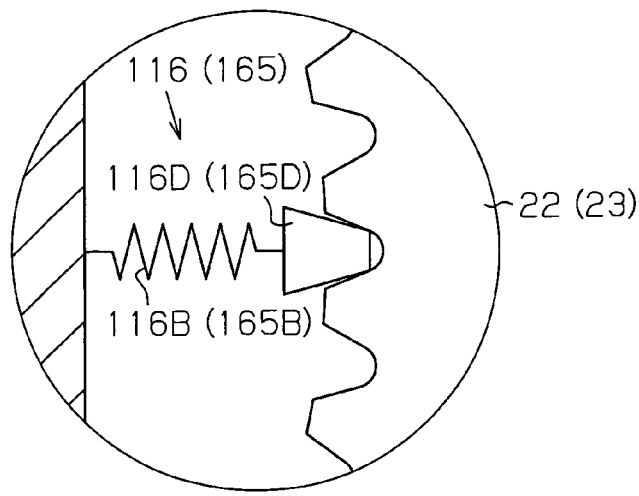
FIG. 71C is a schematic diagram showing a further modification of the ball plunger for the ring gear in FIG. 71A.

[process XI (FIGS. 59 and 60)] The process assembles the twelfth assembly 9B formed by a combination of the eleventh assembly 9A and the front ring gear 22. Specifically, the front ring gear 22 is engaged with each of the front planetary gears 42 (the counter ring gears 45) of the eleventh assembly 9A by moving the first movable portion 120 of the assembling jig 100 from a retracted position (FIG. 58) toward an assembling position (FIG. 59). At this time, the ball 116A of each of the first ring gear ball plungers 116 is arranged between the teeth of the corresponding front ring gear 22. Accordingly, it is possible to secure a state where each of the balls 116A comes into point contact with each of the corresponding tooth surfaces, and a state where each of the balls 116A is pressed against the front ring gear 22 through the spring 116B. Thereafter, the first movable portion 120 is supported by the second movable portion 130, by moving the second movable portion 130 from a retracted position (FIG. 59) to a support position (FIG. 60), in the state where the first movable portion 120 is set to the assembling position. In the case that the holding body (for example, the retainer 65 according to the first embodiment) for restricting the change of the attitude of each of the planetary shaft main bodies 41 with respect to the sun shaft main body 31 is attached to the first assembly 91 through the previous process XE, it is allowed to cancel the regulation by the holding body after the twelfth assembly 9B is assembled through the present process XI.

[process XJ (FIG. 61)] The process assembles the thirteenth assembly 9C formed by a combination of the twelfth assembly 9B and the ring shaft main body 21.

In this case, since the annular threaded section 24 can be engaged with each of the planetary threaded sections 44, in the twelfth assembly 9B, it can be assumed that one externally threaded section (the counter annular threaded section 46) having a discontinuous thread ridge is formed by each of the planetary threaded sections 44 in the same manner as the second assembly 92 according to the first embodiment. Accordingly, the rotational phase of the annular threaded section 24 (the ring shaft main body 21) is set to the annular threaded section reference phase RB in the process XJ, by setting the difference of the relative rotational phases of the counter annular threaded section 46 and the annular threaded section 24 to the annular thread rotational phase difference, and setting the rotational phase of the annular threaded section 24 with respect to the rotational phase of the counter annular threaded section 46 in the state where the annular thread rotational phase difference does not exist to the annular threaded section reference phase RB, in proportion to the first embodiment mentioned above. Therefore, since it is possible to engage the counter annular threaded section 46 with the annular threaded section 24 by moving the ring shaft main body 21 in parallel along the center line, in the state where the center line of the ring shaft main body 21 is aligned with the center line of the sun shaft main body 31 of the twelfth assembly 9B, it is possible to achieve an improvement of a working efficiency for assembling the thirteenth assembly 9C.

In the process XJ, the thirteenth assembly 9C is specifically assembled through each of the following operations. In other words, the ring shaft main body 21 is arranged at a position in which the center line of the sun shaft main body 31 is aligned with its own center line in the rear of the twelfth assembly 9B, and the rotational phase of the annular threaded section 24 is thereafter set to the annular threaded section reference phase RB based on the relation between the rotational phase of the sun indicator 30 and the rotational phase of the annular indicator 20. Thereafter, the annular threaded section 24 are engaged with each of the planetary threaded sections 44 (the counter annular threaded section 46) of the second assembly 92 thereafter by moving the ring shaft main body 21 in parallel along the center line while keeping the attitude of the ring shaft main body 21. Further, the front ring gear 22 is pressure inserted to the ring shaft main body 21 while fastening the ring shaft main body 21 until the end surface of the ring shaft main body 21 abuts the first movable portion 120 of the assembling jig 100. At this time, although a torque is applied to each of the planetary shaft main bodies 41 going with the engagement of the threaded sections, the main body 41 is supported by the support portion 115 of the assembling jig 100. Accordingly, the change of the attitude in the radial direction is going to be regulated. Further, although the torque is applied to the front ring gear 22 going with the pressure insertion to the ring shaft main body 21, the rotation of the ring gear 22 is disabled with respect to the jig main body 110 through each of the first ring gear ball plungers 116 of the assembling jig 100. Accordingly, the rotational phase of the front ring gear 22 with respect to the jig main body 110 and the sun shaft main body 31 by extension is maintained substantially in the identical phase to that before assembling the ring shaft main body 21. In the case that the holding body (for example, the retainer 65 according to the first embodiment) for restricting the change of the attitude of each of the planetary shaft main bodies 41 with respect to the sun shaft main body 31 is attached to the first assembly 91 through the previous process XE, it is possible to cancel the regulation by the holding body after the thirteenth assembly 9C is assembled through the present process XJ. Further, the present process XJ corresponds to one of structures obtained by embodying the first annular gear assembling process or the annular shaft assembly assembling process. Further, the thirteenth assembly 9C corresponds to one of structures obtained by embodying the annular shaft assembly.

In this connection, in the manufacturing method according to the present embodiment, since the first assembly 91 is assembled through the combination of the sun shaft main body 31 and each of the planetary shaft main bodies 41 based on the sun indicator 30 of the sun shaft main body 31, the relation between the rotational phase of the sun indicator 30 and the rotational phase of the counter annular threaded section 46 is always maintained in a fixed relation. Further, since the annular threaded section 24 are formed based on the annular indicator 20 of the ring shaft main body 21, the relation between the rotational phase of the annular indicator 20 and the rotational phase of the annular threaded section 24 is always maintained in a fixed relation. Accordingly, it is possible to assume that the rotational phase of the sun indicator 30 is the rotational phase of the counter annular threaded section 46 and assume that the rotational phase of the annular indicator 20 is the rotational phase of the annular threaded section 24, by previously comprehending the relation between the rotational phase of the sun indicator 30 and the rotational phase of the counter annular threaded section 46 in the twelfth assembly 9B, and the relation between the rotational phase of the annular indicator 20 and the rotational phase of the annular threaded section 24 in the ring shaft main body 21, thereby setting the rotational phase of the annular threaded section 24. In other words, it is possible to set the rotational phase of the annular threaded section 24 to the annular threaded section reference phase RB based on the relation between the rotational phase of the sun indicator 30 and the rotational phase of the annular indicator 20.

[process XK (FIG. 62)] The process attaches the rear ring gear 23 to the attached movable body 162 of the second attached body 160. At this time, the ball 165A of each of the second ring gear ball plungers 165 is arranged between the teeth of the corresponding rear ring gear 23. Accordingly, it is possible to secure a state where each of the balls 165A comes into point contact with the corresponding tooth surface, and a state where each of the balls 165A is pressed against the rear ring gear 23 through the spring 165B. Thereafter, the process attaches the second attached body 160 to the installation portion 140 of the jig main body 110. Accordingly, it is possible to secure a state where the relative rotational phases substantially coincide with each other between the front sun gear 32 of the thirteenth assembly 9C held to the jig main body 110 and the rear ring gear 23 held to the second attached body 160.

[process XL (FIG. 63)] The process assembles the fourteenth assembly 9D formed by a combination of the thirteenth assembly 9C and the rear ring gear 23. Specifically, the attached movable body 162 is moves to the lower side in the axial direction with respect to the attached body main body 161, and the rear ring gear 23 is pressure inserted to the ring shaft main body 21. Accordingly, the ring shaft 2 is assembled in the state where the relative rotational phases substantially coincide between the front ring gear 22 and the rear ring gear 23. In this case, the present process XL corresponds to one of structures obtained by embodying the second annular gear assembling process.

[process XM (FIG. 64)] The process detaches the second attached body 160 from the installation portion 140. [process XN (FIG. 65)] The process detaches the fourteenth assembly 9D from the assembling jig 100.

[process XO (FIG. 66)] The process attaches the fourteenth assembly 9D to the support jig 200. At this time, even if the planetary shaft main body 41 is in an attitude of being inclined to at least one of the sun shaft main body 31 and the ring shaft main body 21 in accordance with the detachment of the fourteenth assembly 9D from the assembling jig 100, the attitude of each of the planetary shaft main bodies 41 is reformed to an attitude of being in parallel to at least one of the sun shaft main body 31 and the ring shaft main body 21, and the state is going to be kept.

[process XP (FIG. 67)] The process assembles the fourth assembly 94 formed by a combination of the fourteenth assembly 9D and each of the rear planetary gears 43. Specifically, each of the rear planetary gears 43 is installed to the planetary shaft main body 41 of the corresponding fourth assembly 94 separately or in a lump. In this case, the fourteenth assembly 9D corresponds to one of structures obtained by embodying the planetary assembly. Further, the present process XP corresponds to one of structures obtained by embodying the assembly assembling process or the planetary gear assembling process.

[process XQ (FIG. 68)] The process detaches the fourth assembly 94 from the support jig 200.

[process XR (FIG. 69)] The process carries out the work in proportion to the process T according to the first embodiment. In other words, the process assembles the conversion mechanism 1 by installing the front collar 51 and the rear collar 52 to the fourth assembly 94. Specifically, the process installs the O-ring to each of the front collar 51 and the rear collar 52, and thereafter installs the front collar 51 and the rear collar 52 to the ring shaft main body 21.

Effect of Embodiment

As mentioned above in detail, according to the method for manufacturing the conversion mechanism of this embodiment, the effects shown below can be obtained.

(21) In the manufacturing method according to the present embodiment, since the sun shaft main body 31 is combined with the rear sun gear 33 in the state where the relative rotational phases substantially coincide between the front sun gear 32 and the rear sun gear 33, the relative rotational phases are going to substantially coincide between the front sun gear 32 and the rear sun gear 33 in the sun shaft 3. Accordingly, since it is possible to accurately inhibit the corresponding sun gear and planetary gear from being engaged in the state where they are deviated greatly from the engaged state at the design time, it is possible to achieve an improvement of a work conversion efficiency from the rotational motion to the rectilinear motion. In other words, since the conversion mechanism 1 can be assembled in the state where the slant angle TA of the planetary shaft main body 41 is smaller than the reference slant angle TAX, through the management of the rotational phases of the front sun gear 32 and the rear sun gear 33, it is possible to accurately secure the demand conversion efficiency HX as the work conversion efficiency HS of the conversion mechanism 1.

(22) In the manufacturing method according to the present embodiment, since the ring shaft main body 21 is combined with the rear ring gear 23 in the state where the relative rotational phases substantially coincide between the front ring gear 22 and the rear ring gear 23, the relative rotational phases are going to substantially coincide between the front ring gear 22 and the rear ring gear 23 in the ring shaft 2. Accordingly, since it is possible to accurately inhibit the corresponding ring gear and planetary gear from being engaged in the state where they are deviated greatly from the engaged state at the design time, it is possible to achieve an improvement of a work conversion efficiency from the rotational motion to the rectilinear motion. In other words, since the conversion mechanism 1 can be assembled in the state where the slant angle TA of the planetary shaft main body 41 is smaller than the reference slant angle TAX, through the management of the rotational phases of the front ring gear 22 and the rear ring gear 23, it is possible to accurately secure the demand conversion efficiency HX as the work conversion efficiency HS of the conversion mechanism 1.

(23) In accordance with the manufacturing method of the present embodiment, since it is possible to get prepared for obtaining the state where the relative rotational phases substantially coincide between the front sun gear 32 and the rear sun gear 33 in the sun shaft 3, by attaching each of the sun shaft main body 31 and the rear sun gear 33 to the assembling jig 100, that is, it is possible to get prepared for it without strictly managing the relative rotational phases of the sun gears, it is possible to achieve an improvement of the working efficiency for manufacturing the conversion mechanism 1.

(24) In accordance with the manufacturing method of the present embodiment, since it is possible to get prepared for obtaining the state where the relative rotational phases substantially coincide between the front ring gear 22 and the rear ring gear 23 in the ring shaft 2, by attaching each of the ring shaft main body 21 and the rear ring gear 23 to the assembling jig 100, that is, it is possible to get prepared for it without strictly managing the relative rotational phases of the ring gears, it is possible to achieve an improvement of the working efficiency for manufacturing the conversion mechanism 1.

(25) In accordance with the manufacturing method of the present embodiment, since the ball 117A of each of the first sun gear ball plungers 117 is arranged between the teeth of the front sun gear 32 and comes into contact with each of the adjacent tooth surfaces, it is possible to accurately regulate the rotation of the front sun gear 32 with respect to the jig main body 110. In this case, as a structure disenabling the rotation of the front sun gear 32 with respect to the jig main body 110, for example, there can be considered a structure in which the jig main body 110 is provided with a gear having a corresponding shape to the front sun gear 32, and the sun gear 32 is engaged therewith, however, this case is capable of causing a state where the rotation of the front sun gear 32 is not sufficiently regulated by a backlash of each of the gears. In this regard, according to the structure mentioned above of the present embodiment, since it is possible to securely regulate the rotation with respect to the jig main body 110 caused by the backlash of the front sun gear 32, it is possible to accurately coincide the relative rotational phases between the front sun gear 32 and the rear sun gear 33.

(26) In accordance with the manufacturing method of the present embodiment, since the ball 155A of each of the second sun gear ball plungers 155 is arranged between the teeth of the rear sun gear 33 and comes into contact with each of the adjacent tooth surfaces, it is possible to accurately regulate the rotation of the rear sun gear 33 with respect to the first attached body 150. In this case, as a structure disenabling the rotation of the rear sun gear 33 with respect to the first attached body 150, for example, there can be considered a structure in which the first attached body 150 is provided with a gear having a corresponding shape to the rear sun gear 33, and the sun gear 33 is engaged therewith, however, this case is capable of causing a state where the rotation of the rear sun gear 33 is not sufficiently regulated by a backlash of each of the gears. In this regard, according to the structure mentioned above of the present embodiment, since it is possible to securely regulate the rotation with respect to the first attached body 150 caused by the backlash of the rear sun gear 33, it is possible to accurately coincide the relative rotational phases between the front sun gear 32 and the rear sun gear 33.

(27) In the front sun gear 32 or the rear sun gear 33, since there is a case that the shape of the tooth is varied per the gear, that is, positions of the root of a tooth and the tooth top are different per the gear, the dispersion of the rotational phase of the gear with respect to the assembling jig 100 is generated in the front sun gear 32 or the rear sun gear 33 in the state where the rotation with respect to the assembling jig 100 is disenable, in the case that the rotation of the front sun gear 32 or the rear sun gear 33 is regulated through the contact of part of the assembling jig 100 with the root of tooth and the tooth top. In this regard, since the balls 117A and 155A of the ball plungers 117 and 155 are brought into contact with the tooth surface on the pitch circle or near the pitch circle in the manufacturing method according to the present embodiment, it is possible to accurately inhibit the dispersion from being generated in the rotational phase of the front sun gear 32 or the rear sun gear 33 with respect to the assembling jig 100 caused by the dispersion of the shape of the tooth. Further, since the dispersion of the shape of the tooth mentioned above is generated in the case that the front sun gear 32 or the rear sun gear 33 are formed through a plastic working such as a threading or the like, the effect mentioned above is significantly achieved in this case. On the other hand, in the case that the front sun gear 32 or the rear sun gear 33 is formed through the other machine work such as a cutting work or the like, a degree of the dispersion of the shape of the tooth mentioned above becomes comparatively small. Accordingly, even in the case of employing the structure disenabling the rotation of the front sun gear 32 or the rear sun gear 33 with the assembling jig 100 by bringing part of the assembling jig 100 into contact with the root of tooth or the tooth tip, the dispersion of the rotational phase of the gear with respect to the assembling jig 100 is going to be suppressed. In this case, as the structure, for example, there can be listed up a structure in which the distal ends of the springs 117B and 155B are provided with cylinders 117C and 155C having shapes shown in FIG. 70B in place of the balls 117A and 155A in the embodiment shown in FIG. 70A. In this structure, it is possible to regulate the rotation of the front sun gear 32 or the rear sun gear 33 through the contact of the cylinder 117C with each of the tooth tops of the adjacent teeth. Further, as the other structure, there can be listed up a structure in which the distal ends of the springs 117B and 155B are provided with cylinders 117D and 155D having shapes shown in FIG. 70C in place of the balls 117A and 155A in the embodiment. In this structure, it is possible to regulate the rotation of the front sun gear 32 or the rear sun gear 33 through the contact of the cylinder 117D with each of the roots of tooth of the adjacent teeth.

(28) In accordance with the manufacturing method of the present embodiment, since the ball 116A of each of the first ring gear ball plungers 116 is arranged between the teeth of the front ring gear 22 so as to come into contact with each of the adjacent tooth surfaces, it is possible to accurately regulate the rotation of the front ring gear 22 with respect to the jig main body 110. In this case, as a structure of disenabling the rotation of the front ring gear 22 with respect to the jig main body 110, for example, there can be considered a structure in which the jig main body 110 is provided with a gear having a corresponding shape to the front ring gear 22, and the gear is engaged with the ring gear 22, however, in this case, there may be generated a state where the rotation of the front ring gear 22 is not sufficiently regulated by the backlash of each of the gears. In this regard, according to the structure of the present embodiment, since it is possible to securely regulate the rotation with respect to the jig main body 110 caused by the backlash of the front ring gear 22, it is possible to accurately bring the relative rotational phases into line between the front ring gear 22 and the rear ring gear 23.

(29) In accordance with the manufacturing method of the present embodiment, since the ball 165A of each of the second ring gear ball plungers 165 is arranged between the teeth of the rear ring gear 23 so as to come into contact with each of the adjacent tooth surfaces, it is possible to accurately regulate the rotation of the rear ring gear 23 with respect to the second attached body 160. In this case, as a structure of disenabling the rotation of the rear ring gear 23 with respect to the second attached body 160, for example, there can be considered a structure in which the second attached body 160 is provided with a gear having a corresponding shape to the rear ring gear 23, and the gear is engaged with the ring gear 23, however, in this case, there may be generated a state where the rotation of the rear ring gear 23 is not sufficiently regulated by the backlash of each of the gears. In this regard, according to the structure of the present embodiment, since it is possible to securely regulate the rotation with respect to the second attached body 160 caused by the backlash of the rear ring gear 23, it is possible to accurately bring the relative rotational phases into line between the front ring gear 22 and the rear ring gear 23.

(30) In the front ring gear 22 or the rear ring gear 23, since there is a case that the shape of the tooth is varied per the gear, that is, positions of a root of tooth and a tooth top are different per the gear, the dispersion of the rotational phase of the gear with respect to the assembling jig 100 is going to be generated in the front ring gear 22 or the rear ring gear 23 in the state where the rotation with respect to the assembling jig 100 is disenable, in the case that the rotation of the front ring gear 22 or the rear ring gear 23 is regulated through the contact of part of the assembling jig 100 with the root of tooth and the tooth top. In this regard, since the balls 116A and 165A of the ball plungers 116 and 165 are brought into contact with the tooth surface on the pitch circle or near the pitch circle in the manufacturing method according to the present embodiment, it is possible to accurately inhibit the dispersion from being generated in the rotational phase of the front ring gear 22 or the rear ring gear 23 with respect to the assembling jig 100 caused by the dispersion of the shape of the tooth. Further, since the dispersion of the shape of the tooth mentioned above is generated in the case that the front ring gear 22 or the rear ring gear 23 are formed through a plastic operation such as threading or the like, the effect mentioned above is significantly achieved in this case. On the other hand, in the case that the front ring gear 22 or the rear ring gear 23 is formed through the other machine work such as a cutting work or the like, a degree of the dispersion of the shape of the tooth mentioned above becomes comparatively small. Accordingly, even in the case of employing the structure disenabling the rotation of the front ring gear 22 or the rear ring gear 23 with the assembling jig 100 by bringing part of the assembling jig 100 into contact with the root of tooth or the tooth tip, the dispersion of the rotational phase of the gear with respect to the assembling jig 100 is going to be suppressed. In this case, as the structure, for example, there can be listed up a structure in which the distal ends of the springs 116B and 165B are provided with cylinders 116C and 165C having shapes shown in FIG. 71B in place of the balls 116A and 165A in the embodiment shown in FIG. 71A. In this structure, it is possible to regulate the rotation of the front ring gear 22 or the rear ring gear 23 through the contact of the cylinder 116C with each of the tooth tops of the adjacent teeth. Further, as the other structure, there can be listed up a structure in which the distal ends of the springs 116B and 165B are provided with cylinders 116D and 165D having shapes shown in FIG. 71C in place of the balls 116A and 165A in the embodiment. In this structure, it is possible to regulate the rotation of the front ring gear 22 or the rear ring gear 23 through the contact of the cylinder 116D with each of the roots of tooth of the adjacent teeth.

(31) In accordance with the manufacturing method of the present embodiment, the rear planetary gear 43 is engaged with the rear sun gear 33 of the sun shaft 3 in the sun shaft 3 in the state where the relative rotational phases substantially coincide between the front sun gear 32 and the rear sun gear 33. Accordingly, it is possible to assemble the fourth assembly 94 in the state where the relative rotational phases substantially coincide, without strictly managing the relative rotational phases of the front planetary gear 42 and the rear planetary gear 43. Further, in conjunction with this, it is possible to accurately obtain the engagement state between the rear sun gear 33 and the rear planetary gear 43 which is assumed at the design time, in the fourth assembly 94.

(32) In accordance with the manufacturing method of the present embodiment, the rear planetary gear 43 is engaged with the rear ring gear 23 of the ring shaft 2 in the ring shaft 2 in the state where the relative rotational phases substantially coincide between the front ring gear 22 and the rear ring gear 23. Accordingly, it is possible to assemble the fourth assembly 94 in the state where the relative rotational phases substantially coincide, without strictly managing the relative rotational phases of the front planetary gear 42 and the rear planetary gear 43. Further, in conjunction with this, it is possible to accurately obtain the engagement state between the rear ring gear 23 and the rear planetary gear 43 which is assumed at the design time, in the fourth assembly 94.

(33) In the case that the planetary shaft main body 41 is inclined to at least one of the sun shaft main body 31 and the ring shaft main body 21, at a time of assembling the rear planetary gear 43 to each of the planetary shaft main bodies 41 of the fourteenth assembly 9D, the rear planetary gear 43 is assembled in the planetary shaft main body 41 in a state in which the rear planetary gear 43 is inclined to at least one of the sun shaft main body 31 and the ring shaft main body 21 after the example of this. Accordingly, the engagement state between at least one of the rear sun gear 33 and the rear ring gear 23 and the rear planetary gear 43 is deviated greatly from the engagement state at the design time. In this regard, in the manufacturing method according to the present embodiment, since each of the rear planetary gears 43 is assembled in the state where each of the planetary shaft main bodies 41 is in parallel to at least one of the sun shaft main body 31 and the ring shaft main body 21 through the support jig 200, it is possible to accurately inhibit the engagement state between at least one of the rear sun gear 33 and the rear ring gear 23 and each of the rear planetary gears 43 from being deviated greatly from the engagement state at the design time in the fourth assembly 94. In other words, since the conversion mechanism 1 is formed in the state where the slant angle TA of the planetary shaft main body 41 is smaller than the reference slant angle TAX, through the management of the attitude of the planetary shaft main body 41 at a time of assembling the rear planetary gear 43 formed separately from the planetary shaft main body 41, it is possible to accurately secure the demand conversion efficiency HX as the work conversion efficiency HS of the conversion mechanism 1.

(34) In accordance with the manufacturing method of the present embodiment, it is possible to further achieve the effects in proportion to the effects (1) to (6), (10) to (14), (16), (17) and (19) according to the first embodiment.

Modification of Embodiment

The fourth embodiment may be modified, for example, as described below.

Figure 72A:
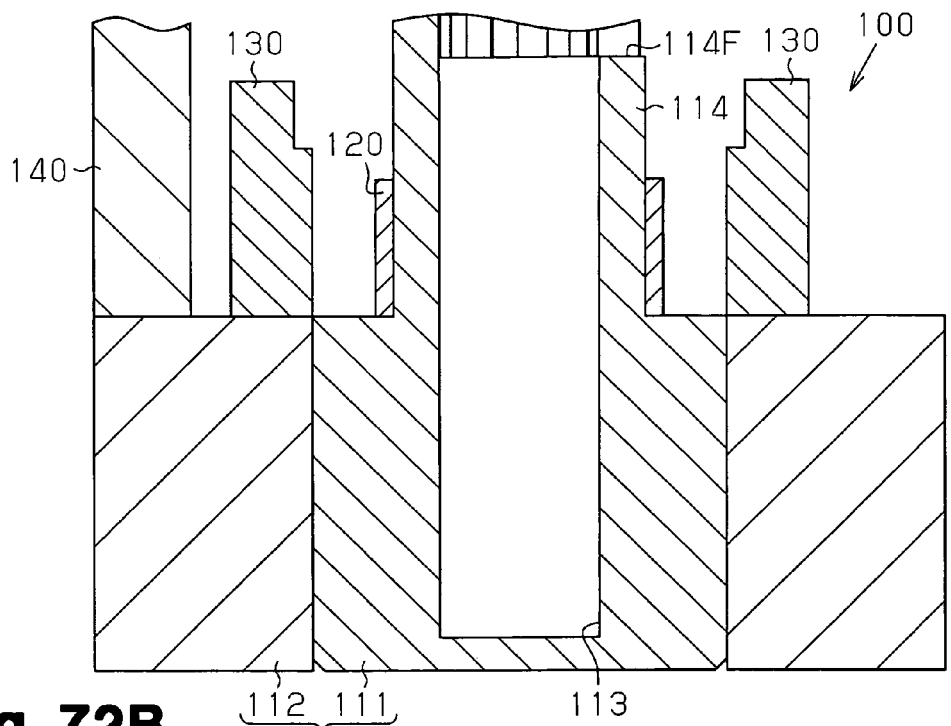
FIG. 72A is a cross-sectional view showing a modification of a first movable portion and a second movable portion of the assembling jig used in the method for manufacturing the conversion mechanism of FIG. 1.
Figure 72B:
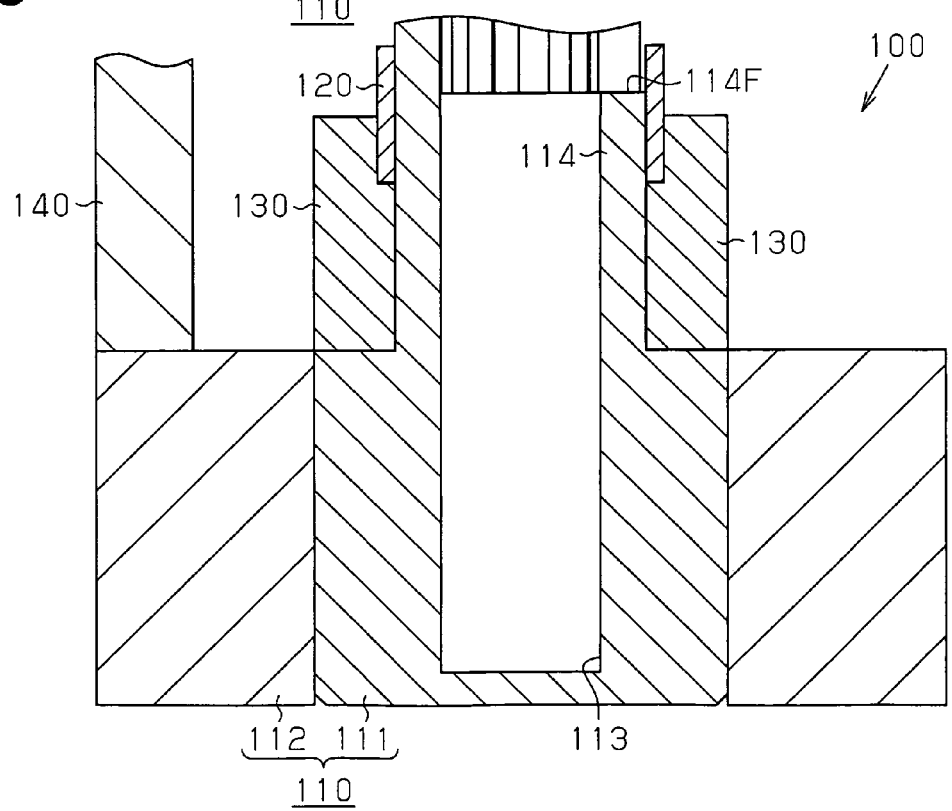
FIG. 72B is a cross-sectional view of the assembling jig in a state in which the first movable portion in FIG. 72A is set to an assembling position, and in a state in which the second movable portion in FIG. 72A is set to a support position.

In the embodiment mentioned above, the assembling jig 100 employs the structure in which the ring shaft main body 21 is positioned in the axial direction with respect to each of the planetary shaft main bodies 41, by abutting the end surface of the ring shaft main body 21 against the first movable portion 120 at a time of assembling the thirteenth assembly 9C, however, the structure for obtaining the same function is not limited to the structure exemplified in the embodiment mentioned above, but can be appropriately changed. As the other structure, for example, there can be listed up a structure in which the ring shaft main body 21 is positioned in the axial direction with respect to each of the planetary shaft main bodies 41 by changing the structures of the first movable portion 120 and the second movable portion 130 as shown in FIG. 72, and abutting the end surface of the ring shaft main body 21 against the second movable portion 130 at a time of assembling the thirteenth assembly 9C. In this case, FIG. 72A shows a state where the first movable portion 120 and the second movable portion 130 are respectively set their retracted positions, and FIG. 72B shows a state where the first movable portion 120 is set to an assembling position, and the second movable portion 130 is set to a support position.

In the embodiment mentioned above, the assembling jig 100 employs the structure disenabling the rotation of the front sun gear 32 with respect to the jig main body 110 through the first sun gear ball plunger 117, however, the structure for obtaining the same function is not limited to the structure exemplified by the embodiment, but can be appropriately modified. As the other structure, for example, there can be listed up a structure disenabling the rotation of the front sun gear 32 with respect to the jig main body 110 through a fitting between a convex portion formed in the jig main body 110 and a concave portion formed in the front sun gear 32.

In the embodiment mentioned above, the assembling jig 100 employs the structure disenabling the rotation of the rear sun gear 33 with respect to the first attached body 150 through the second sun gear ball plunger 155, however, the structure for obtaining the same function is not limited to the structure exemplified by the embodiment, but can be appropriately modified. As the other structure, for example, there can be listed up a structure disenabling the rotation of the rear sun gear 33 with respect to the first attached body 150 through a fitting between a convex portion formed in the first attached body 150 and a concave portion formed in the rear sun gear 33.

In the embodiment mentioned above, the assembling jig 100 employs the structure disenabling the rotation of the front ring gear 22 with respect to the jig main body 110 through the first ring gear ball plunger 116, however, the structure for obtaining the same function is not limited to the structure exemplified by the embodiment, but can be appropriately modified. As the other structure, for example, there can be listed up a structure disenabling the rotation of the front ring gear 22 with respect to the jig main body 110 through a fitting between a convex portion formed in the jig main body 110 and a concave portion formed in the front ring gear 22.

In the embodiment mentioned above, the assembling jig 100 employs the structure disenabling the rotation of the rear ring gear 23 with respect to the second attached body 160 through the second ring gear ball plunger 165, however, the structure for obtaining the same function is not limited to the structure exemplified by the embodiment, but can be appropriately modified. As the other structure, for example, there can be listed up a structure disenabling the rotation of the rear ring gear 23 with respect to the second attached body 160 through a fitting between a convex portion formed in the second attached body 160 and a concave portion formed in the rear ring gear 23.

In the embodiment, the jig main body 110 of the assembling jig 100 can be employed as the support jig 200. In other words, the fourteenth assembly 9D can be attached to the first main body 111 according to an aspect in proportion to the case that the jig main body 110 is divided into the first main body 111 and the second main body 112 before assembling the fourth assembly 94, and the fourteenth assembly 9D is attached to the support jig 200. In this case, it is possible to approximate the structure of the first main body 111 more to the structure of the support jig 200, by replacing the support portion 115 by a structure having no ball plunger, before attaching the fourteenth assembly 9D to the first main body 111.

In the embodiment mentioned above, there is assumed the conversion mechanism 1 having the structure in which the front sun gear 32 is integrally formed with the sun shaft main body 31, however, the front sun gear 32 may be formed separately from the sun shaft main body 31 together with the rear sun gear 33. In this case, it is possible to construct the sun shaft 3 in a state in which the relative rotational phases substantially coincide between the front sun gear 32 and the rear sun gear 33 by assembling the rear sun gear 33 according to an aspect in proportion to the process XG (FIG. 57) mentioned above to the sun shaft main body 31 after passing through the process of assembling the front sun gear 32 to the sun shaft main body 31. In this case, the assembling process of the front sun gear 32 corresponds to one of the structure obtained by embodying the first sun gear assembling process.

In the embodiment mentioned above, there is assumed the conversion mechanism 1 having the structure in which the front ring gear 22 is formed separately from the ring shaft main body 21, however, the front ring gear 22 may be formed integrally with the ring shaft main body 21. IR this case, it is possible to construct the ring shaft 2 in a state in which the relative rotational phases substantially coincide between the front ring gear 22 and the rear ring gear 23 by assembling the rear ring gear 23 according to an aspect in proportion to the process XL (FIG. 63) mentioned above to the thirteenth assembly 9C after passing through the process of assembling the thirteenth assembly 9C.

In the embodiment mentioned above, there is assumed the conversion mechanism 1 having the structure in which the rear planetary gear 43 is formed separately from the planetary shaft main body 41, however, the front planetary gear 42 may be formed separately from the planetary shaft main body 41. In this case, it is possible to respectively install each of the rear planetary gears 43 and each of the front planetary gears 42 to the planetary shaft main body 41, after the assembly including the sun shaft 3, the ring shaft 2 and each of the planetary shaft main bodies 41 is assembled on the assembling jig 100.

In the embodiment mentioned above, there is assumed the conversion mechanism 1 having the structure in which the front sun gear 32 is formed integrally with the sun shaft main body 31, and the rear sun gear 33 is formed separately from the sun shaft main body 31, however, the structure of the sun shaft 3 may be changed as follows. In other words, the front sun gear 32 may be formed separately from the sun shaft main body 31, and the rear sun gear 33 may be formed integrally with the sun shaft main body 31. Further, the front sun gear 32 and the rear sun gear 33 may be formed integrally with the sun shaft main body 31.

In the embodiment mentioned above, there is assumed the conversion mechanism 1 having the structure in which the front ring gear 22 and the rear ring gear 23 are formed integrally with the ring shaft main body 21, however, the structure of the ring shaft 2 may be changed as follows. In other words, the front ring gear 22 may be formed separately from the ring shaft main body 21, and the rear ring gear 23 may be formed integrally with the ring shaft main body 21. Further, the front ring gear 22 and the rear ring gear 23 may be formed integrally with the ring shaft main body 21.

In the embodiment mentioned above, there is assumed the conversion mechanism 1 having the structure in which the front planetary gear 42 is formed integrally with the planetary shaft main body 41, and the rear planetary gear 43 is formed separately from the planetary shaft main body 41, however, the structure of the planetary shaft 4 may be changed as follows. In other words, the front planetary gear 42 may be formed separately from the planetary shaft main body 41, and the rear planetary gear 43 may be formed integrally with the planetary shaft main body 41. Further, the front planetary gear 42 and the rear planetary gear 43 may be formed integrally with the planetary shaft main body 41.

In the embodiment mentioned above, there is assumed the manufacturing method of constructing the conversion mechanism 1 by combining the sun shaft main body 31 and each of the planetary shaft main bodies 41 so as to construct the first assembly 91, and thereafter installing the other constituent elements to the assembly 91 alphabetically, however, the assembling procedure of the conversion mechanism 1 may be changed, for example, as follows. In other words, the conversion mechanism 1 may be formed by first assembling an assembly formed by a combination of the ring shaft main body 21 and each of the planetary shaft main bodies 41 according to an aspect in proportion to the third embodiment, and thereafter installing the other constituent elements to the assembly alphabetically. In this case, it is possible to achieve operations and effects in proportion to the operations and effects of the fourth embodiment by applying a function for achieving the construction of the conversion mechanism 1 in accordance with the procedure mentioned above to the assembling jig 100 (particularly, the jig main body 110), in proportion to the structures of the third jig 66 and the fourth jig 67 according to the third embodiment, and constructing the conversion mechanism 1 through the assembling jig 100 to which the change mentioned above is applied.

In addition, the elements which can be changed in common with each of the embodiments are shown below.

In each of the embodiments mentioned above, the axial relative position MS is set to the axial regular position XS by abutting the front distal end portion 41T against the first jig 61 or the third jig 66 or the assembling jig 100, however, the method for setting the axial relative position MS to the axial regular position XS is not limited to the method exemplified by each of the embodiments. For example, the axial relative position MS can be set to the axial regular position XS by forming an indicator for setting the axial relative position MS to the axial regular position XS in each of the sun shaft main body 31 and the planetary shaft main body 41, and setting the axially position of the planetary shaft main body 41 in such a manner that a relative positional relation of these indicators comes to a previously set relation.

In the first to third embodiments, the fourth assembly 94 is assembled through the combination between the third assembly 93 and the gear assembly 99, however, the assembling procedure of the fourth assembly 94 can be changed to any one of the following procedures (A) to (C).

(A) The fourth assembly 94 is formed by installing the rear ring gear 23, the rear sun gear 33 and each of the rear planetary gears 43 separately to the third assembly 93.

(B) The fourth assembly 94 is formed by installing the assembly formed by the combination between the rear ring gear 23 and each of the rear planetary gears 43, and the rear sun gear 33 separately to the third assembly 93.

(C) The fourth assembly 94 is formed by installing the assembly formed by the combination between the rear sun gear 33 and each of the rear planetary gears 43, and the rear ring gear 23 separately to the third assembly 93.

In the first to third embodiments, there is assumed the conversion mechanism 1 having the structure provided with the front ring gear 22 and the rear ring gear 23, however, the manufacturing method according to the present invention can be applied to a conversion mechanism having a structure in which at least one of the front ring gear 22 and the rear ring gear 23 is omitted.

In the first to third embodiments, there is assumed the conversion mechanism 1 having the structure provided with the front sun gear 32 and the rear sun gear 33, however, the manufacturing method according to the present invention can be applied to a conversion mechanism having a structure in which at least one of the front sun gear 32 and the rear sun gear 33 is omitted.

In the first to third embodiments, there is assumed the conversion mechanism 1 having the structure provided with the front ring gear 22, the front sun gear 32, the front planetary gear 42, the rear ring gear 23, the rear sun gear 33 and the rear planetary gear 43, however, the manufacturing method according to the present invention can be applied to a conversion mechanism having a structure in which at least one of a group including the front ring gear 22, the front sun gear 32 and the front planetary gear, and a group including the rear ring gear 23, the rear sun gear and the rear planetary gear 43 is omitted.

In the first to third embodiments mentioned above, the manufacturing method according to the present invention is applied to the conversion mechanism having the structure in which the force is transmitted through the threaded section and the gear between the ring shaft 2, the sun shaft 3 and each of the planetary shafts 4, however, the manufacturing method according to the present invention can be applied to a conversion mechanism having a structure in which the force is transmitted only by a threaded section engagement between the ring shaft 2, the sun shaft 3 and each of the planetary shafts 4.

The invention claimed is:

1. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which the annular shaft includes an annular shaft main body having an annular threaded section defined by an internally threaded section, the sun shaft includes a sun shaft main body having a sun threaded section defined by an externally threaded section, the planetary shafts each include a planetary shaft main body having a planetary threaded section defined by an externally threaded section, the planetary threaded section is engaged with the annular threaded section and the sun threaded section, and rotational motion of either one of the annular shaft and the sun shaft is converted into rectilinear motion of the other one of the annular shaft and the sun shaft along an axial direction by a planetary motion of the planetary shaft, the method comprising the steps of:

corresponding a relationship of the planetary shaft main bodies relative to the sun shaft main body in arrangement to the relationship in a regular assembled state of the planetary shaft main bodies relative to the sun shaft main body, with the regular assembled state being defined by a state in which the sun threaded section and the planetary threaded sections are engaged with each other in a state in which the planetary shaft main bodies are arranged at even intervals around the sun shaft main body; and assembling a basic assembly by moving each of the planetary shaft main bodies after corresponding the relationship of the planetary shaft main bodies relative to the sun shaft main body to the relationship in the regular assembled state, the basic assembly being an assembly formed by a combination of the sun shaft main body and the planetary shaft main bodies in the regular assembled state;

wherein the step of assembling a basic assembly includes the step of setting a planetary shaft relative phase, which is a rotational phase of each of the planetary shaft main bodies relative to a rotational phase of the sun shaft main body, as a planetary shaft regular phase, which is the planetary shaft relative phase in the regular assembled state, by fastening each of the planetary shaft main bodies to a threaded jig, in which an internally threaded section for engaging the planetary threaded sections is formed, before combining the planetary shaft main bodies with the sun shaft main body.

2. The manufacturing method according to claim 1, wherein the step of assembling a basic assembly includes the step of setting a circumferential relative position, which is the position of each planetary shaft main body in a circumferential direction relative to the sun shaft main body, as a circumferential regular position, which is the circumferential relative position in the regular assembled state, before combining the planetary shaft main body with the sun shaft main body.

3. The manufacturing method according to claim 2, further comprising the steps of:
forming an indicator in the sun shaft main body;
forming the sun threaded section in the sun shaft main body based on a sun indicator, which is the indicator of the sun shaft main body; and
setting the circumferential relative position as the circumferential regular position based on a rotational phase of the sun indicator.

4. The manufacturing method according to claim 1, further comprising the steps of:
setting the planetary shaft relative phase as a planetary shaft reference phase by attaching each of the planetary shaft main bodies to the threaded jig; and
setting a planetary shaft relative phase of each of the planetary shaft main bodies as the planetary shaft regular phase based on the rotational phase of the sun shaft main body and the planetary shaft reference phase.

5. The manufacturing method according to claim 1, wherein the step of assembling a basic assembly includes the step of setting an axial relative position, which is the position of each of the planetary shaft main bodies in an axial direction relative to the sun shaft main body, as an axial regular position, which is the axial relative position in the regular assembled state, before combining the sun shaft main body with the planetary shaft main body.

6. The manufacturing method according to claim 5, wherein the step of assembling a basic assembly includes the steps of:

preparing a basic jig for holding the sun shaft main body; and
setting the axial relative position as the axial regular position by abutting a distal end portion of the planetary shaft main body against the basic jig.

7. The manufacturing method according to claim 1, wherein the step of assembling a basic assembly includes the step of setting a radial relative position, which is the position of each of the planetary shaft main bodies in a radial direction relative to the sun shaft main body, as a radial regular position, which is the radial relative position in the regular assembled state, in a state in which a center line of the sun shaft main body is parallel to a center line of the planetary shaft main body.

8. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which the annular shaft includes an annular shaft main body having an annular threaded section defined by an internally threaded section, the sun shaft includes a sun shaft main body having a sun threaded section defined by an externally threaded section, the planetary shafts each include a planetary shaft main body having a planetary threaded section defined by an externally threaded section, the planetary threaded section is engaged with the annular threaded section and the sun threaded section, and rotational motion of either one of the annular shaft and the sun shaft is converted into rectilinear motion of the other one of the annular shaft and the sun shaft along an axial direction by a planetary motion of the planetary shaft, the method comprising the steps of:
forming an indicator in the sun shaft main body;
forming the sun threaded section in the sun shaft main body based on a sun indicator, which is the indicator of the sun shaft main body;
assembling a basic assembly by combining the sun shaft main body with the planetary shaft main bodies based on the sun indicator;
forming an indicator in the annular shaft main body;
forming the annular threaded section in the annular shaft main body based on an annular indicator, which is the indicator of the annular shaft main body;
assembling an axial assembly by combining the basic assembly with the annular shaft main body; and
setting the rotational phase of the annular threaded section as an annular threaded section reference phase based on a rotational phase of the sun indicator and a rotational phase of the annular indicator before assembling the axial assembly, in which when one threaded section formed by a portion of the planetary threaded section engaged with the annular threaded section is defined as a counter annular threaded section, and the annular threaded section reference phase is defined as a rotational phase of the annular threaded section relative to a rotational phase of the counter annular threaded section at a time when the counter annular threaded section begins to engage with the annular threaded section.

9. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which the annular shaft includes an annular shaft main body having an annular threaded section formed as an internally threaded section and an annular gear formed as an internal gear, the sun shaft includes a sun shaft main body having a sun threaded section formed as an externally threaded section and a sun gear formed as an external gear, the planetary shafts each include a planetary shaft main body having a planetary threaded section formed as an externally threaded section and a planetary gear formed as an external gear, the annular gear is formed separately from the annular shaft main body, the sun gear is formed separately from the sun shaft main body, the planetary gear is formed separately from the planetary shaft main body, the planetary threaded section is engaged with the annular threaded section and the sun threaded section, the planetary gear engages with the annular gear and the sun gear, and rotational motion of either one of the annular shaft and the sun shaft is converted into rectilinear motion of the other one of the annular shaft and the sun shaft along an axial direction by a planetary motion of the planetary shaft, the method comprising the steps of:

preparing a gear jig having a counter annular gear for engaging with the annular gear and a counter sun gear for engaging with the sun gear;

assembling a gear assembly by attaching the annular gear, the sun gear, and the planetary gear to the gear jig, with the gear assembly being an assembly formed by a combination of the annular gear, the sun gear, and the planetary gear in a reference assembled state, the reference assembled state being a state in which each of the planetary gears is engaged with the annular gear and the sun gear with the planetary gears arranged at even intervals around the sun gear; and assembling a geared assembly by combining the annular shaft main body, the sun shaft main body, the planetary shaft main body and the gear assembly.

10. The manufacturing method according to claim 9, wherein the step of preparing a gear jig includes the steps of:

arranging a plurality of support columns at even intervals in a circumferential direction with a gap formed between adjacent ones of the support columns for arrangement of one of the planetary gears;

forming counter annular external teeth for engaging with the annular gear on an outer circumference of each of the support columns, the counter annular external teeth forming the counter annular gear as a whole; and forming a counter sun internal teeth for engaging with the sun gear on an inner circumference of each of the support columns, the counter sun internal teeth forming the counter sun gear as a whole.

11. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which rotational motion of either one of the annular shaft and the sun shaft is converted into rectilinear motion of the other one of the annular shaft and the sun shaft along an axial direction by a planetary motion of the planetary shaft, the method comprising the steps of:

forming an indicator in the annular shaft; and forming an internally threaded section in the annular shaft based on the indicator.

12. The manufacturing method according to claim 11, further comprising the step of:

forming the annular gear of the internal teeth in the annular shaft based on the indicator.

13. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which rotational motion of either one of the annular shaft and the sun shaft is converted into rectilinear motion of the other one of the annular shaft and the sun shaft along an axial direction by a planetary motion of the planetary shaft, the method comprising the steps of:

forming an indicator in the sun shaft; and forming an externally threaded section on the sun shaft based on the indicator.

14. The manufacturing method according to claim 13, further comprising the step of:

forming the sun gear of the external teeth on the sun shaft based on the indicator.

15. A jig used for manufacturing a rotational rectilinear motion conversion mechanism provided with an annular shaft through which an opening extends in an axial direction, a sun shaft arranged in the annular shaft, and a plurality of planetary shafts arranged around the sun shaft, in which the annular shaft includes an annular shaft main body having an internally threaded section and an annular gear of internal teeth, the sun shaft includes a sun shaft main body having an externally threaded section and a sun gear of external teeth, the planetary shafts each include a planetary shaft main body having an externally threaded section and a planetary gear of external teeth, the annular gear is formed separately from the annular shaft main body, the sun gear is formed separately from the sun shaft main body, the planetary gear is formed separately from the planetary shaft main body, the externally threaded section of the planetary shaft main body is engaged with the internally threaded section of the annular shaft main body and the externally threaded section of the sun shaft main body, the planetary gear is engaged with the annular gear and the sun gear, and rotational motion of either one of the annular shaft and the sun shaft is converted into rectilinear motion of the other one of the annular shaft and the sun shaft along an axial direction by a planetary motion of the planetary shaft, wherein the manufacturing of the conversion mechanism includes the step of assembling a gear assembly, the gear assembly is an assembly formed by a combination of the annular gear, the sun gear and the planetary gear in a basic assembled state, the basic assembled state is a state in which each of the planetary gears is engaged with the annular gear and the sun gear with the planetary gears being arranged at even intervals around the sun gear, the jig comprising:

a plurality of support columns arranged at even intervals in a circumferential direction with a gap formed between adjacent ones of the support columns for arrangement of one of the planetary gears;

counter annular external teeth formed on an outer circumference of each of the support columns for engaging with the annular gear, in which the counter annular external teeth forms a counter annular gear as a whole; and counter sun internal teeth formed in an inner circumference of each of the support columns for engaging with the sun gear, in which the counter sun internal teeth forms a counter sun gear as a whole.

16. A method for manufacturing a rotational rectilinear motion conversion mechanism provided with an annular shaft through which an opening extends in an axial direction, a sun shaft arranged in the annular shaft, and a plurality of planetary shafts arranged around the sun shaft, in which the annular shaft includes an annular shaft main body having an annular threaded section defined by an internally threaded section, the sun shaft includes a sun shaft main body having a sun threaded section defined by an externally threaded section, the planetary shafts each include a planetary shaft main body having a planetary threaded section defined by an externally threaded section, the planetary threaded section is engaged with the annular threaded section and the sun threaded section, and rotational motion of either one of the annular shaft and the sun shaft is converted into rectilinear motion of the other one of the annular shaft and the sun shaft along an axial direction by a planetary motion of the planetary shaft, the method comprising the steps of:

corresponding a relationship of the planetary shaft main bodies relative to the sun shaft main body in arrangement to the relationship in a regular assembled state of the planetary shaft main bodies relative to the sun shaft main body, with the regular assembled state being defined by a state in which the sun threaded section and the planetary threaded sections are engaged with each other in a state in which the planetary shaft main bodies are arranged at even intervals around the sun shaft main body; and assembling a basic assembly by moving each of the planetary shaft main bodies after corresponding the relationship of the planetary shaft main bodies relative to the sun shaft main body to the relationship in the regular assembled state, the basic assembly being an assembly formed by a combination of the sun shaft main body and the planetary shaft main bodies in the regular assembled state;

wherein the step of assembling a basic assembly includes the step of setting a circumferential relative position, which is the position of each planetary shaft main body in a circumferential direction relative to the sun shaft main body, as a circumferential regular position, which is the circumferential relative position in the regular assembled state, before combining the planetary shaft main body with the sun shaft main body, and wherein the manufacturing method further comprising the steps of:

forming an indicator in the sun shaft main body;

forming the sun threaded section in the sun shaft main body based on a sun indicator, which is the indicator of the sun shaft main body; and setting the circumferential relative position as the circumferential regular position based on a rotational phase of the sun indicator.

* * * * *